US009569912B2

(12) United States Patent
Faes

(10) Patent No.: US 9,569,912 B2
(45) Date of Patent: Feb. 14, 2017

(54) ARTICLE STORAGE AND RETRIEVAL APPARATUS AND VENDING MACHINE

(75) Inventor: Steven Michael Faes, Canisteo, NY (US)

(73) Assignee: ShopATM BV (SARL), Curaco (NL)

( * ) Notice: Subject to any disclaimer, the term of this patent is extended or adjusted under 35 U.S.C. 154(b) by 964 days.

(21) Appl. No.: 12/215,270

(22) Filed: Jun. 26, 2008

(65) Prior Publication Data

US 2009/0076650 A1 Mar. 19, 2009

Related U.S. Application Data

(63) Continuation-in-part of application No. 11/570,713, filed on Apr. 27, 2007.

(51) Int. Cl.

*G07F 11/16* (2006.01)
*G06F 17/00* (2006.01)
*G07F 11/42* (2006.01)
*G07F 11/62* (2006.01)

(52) U.S. Cl.

CPC ............. *G07F 11/42* (2013.01); *G07F 11/165* (2013.01); *G07F 11/62* (2013.01)

(58) Field of Classification Search

CPC ............................... G07F 11/165; G07F 11/42
USPC ................... 700/231-232; 221/211; 414/783
See application file for complete search history.

(56) References Cited

U.S. PATENT DOCUMENTS

| | | | | | |
|---|---|---|---|---|---|
| 5,029,728 | A * | 7/1991 | Su | 221/211 | |
| 5,042,686 | A * | 8/1991 | Stucki | G07F 7/069 | 194/217 |
| 5,240,139 | A * | 8/1993 | Chirnomas | 221/2 | |
| 5,880,443 | A * | 3/1999 | McDonald et al. | 235/375 | |
| 5,971,205 | A * | 10/1999 | Michaels et al. | 221/135 | |
| 6,029,851 | A * | 2/2000 | Jenkins | G07F 7/06 | 221/102 |
| 6,929,149 | B2 * | 8/2005 | Selfridge et al. | 221/150 R | |
| 7,831,334 | B2 * | 11/2010 | Vollm et al. | 700/231 | |
| 7,970,490 | B2 * | 6/2011 | Fellows et al. | 700/235 | |
| 8,095,236 | B2 * | 1/2012 | Rudy | G07F 7/069 | 700/231 |
| 8,631,969 | B2 * | 1/2014 | Faes | G07F 11/06 | 221/211 |
| 2003/0034354 | A1 * | 2/2003 | Chirnomas | G07F 9/02 | 221/2 |
| 2003/0063969 | A1 * | 4/2003 | Chirnomas | 414/626 | |
| 2004/0238557 | A1 * | 12/2004 | Chirnomas | A23G 9/28 | 221/124 |
| 2005/0143857 | A1 * | 6/2005 | Chirnomas | G07F 5/18 | 700/244 |
| 2008/0017660 | A1 * | 1/2008 | Faes | 221/211 | |
| 2008/0093371 | A1 * | 4/2008 | Ubidia et al. | 221/1 | |
| 2009/0149985 | A1 * | 6/2009 | Chirnomas | B65G 1/1373 | 700/215 |
| 2010/0072221 | A1 * | 3/2010 | Chirnomas | 221/211 | |

* cited by examiner

*Primary Examiner* — Michael K Collins
(74) *Attorney, Agent, or Firm* — Maynard Cooper & Gale, P.C.; Jon Holland

(57) ABSTRACT

A apparatus for moving an article that contains a first telescoping tube movably connected to a second telescoping tube, a suction cup connected to said first telescoping tube, and a drive assembly connected to the first telescoping tube.

23 Claims, 47 Drawing Sheets continued on

ARTICLE STORAGE AND RETRIEVAL APPARATUS AND VENDING MACHINE

CROSS-REFERENCE TO RELATED PATENT APPLICATION

This patent application is a continuation-in-part of applicant's copending application U.S. Ser. No. 11/570,713, filed on Apr. 27, 2007. The entire disclosure of such copending patent application is hereby incorporated by reference into this specification.

FIELD OF THE INVENTION

This invention relates to an apparatus and process for storing and selectively retrieving articles, and to a vending machine incorporating such apparatus and process.

BACKGROUND OF THE INVENTION

Until recent years most of the mechanisms used in various dispensing machines relied on fixed pitch spiral or fixed pitch conveyor delivery systems. Individual product selections required an individual mechanism for each product, consisting of a powered spiral or a powered segmented conveyor. Such machines suffer from a number of disadvantages, such as low volumetric efficiency of product density due to the fixed pitch nature of the spiral, physical damage to the products caused by forces induced by the spiral, and physically damage to the product caused by dropping the product to a delivery compartment.

An additional disadvantage to most vending machines is that the machines take a long time to load and must be loaded from the rear of the product tray which is a the furthest distance from the door opening. Fixed pitch type delivery systems require that each individual unit of product be placed into its respective slot or position for delivery, further slowing and complicating the loading process.

It is conventional that most vending machines that have a visible front door to view the product require that the product be placed some distance behind the glass partition of the door, thereby limiting the clarity of the products to be selected by the customer. Machines that are low on product appear unappealing to potential customers.

Most vending machines do not have a way to confirm that the product the customer has selected is the same product delivered to the customer. This is a disadvantage to the customer as well as the vending machine operators. It can lead to accounting errors as well as fraud. For example, some machine operator are subsidized by large corporate brands and are obligated to stock the contractually agreed brands. If the operator substitutes non-branded products for the contracted branded products, this can lead to reduced revenue for the corporate brand as well as a breach of contract.

It is an object of this invention to provide an improved apparatus and process for vending goods.

SUMMARY OF THE INVENTION

In accordance with this invention, there is provided an apparatus for storing and selectively retrieving articles, comprising a vertical array of storage locations each having a horizontal surface on which articles may rest and along which articles may be slid, a carriage mounted for movement horizontally and vertically across the face of the array so as to be selectively positionable at any one of the locations, and an arm mounted on the carriage and selectively extendible and retractable to engage and withdraw a selected article from a first one of said locations on to the carriage, the carriage then being movable to another of said locations at which the arm may be extended to discharge the article from the carriage into said other location. There is also provided a process utilizing such apparatus.

In one embodiment, the arm comprises a telescopic suction tube that is connected to a fan driven by an electric motor. The tube preferably carries at the free end an elastic cup surrounding the tube and engageable with an article to picked up.

BRIEF DESCRIPTION OF THE DRAWINGS

The invention will be described by reference to this specification and the enclosed drawings, wherein like numerals refer to like elements, and wherein.

DESCRIPTION OF THE PREFERRED EMBODIMENTS

Figure 1:
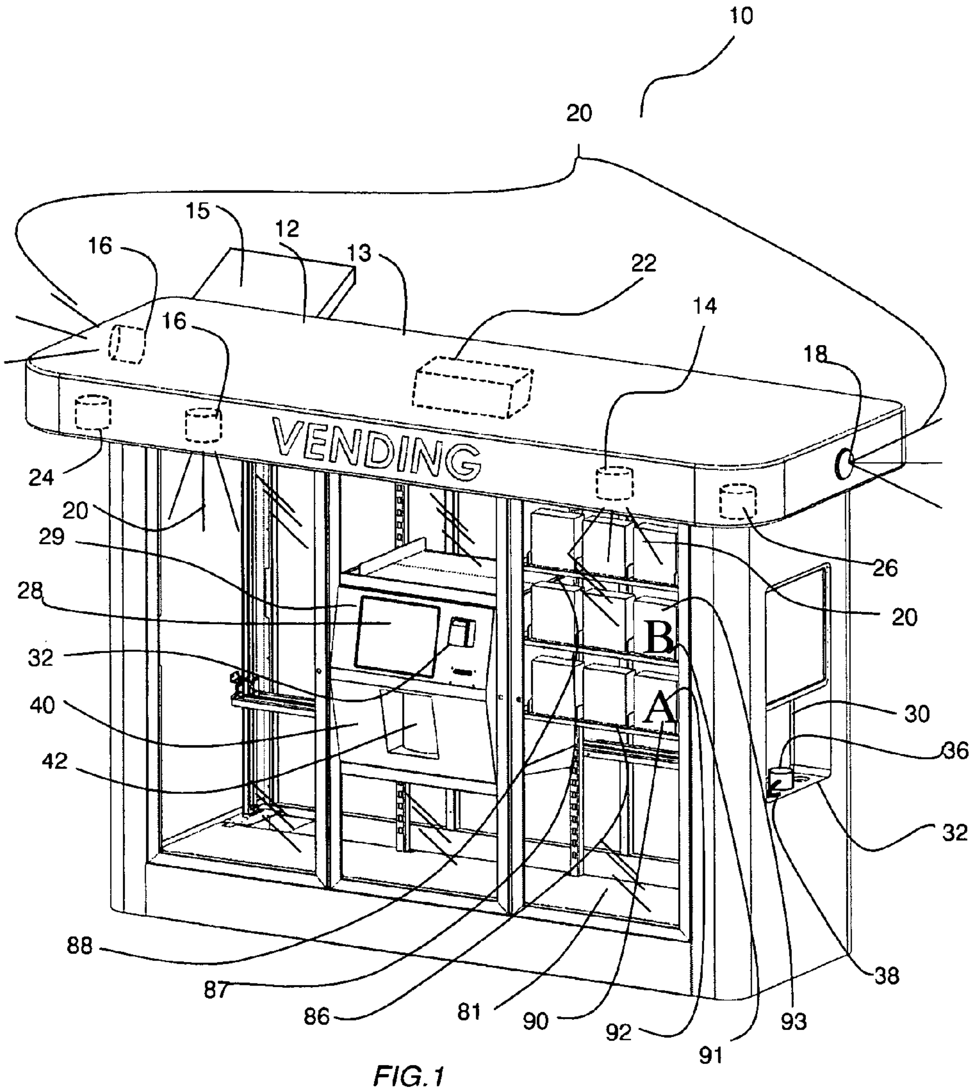
FIG. 1 is a perspective view of one preferred vending machine.

FIG. 1 illustrates one preferred vending machine 10 that, in the embodiment, depicted, have a substantially rectangular shape. In another embodiment, not shown, the machine 10 has a substantially arcuate shape that may be, e.g., substantially circular, substantially oval, and the like.

Although the machine 10 depicted in FIG. 1 is substantially rectangular, other rectilinear shapes may be used. Thus, e.g., machine 10 can be substantially square.

One may use a combination of rectilinear and arcuate members. Thus, the main body of machine 10 can be substantially rectilinear, and its end members may be arcuate.

Referring again to the preferred embodiment depicted in FIG. 1, the vending machine 10 preferably contains a decorative header 12. In one aspect of this embodiment, the header 12, which often is referred to as a "topper," used to convey information.

Thus, e.g., in the embodiment depicted in FIG. 1, header 12 conveys information 14 on its front face 16. As will be apparent to those skilled in the art, different types of headers may be used, and they may convey different information. Reference may be had, e.g., to U.S. Pat. No. 7,059,968 (gaming machine and means for a gaming machine topper), published United States patent application 2007/0113443 (universal electronic gaming machine topper sign), and the like. The entire disclosure of each of these United States patent documents is hereby incorporated by reference into this specification.

In the embodiment depicted in FIG. 1, header 12 has a substantially rectangular shape with arcuate corners. Different shapes may be used for such header 12. Thus, e.g. one may use a header whose top surface is not planar but, in at least a portion thereof, extends upwardly to define an upwardly-extending three-dimension object on such portion. In one aspect of this embodiment, the width of the header at one of its ends differs from the width of the header at the other of such ends.

In the preferred embodiment depicted in FIG. 1, header 12 is comprised of an illuminator that provides illumination to the device 10.

One may use one or more of the illuminators known to those skilled in the art. Thus, e.g., one may use one or more of the illuminators described in U.S. Pat. No. 3,800,135 (fiber optic display panel illuminator), U.S. Pat. No. 4,212,048 (illuminator for reflective dichroic liquid crystal displays), U.S. Pat. No. 4,992,916 (prismatic illuminator for flat panel display), U.S. Pat. No. 5,046,826 (illuminator and display panel employing the illuminator), U.S. Pat. No. 5,682,213 (optical illuminator for liquid crystal displays), U.S. Pat. No. 6,142,633 (polarized light illuminator and projection type image display apparatus), U.S. Pat. No. 6,830,354 (aperture fluorescent lamp, surface illuminator, manufacturing methods thereof, liquid crystal display, and electronic device), U.S. Pat. No. 6,891,530 (touch panel including illuminator and reflective liquid crystal display device), U.S. Pat. No. 6,999,059 (display apparatus having illuminator and method of controlling the same), and the like. The entire disclosure of each of these United States patents is hereby incorporated by reference into this specification.

The device 10 may comprise and illuminated sign comprised of one or more suitable illuminators. These illuminated sign devices are well known to those skilled in the art. Reference may be had, e.g., to U.S. Pat. No. 4,697,365 (edge illuminated sign, U.S. Pat. No. 4,929,936 (LED illuminated sign), U.S. Pat. No. 5,315,495 (illuminated sign device), U.S. Pat. No. 5,537,302 (illuminated sign with patterned openings on light dispersion member), U.S. Pat. No. 5,542,201 (indirectly illuminated sign), U.S. Pat. No. 6,607,412 (illuminated sign and method for design), U.S. Pat. No. 6,976,329 (illuminated sign unit), U.S. Pat. No. 7,360,910 (internally illuminated sign), and the like. The entire disclosure of each of these United States patents is hereby incorporated by reference into this specification.

In the embodiment depicted in FIG. 1, the illuminator comprises a multiplicity of lamps 16 and 18 that illuminate both the header 12 and the machine 10. Although only two such lighting devices 16/18 are shown for the sake illustration, it will be apparent that more of fewer such lamps may be used.

The illuminator may provide different forms of light. Thus, e.g., the illuminator may provide white fluorescent light.

In one aspect of this embodiment, the light provide by the illuminator includes daylight which is more natural and pleasing. Lamps for providing daylight are well known to those skilled in the art. Reference may be had, e.g., to U.S. Pat. No. 3,757,101 (lamp for providing daylight effect), U.S. Pat. No. 4,458,176 (daylight fluorescent lamp), U.S. Pat. No. 5,418,419 (lamp for producing a daylight spectrum), U.S. Pat. No. 6,611,082 (lamp for producing daylight spectral distribution), and the like. The entire disclosure of each of these United States patents is hereby incorporated by reference into this specification.

The illuminator, in one embodiment, is comprised of one or more light emitting diodes (LEDs). In the embodiment depicted in FIG. 1, light rays 20 extend substantially circumferentially around lamps 16 and 18.

Referring again to FIG. 1, and in the preferred embodiment depicted, the device 10 is comprised of one or more solar panels 15. These devices are well known and are described, e.g., in U.S. Pat. No. 4,205,662 (solar panel assembly), U.S. Pat. No. 5,542,203 (mobile sign with solar panel), U.S. Pat. No. 5,893,932 (portable cellular phone with integral solar panel), U.S. Pat. No. 6,948,826 (light box having a solar panel cover), U.S. Pat. No. 6,960,717 (adjustable solar panel), U.S. Pat. No. 7,224,286 (solar panel having visual indicator), and the like. The entire disclosure of each of these United States patents is hereby incorporated by reference into this specification.

The lamps 16 and 18 are operatively connected to a controller 22 by means, e.g., of wire, not shown. The controller 22 is adapted to control the intensity and/or the direction of light rays 20; and it may provide direct lighting and/or diffuse lighting and/or variable color emissions.

Referring again to FIG. 1, and to the preferred embodiment depicted therein, it will be seen that header 12 also is comprised of a multiplicity of speakers 24 and 26 that preferably are also operatively connected to the controller 22. The speakers 24 and/or 26, and/or the screen 28, and/or communications module 30, are preferably used to convey instructions and/or cues and/or directions to a user.

One may use any of the means known to the art for providing audible instructions and/or cues and/or directions to a user. Reference may be had, e.g., to U.S. Pat. No. 5,502,496 (apparatus for providing audible instructions or status information for use in a digital television system), U.S. Pat. No. 6,172,641 (navigation system with audible route guidance instructions), U.S. Pat. No. 7,062,378 (portable navigation system and device with audible turn instructions), U.S. Pat. No. 7,255,672 (method of presenting audible and visual cues), and the like. The entire disclosure of each of these United States patents is hereby incorporated by reference into this specification.

Alternatively, or additionally, one may use known means for providing visual instructions and/or cues and/or directions to a user. Reference may be had, e.g., to U.S. Pat. No. 3,508,346 (audio visual instructional apparatus), U.S. Pat. No. 3,673,711 (method of and apparatus for visual instruction), U.S. Pat. No. 5,550,967 (method and apparatus for generating and displaying visual cues on a graphic user interface), U.S. Pat. No. 6,516,643 (pop-up, precision lock-cylinder that reveals at once, with visual and tactile cues, who else with a key has sought or gained entry), and the like. The entire disclosure of each of these United States patents is hereby incorporated by reference into this specification.

Referring again to FIG. 1, and to the preferred embodiment depicted therein, it will be seen that device 10 is comprised of a screen 28. It is preferred that screen 28 be part of a graphical user interface 29. These interfaces are well known and are described and claimed in, e.g., U.S. Pat. No. 6,614,455 (directional navigation with a graphical user interface), U.S. Pat. No. 6,714,222 (graphical user interface for communications), U.S. Pat. No. 7,263,661 (multi-function device having graphical user interface incorporating customizable icons), and the like. The entire disclosure of each of these United States patents is hereby incorporated by reference into this specification.

In the embodiment depicted, the graphical user interface 30 is preferably comprised of means for accepting payment 32, such as a note reader and/or a coin acceptor/changer and/or a credit card reader and/or a closed user group card reader. One may use any of the payment acceptance means known to those skilled in the art. Reference may be had, e.g., U.S. Pat. No. 6,135,261 (payment-receiving enclosure for a vending machine), U.S. Pat. No. 6,505,095 (system for providing remote audit, cashless payment, and interactive transaction capabilities in a vending machine), U.S. Pat. No. 7,096,101 (cash payment system using vending machine), U.S. Pat. No. 7,108,180 (vending machine with electronic payment media), and the like. The entire disclosure of each of these United States patents is hereby incorporated by reference into this specification.

By way of further illustration, the system claimed in U.S. Pat. No. 6,505,095 is of interest. Claim 1 of this patent describes: "1. An audit-credit-interactive system, said system comprising: a micro controller; a vending machine interface interconnected with said micro controller, said audit-credit-interactive system, by way of said vending machine interface, interconnects to and data communicates with a vending machine controller, said vending machine controller is interconnected to and controls a vending machine; and an interactive interface interconnected with said micro controller, said interactive interface interconnects said audit-credit-interactive system to a computing platform, said computing platform, by way of said interactive interface and based in part on data communicated between said audit-credit-interactive system and said vending machine controller, monitors said vending machine activity, and selectively controls said vending machine vending cycles."

The payment accepting means 32 is preferably operatively connected to the controller 22.

Referring again to FIG. 1, and to the preferred embodiment depicted therein, the communications module 30 also is preferably connected to the controller 22. In one embodiment, the communications module 30 is comprised of an interactive display system such as, e.g., those disclosed in one or more of U.S. Pat. No. D425875 (interactive display system), U.S. Pat. No. 6,097,441 (system for dual-display interaction with integrated television and internet content), U.S. Pat. No. 7,113,921 (method and system for automatically displaying an image and a product in a page based on contextual interaction and metadata), U.S. Pat. No. 7,348,963 (interactive video display system), and the like. The entire disclosure of each of these United States patents is hereby incorporated by reference into this specification.

Referring again to FIG. 1, the communications module 30, in one embodiment thereof, is comprised of a shelf 34 on which is disposed sample product 36 that preferably is secured by a cable 38 to avoid misappropriation. In one aspect of this embodiment, the shelf 34 supports sample cards of perfume. In another aspect of this embodiment, the shelf 34 supports gaming controllers that allow a user to test video games being sold by the vending machine 10.

In one embodiment, it is preferred that communications module 30 comprise an interactive display that allows the prospective customer to obtain more information about the product being vended and, in some cases, to sample and/or test such product. Such interactive displays are well known to those skilled in the art. Reference may be had, e.g., U.S. Pat. No. 4,814,755 (interactive display system), U.S. Pat. No. 4,268,826 (interactive display device), U.S. Pat. No. 5,274,363 (interactive display system), U.S. Pat. No. 5,324,416 (interactive display center), U.S. Pat. No. 5,680,159 (interactive display system using a laser disk player replaying video frames in response to touch force control monitor), U.S. Pat. No. 6,593,972 (interactive display system), U.S. Pat. No. 6,747,648 (website on the internet for automated interactive display of images), U.S. Pat. No. 1 7,053,883 (electronic device having an interactive display screen), D354,047 (interactive display terminal), and the like. The entire disclosure of each of these United States patents is hereby incorporated by reference into this specification.

Figure 2:
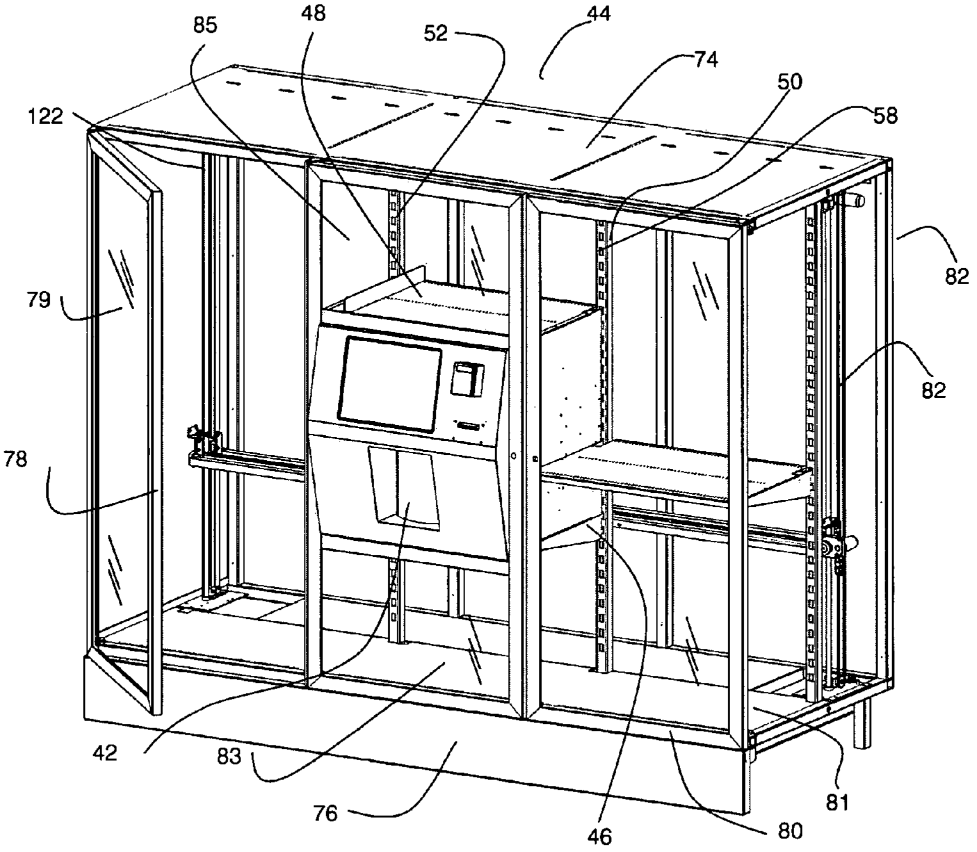
FIG. 2 is a perspective of the vending machine of FIG. 1 with the topper and side panels removed.

Referring again to FIG. 1, and in the preferred embodiment depicted therein, it will be seen that the screen 28 and the payment accepting means 32 are part of a central control unit 40 that also comprises a means for delivering product 42. The spatial relationship between central control unit 40 and cabinet 44 is more clearly illustrated in FIG. 2, from which certain detail has been omitted for simplicity of representation.

Figure 3:
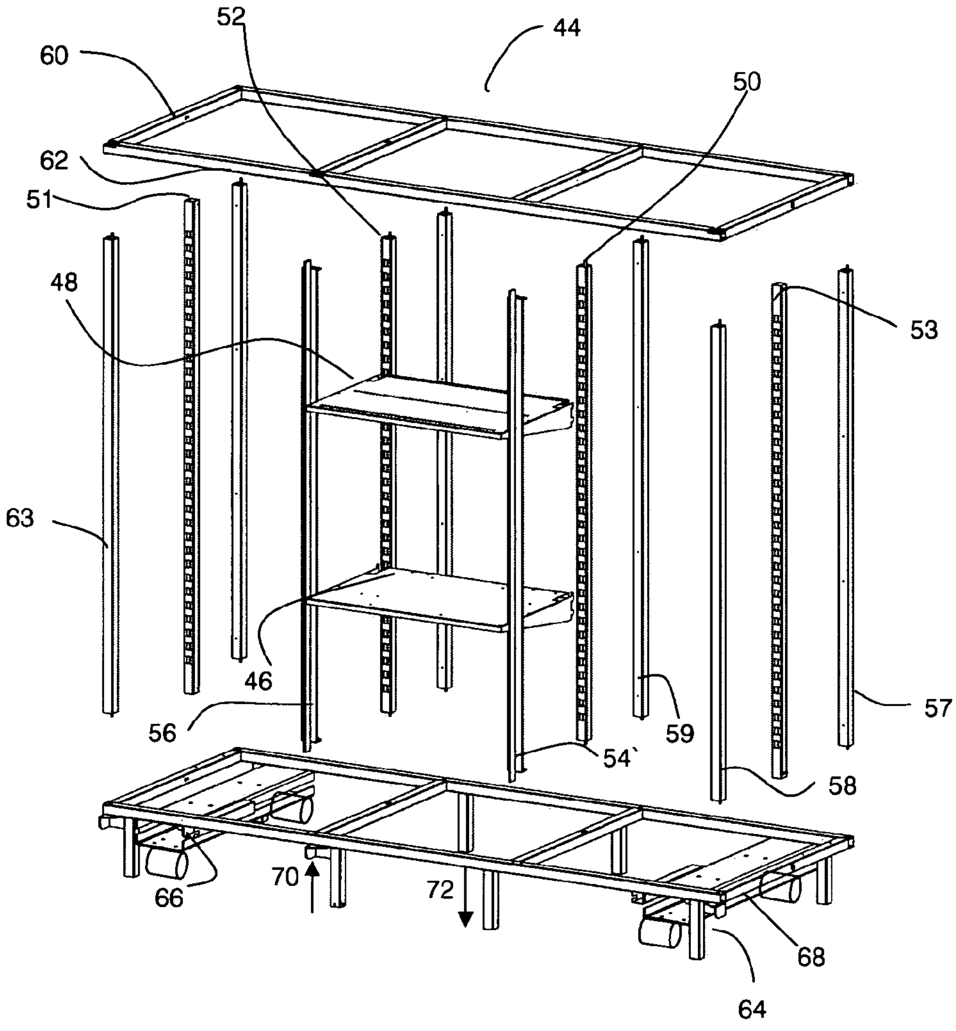
FIG. 3 is a perspective exploded view of the frame of the machine of FIG. 1.

FIG. 3 is an exploded view of one preferred embodiment of cabinet 44. Referring to FIG. 3, it will be seen that cabinet 44 is comprised of lower shelve 46 and upper shelf 48.

Central control unit 40 is disposed between shelves 46 and 48, and also between standards 50 and 52 and supports 54 and 56. In one aspect of this embodiment, central control unit 40 is attached to standards 50 and 52 by means of slotted tabs (not shown) that engage rectangular openings 58 in the standards 50 and 52.

Referring again to FIG. 3, it will be seen that upper frame 60 is removably connected to standards 50, 51, 52, and 53 as well as supports 54, 56, 57, 58, 59, 61, 62, and 63. Similarly, lower frame 64 is also removably connected to standards 50, 51, 52, and 53 as well as supports 54, 56, 57, 58, 59, 61, 62, and 63. The fact that such frames are removably connected facilitates the ability of the apparatus 10 to be readily disassembled, moved through a standard doorway, and reassembled.

Referring again to FIG. 3, it will be seen that cabinet 44 is comprised of means for raising and/or lowering the shelves 46 and 48 and the apparatus 10 (not shown in FIG. 3, but see FIGS. 1 and 2) disposed there between One may use conventional means known to those skilled in the art for effecting this movement.

In one embodiment, illustrated in FIG. 3, lower frame 64 is operatively connected to a pair of scissors jacks 66 and 68 that are adapted to move frame 64 in the direction of arrow 70 and/or 72. These scissor jacks are well known and may be activated by either mechanical means, electrical means, or pneumatic means. Reference may be had, e.g., to U.S. Pat. No. 3,751,161 (scissor jack), U.S. Pat. No. 4,765,595 (scissors jack), U.S. Pat. No. 4,802,653 (scissors jack), U.S. Pat. No. 5,364,071 (scissors jack), U.S. Pat. No. 5,950,990 (attachment for automatically operating a scissor jack, U.S. Pat. No. 6,375,161 (scissor jack), U.S. Pat. No. 6,695,289 (motor driven scissor jack with limit switches), and the like. The entire disclosure of each of these United States patents is hereby incorporated by reference into this specification.

Referring again to FIG. 2, and in the preferred embodiment depicted, it will be seen that cabinet is comprised of a top panel 74 and a front facing panel 76. The cabinet 44 also is comprised of doors 78 and 80 which may be opened and closed. In the embodiment depicted in FIG. 2, door 78 is open and door 80 is closed.

It is preferred that each of doors 78 and 80 comprise a glass face 79 and 81, respectively. It is also preferred that glass panes 83 and 85 be disposed on top of and beneath control unit 40.

In another embodiment, not shown, one or both of the doors 78 and 80 are located on the rear facing side 89 of the machine.

Referring again to FIG. 1, and in the preferred embodiment depicted therein, directly behind the glass face 81 resides a series of product trays 86, 87 and 88. The product trays 86, 87, and 88, in the embodiment depicted, are shown with a plurality of products 90 and 91 stored on them.

Referring again to FIG. 1, and in the embodiment depicted, the 86, 87 and 88 are preferably arranged in such a way as to allow the products 90 and 91 to be viewed from the customer (not shown) in a clear and easily recognizable manner. The customer can view the product labeling 92 and 93 in a normal reading orientation. The products 90 and 91 can be loaded into the trays 86,87 and 88 directly from the front of the vending machine 10 when the doors 78 and 80 are opened.

Figure 4:
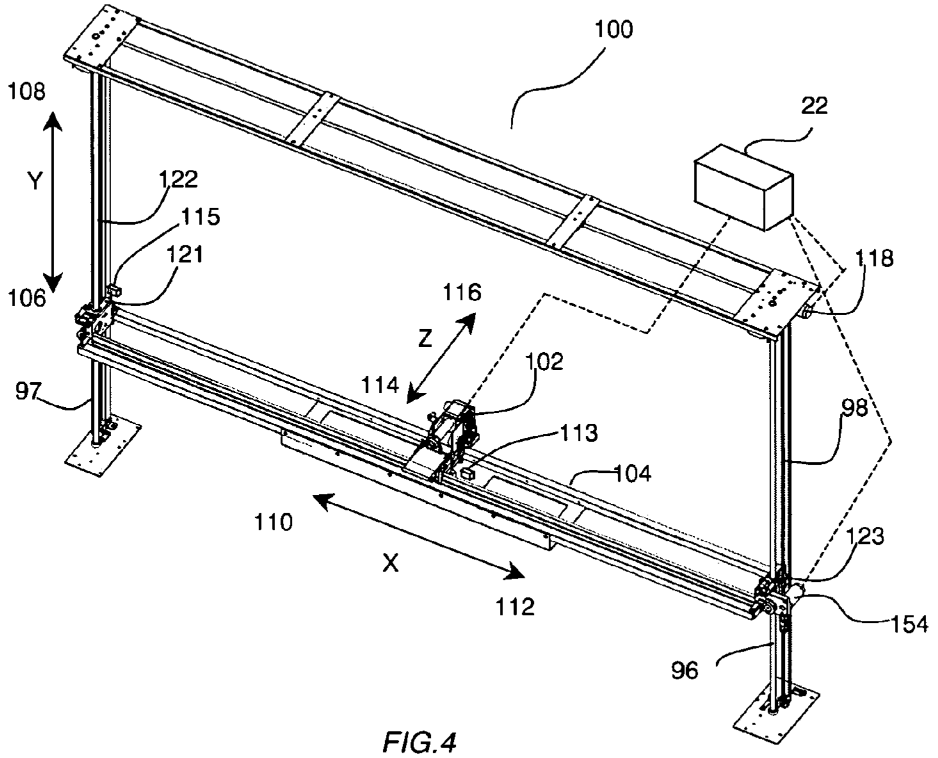
FIG. 4 is a perspective view of one preferred three-axes drive mechanism.

Referring again to FIG. 2, and in the preferred embodiment depicted, it will be seen that roller chain 98 is part of a 3-axis drive mechanism 100 (see FIG. 4) that is illustrated in more detail in FIG. 4 et seq. The 3-axis drive mechanism is preferably adapted to move a drive in the X, Y, and Z axes. These mechanisms are well known to those skilled in the art. Reference may be had, e.g., to U.S. Pat. No. 4,256,218 (three axis transfer apparatus), U.S. Pat. No. 4,401,406 (remote three axis cable transport system), U.S. Pat. No. 5,324,163 (three-axis Cartesian robot), U.S. Pat. No. 5,487,533 (three-axis Cartesian robot), U.S. Pat. No. 6,272,397 (orthogonal type three-axis robot and a control method therefore), U.S. Pat. No. 7,209,176 (three-axis remote camera head), U.S. Pat. No. 7,263,897 (three-axis motion table), U.S. Pat. No. 7,344,017 (three axis drive apparatus), and the like. The entire disclosure of each of these United States patents is hereby incorporated by reference into this specification.

FIG. 4 illustrates a 3-axis drive mechanism 100, which comprises a vacuum pick mechanism 102 and a support rail apparatus 104. In the preferred embodiment depicted, roller chain 82 and 122 are connected to the end caps 121 and 123 and to a reversible motor 118 which cause the support rail to move vertically in the Y axis as indicated by arrows 106 and 108.

In one embodiment, the support rail apparatus 104 is movably disposed on vertical rails 96 and 97 (see FIG. 4) and is adapted to be moved thereon by chains 82 and 122.

The roller chains 82/122 are preferred flexible drive means that, in combination with reversible motor 118 and controller 22 (not shown in FIG. 4, but see FIG. 1) to which the motor 118 is operatively connected, comprise a motion control device. One may use any of the motion control devices known to those skilled in the art such as, e.g., the devices disclosed in U.S. Pat. No. 4,847,543 (motion control drive interface), U.S. Pat. No. 4,855,661 (motion control apparatus for induction motor), U.S. Pat. No. 5,267,604 (motion control system for horizontal continuous caster), U.S. Pat. No. 6,297,6212 (motion control coupling apparatus), U.S. Pat. No. 7,076,322 (system and method for satisfying move constraints when performing a motion control sequence), U.S. Pat. No. 7,194,321 (modular multi-axis motion control and driving system and method thereof), reissue patent 39,907 (tolerance based motion control system), and the like. The entire disclosure of each of these United States patents is hereby incorporated by reference into this specification.

Referring again to FIG. 4, it will be seen that motors 118 and 154 are each operatively connected to controller 22 and can furnish such controller 22 information about the positions of support rail apparatus 104 and the pic motor 102. In one preferred embodiment, each of motors 118 and 154 are encoder motors. These motors are well known to those skilled in the art. Reference may be had, e.g., to U.S. Pat. No. 4,680,518 (servomotor velocity control method), U.S. Pat. No. 4,695,780 (servomotor velocity control method), U.S. Pat. No. 4,795,925 (servomotor velocity control method) and the like. The entire disclosure of each of these United States patents is hereby incorporated by reference into this specification.

In one preferred embodiment, each of the motors 118 and 154 is a reversible motor.

Referring again to FIG. 4, and to the preferred embodiment depicted, the pick mechanism 102 is preferably connected to reversible drive motor 154 and drive belt 150 which allows the pick mechanism 102 to move horizontally in the X axis as indicate by arrows 110 and 112. The pick mechanism is capable of moving in the Z-axis as indicated by arrows 114 and 116 and is further described below.

Referring now to FIGS. 5, 6, 7, 8 and 9, and to the preferred embodiment depicted, a telescoping vacuum pick mechanism 102 is disclosed.

One may use a vacuum pick mechanism (such as a picker) that is disclosed in the prior art. Thus, e.g., one may use the vacuum pick mechanism disclosed in U.S. Pat. No. 5,240,139, the entire disclosure of which is hereby incorporated by reference into this specification.

As disclosed in U.S. Pat. No. 5,240,139 (see the last paragraph of column 4 thereof), "An x-y beam 18 is suspended above sliding panels 14 and outside freezer compartment 12 between y rails 20 which are attached opposite one another near the top of cabinet sides 22. Beam 18 has ball-bearing rollers 22 which rest on y rails 20 at either end thereof. There are x-guide rails 24 provided on either long edge of x-y beam 18 on which ride additional ball-bearing rollers 26 which are attached to x-y carriage 28. The side to side movement of x-y carriage 28 is accomplished by X motor 30 which is suspended in a stationary position on the underside of x-y beam 18. X-y carriage 28 and X motor 30 may be connected in a variety of ways such as by an endless chain which engages toothed sprockets (not shown) provided on both x-y carriage 28 and X motor 30. Movement of x-y beam 18 is similarly accomplished by providing Y motor 32 for driving Y axle 34. Y axle 34 has one gear 35 at each end thereof, enmeshed with toothed rack 37. The positions of x-y carriage 28 and x-y beam 18 are determined by X position sensor 36 and Y position sensor 38, respectively, which feed distance measurements to an automatic control system 40 located adjacent to freezer compartment 12 which governs and coordinates all the operations of the present invention. The preceding arrangement for positioning the x-y carriage 28 over the correct dispensable product may be referred to collectively as the x-y positioning means."

U.S. Pat. No. 5,240,139 also discloses that "A blower motor 42 is housed between machine cabinet 10 and freezer compartment 12. Blower motor 42 has connected thereto a flexible air hose 44, which air hose 44 is connected at its other end to x-y carriage 28 which comprises an air conduit 46. X-y carriage 28 has a picker guide tube 48 extending down therefrom which houses a longitudinally-compressible hose 50. Picker guide tube 48 has mounted on an outer surface thereof a z-origin sensor 51 for a purpose which will be more fully discussed hereinbelow."

U.S. Pat. No. 5,240,139 also discloses that "Hose 50 connects at its upper end with air conduit 46 and has a picker head 52 at its lower terminus. Picker head 52 comprises a counterweight against sudden closed-end vacuum pressure and has a generally cylindrical upper portion 53 with a frustum-shaped lower end 55 for a reason which will be disclosed hereinbelow. A Z motor 54 mounted to x-y carriage 28 is attached to a Z reel 56 which has wrapped thereon two Z cables 58. Cables 58 are wound around Z reel 56 which is rotated by Z motor 54, and then pass over centering Z pulleys 60 which align cables 58 so they are equidistant from one another and parallel with the longitudinal axis of guide tube 48."

Claim 2 of U.S. Pat. No. 5,240,139 discloses: "2. A vending apparatus in accordance with claim 1, wherein said package removing means comprises: a) a picker for contacting the package to be removed; b) x-y positioning means for horizontally positioning said picker over the package; c) z positioning means for selectively raising and lowering said picker above the package; d) constant air blower means for creating a constant negative air pressure, said air blower means being connected to said picker by an air hose; and e) sensing means for sensing contact between said picker and said package."

By way of further illustration, one may use the pick mechanism described in the specification and the claims of PCT/GB1004/002501 (that was published as International Publication WO 2004/114233). This application claims, in claim 1 thereof, "1. Apparatus for storing and selectively retrieving articles, comprising a vertical array of storage locations each having a horizontal surface on which articles may rest and along which articles may be slid, a carriage mounted for movement horizontally and vertically across the face of the array so as to be selectively positionable at any one of the locations, and an arm mounted on the carriage and selectively extendable and retractable to engage and withdraw a selected article from a first one of said locations on to the carriage, the carriage then being movable to another of said locations at which the arm may be extended to discharge the article from the carriage into said other location."

Claim 2 of PCT/GB1004/002501 describes: "2. Apparatus according to Claim 1, wherein the arm comprises a telescopic suction tube."

Claim 5 of PCT/GB1004/002501 describes: "5. Apparatus according to Claim 2, 3 or 4, wherein the carriage has mounted thereon a drum rotatable by a motor and carrying a flat flexible tape, the free end of which is attached to the free end of the tube whereby the tube may be selectively ex tended and retracted."

Claim 3 of PCT/GB1004/002501 describes: "8. Apparatus according to any preceding claim, comprising an optical detector on the carriage for identifying the article in a storage location."

Claim 11 of PCT/GB1004/002501 describes: "11. Apparatus according to any preceding claim, wherein the array of storage locations comprises a delivery location from which an article may be manually retrieved."

Claim 12 of PCT/GB1004/002501 describes: "12. A vending machine comprising apparatus according to Claim 9, located within a closed cabinet providing access only to said delivery location, selection means on the cabinet for sending an article selection signal to control means to indicate the choice of article to be vended by the machine, and payment means for receiving a payment in relation to the article and for sending a payment signal to the control means when the payment has been received, wherein the control means is arranged to control the movement of the carriage and the operation of the arm in response to receipt of the article selection and payment signals to deliver the selected article from the respective storage location to said delivery location."

Claim 13 of PCT/GB1004/002501 describes: "13. A vending machine according to Claim 12, wherein the cabinet is provided with a transparent panel in one vertical face thereof, and the array of storage locations is positioned with the vertical face thereof opposite to that over which the carriage is movable adjacent to the transparent panel, whereby the contents of all the storage locations are visible from outside the cabinet."

Claim 14 of PCT/GB1004/002501 describes: "14. A vending machine according to Claim 13, comprising a door in the cabinet for the delivery location."

Claim 15 of PCT/GB1004/002501 describe: "15. A vending machine according to Claim 14, wherein the door is provided with a lock controllable by the control means to release the door when the selected article has been delivered to the delivery location."

Referring again to FIG. 5, and in the preferred embodiment depicted therein, it will be seen that pick mechanism 102 is comprised of a comprises of a vacuum chamber 130, which is rigidly mounted to the carriage 132. The vacuum chamber 130 delivers negative air pressure from a vacuum source 131 to elastic suction cup 156.

Figure 16:
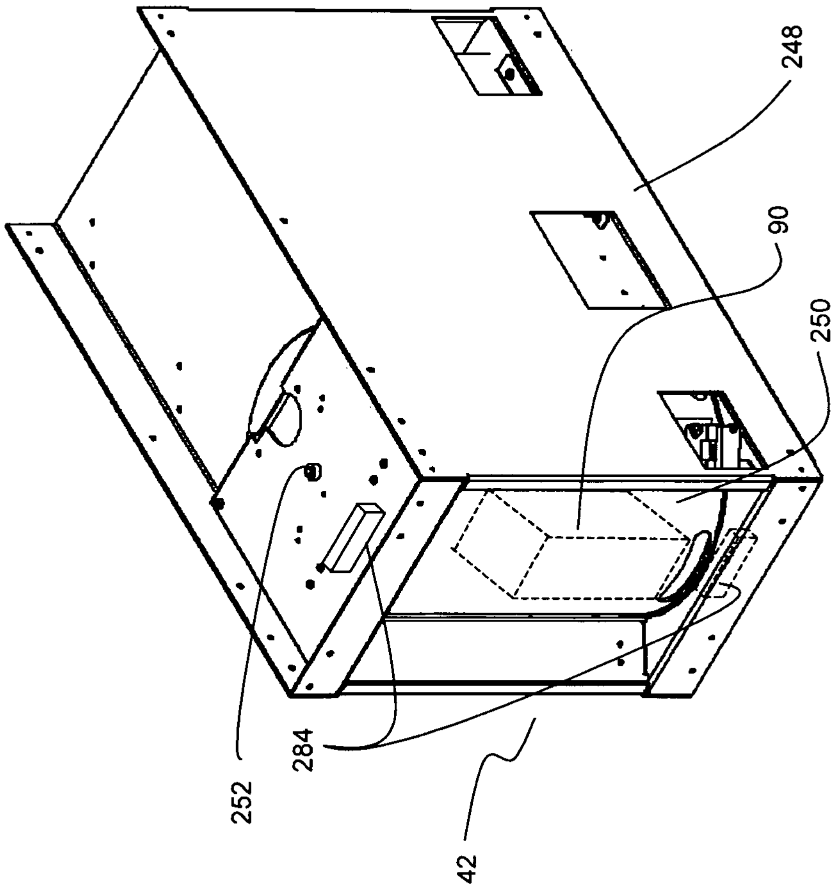
FIG. 16 is a perspective view of a product delivery assembly.

One may use any source of vacuum such as, e.g., the vacuum fan motor 212 and the vacuum fan 214 depicted in FIG. 16. Alternatively, or additionally, one may use other vacuum sources such as, e.g., those disclosed in U.S. Pat. No. 6,148,902 (multiple die casting machines with single vacuum source), U.S. Pat. No. 6,315,524 (pump system with vacuum source), U.S. Pat. No. 6,585,492 (pump system with vacuum source), U.S. Pat. No. 6,830,416 (system and method for securing workpieces to a worktable of a CNC machining system utilizing a low level vacuum source), and the like. The entire disclosure of each of these United States patents is hereby incorporated by reference into this specification.

It is preferred that the vacuum source provide at least 60 inches of water vacuum and, more preferably, at least 80 inches of water of vacuum.

Figure 8:
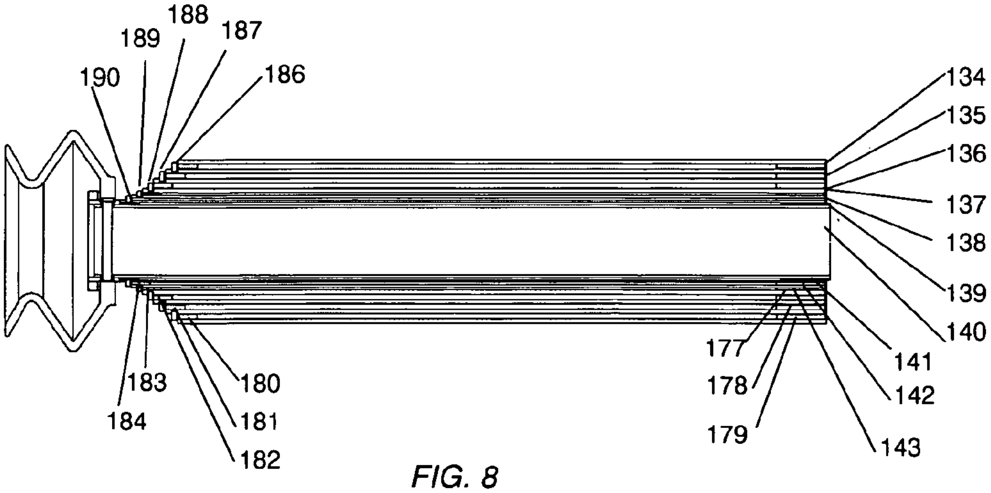
FIG. 8 is a cross-sectional view of a telescoping tube mechanism.

Referring again to FIG. 5, and also to FIG. 8, and in the preferred embodiment depicted, the vacuum chamber 130 is attached to a series of telescoping tubes 134, 135, 136, 137, 138, 139, 140. One may use any of the telescoping tubes known to those skilled in the art. Reference may be had, e.g., to U.S. Pat. No. 3,837,689 (telescoping tube assembly), U.S. Pat. No. 5,465,854 (telescoping tube assembly), U.S. Pat. No. 6,302,124 (umbrella with telescoping tubes), U.S. Pat. No. 6,937,392 (telescope, telescope tube, and telescope mount for supporting a telescope tube), U.S. Pat. No. 7,000,787 (expandable rack assembly with telescoping tube sections), and the like. The entire disclosure of each of these United States patents is hereby incorporated by reference into this specification.

Referring again to FIG. 5, telescoping tube 134 is preferably rigidly affixed to the vacuum chamber 130, and the vacuum chamber 130 is connected to a vacuum source 131. The vacuum pick mechanism 102 is also comprised of means for controlling the vacuum so that one can vary the amount of vacuum supplied depending on whether, e.g., an article is attached or not attached to the suction cup 156. When an article is not attached to the suction cup 156, it is preferred not to have any vacuum applied. When no vacuum is applied, the controller 22 (which is operatively connected to the pick mechanism 102) knows that no article is attached. This feature is further described elsewhere in the specification.

One may use known means for controlling vacuum, and/or for turning the vacuum on or off. Reference may be had, e.g., U.S. Pat. No. 5,143,364 (suction control system for printing or duplicating machines), U.S. Pat. No. 6,827,544 (suction control unit in a plate suction and lifting device), U.S. Pat. No. 6,884,374 (suction control in a suction/blowing mold system), and the like. The entire disclosure of each of these United States patents is hereby incorporated by reference into this specification.

Referring again to FIGS. 5 and 6, a preferred suction control device (a vacuum pressure switch) is disclosed. The vacuum pressure switch 142 is connected to the vacuum chamber 130.

Figure 7:
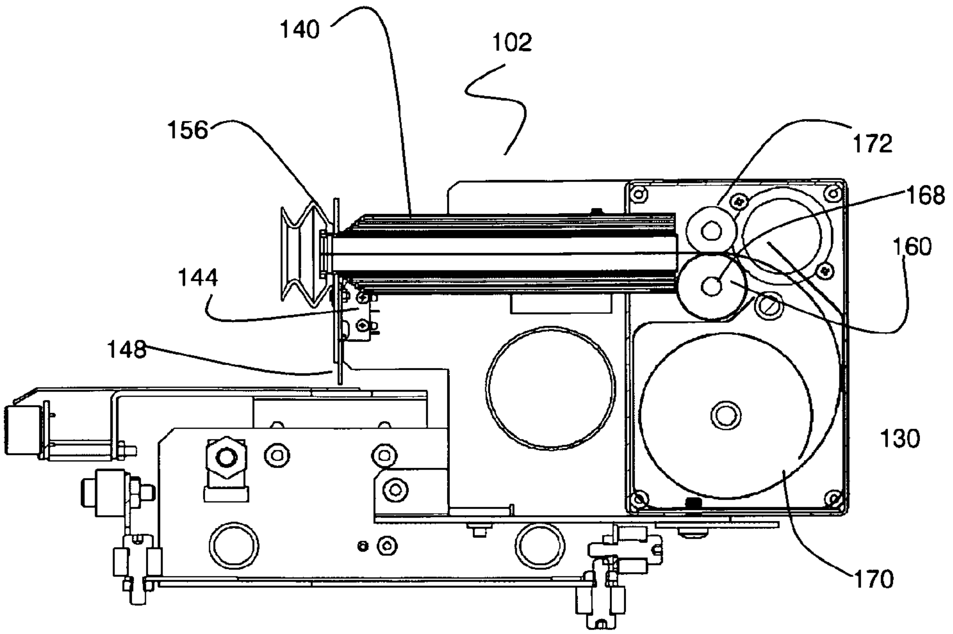
FIG. 7 is a cross-sectional side elevational view of the pick mechanism.
Figure 9:
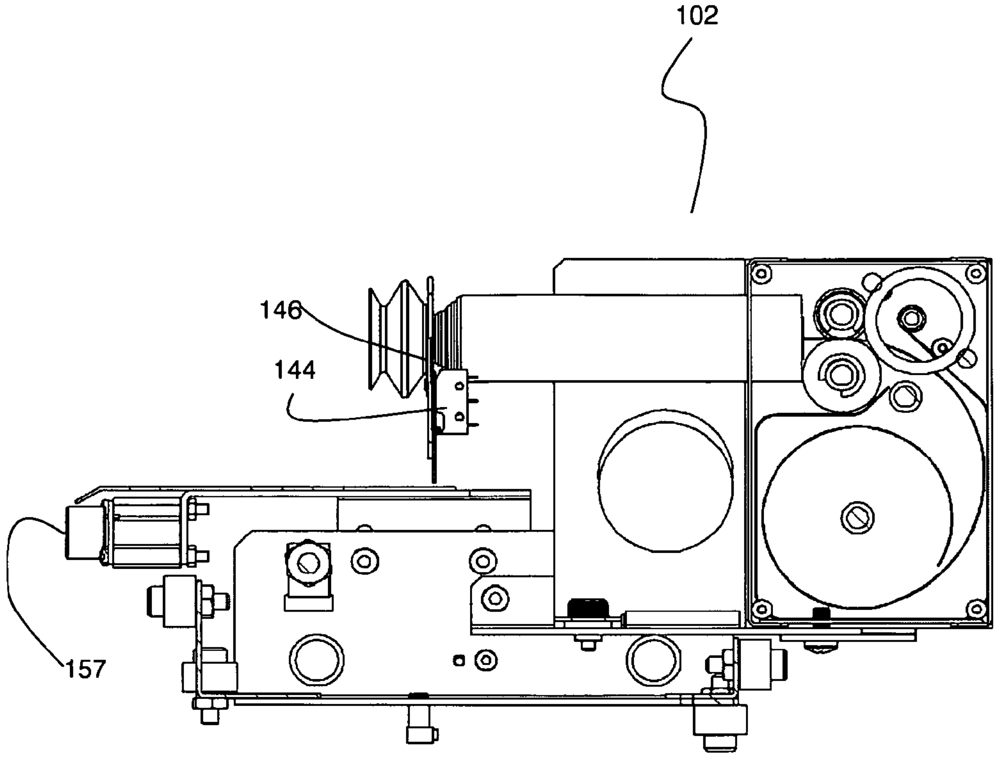
FIG. 9 is another cross-sectional side elevational view of the pick mechanism.

In the embodiment depicted in FIGS. 7 and 9, a snap action or contact switch 144 is connected to the carriage 132 and has a lever 146 that remains in contact with the suction tube 140 when the tube is in the fully retracted position. In the preferred embodiment depicted, a support plate 148 is rigidly attached to the end of suction tube 140 providing support when the tube is fully extended as described below. Without wishing to be bound to any particular disclosure, applicant believes that the tube without the support plate 148 could sag over the length of its extension causing a pick failure. The carriage 132 is operatively connected to a drive belt 150. Rollers 152 ride on the support rail 104. The drive belt 150 is attached to a drive reversible drive motor 154

The telescoping tubes 135, 136, 137, 138, 139, and 140 are preferably connected to a friction drive to cause them to extend or retract. One may use any of the friction drive assemblies known to those skilled in the art. Reference may be had, e.g., to U.S. Pat. No. 4,246,802 (friction drive for converting a rotational movement into an axial movement, or vice versa), U.S. Pat. No. 5,197,343 (friction drive for rotary to linear motion), and the like. The entire disclosure of each of these United States patents is hereby incorporated by reference into this specification.

Instead of using a friction drive, one may use any of the cog drives known to those skilled in the art. Reference may be had, e.g., to U.S. Pat. No. 4,733,617 (driving device for rail vehicles having friction and cog drives). The entire disclosure of this United States patent is hereby incorporated by reference into this specification.

One may use the drive system disclosed in U.S. Pat. No. 3,803,626, the entire disclosure of which is hereby incorporated by reference into this specification. Claim 1 of this patent describes: "1. A motor-driven, telescoping antenna for automobiles, comprising an electric motor having a rotatable armature; an extensible antenna rod passing through the center of the armature and slidable freely with respect thereto, a helically coiled spring (a) fixed to the bottom end of said antenna rod; a rotatable drive tube (d) attached to the bottom end of said armature and rotatable therewith; an angularly bent pin (b) fixed to the bottom end of said drive tube and having one horizontal arm extending between coils of said spring, and a vertical arm extending longitudinally through the center of the spring; said spring having bridges (h) extending between adjacent coils at each end thereof, said bridges being engaged by said pin (b) at the end of the linear travel of said spring during extension or retraction of the antenna, thereby causing said spring to start turning; and a limit switch (e) having a tubular extension (e1) which surrounds said drive tube (d) and spring (a); said extension (e1) being turned by said spring when the latter starts to rotate, thereby actuating said limit switch to switch off the motor."

Referring again to FIGS. 7 and 9, and to the preferred embodiment depicted therein, a motor 158 is affixed to the carriage 132 and connected to a friction drive roller 160 by means of gears 162,163,164,165 and 166, drive shaft 168. A flat spring coil 170 is compressed between the friction drive roller 160 and an idler roller 172. The end of the flat spring coil 170 is rigidly connected to the end of tube 140. Also connected to the tube 140 is an elastic suction cup 156. As motor 158 is energized the gears 162,163,164 and 165 cause the friction drive roller 160 to rotate imparting a friction drive force to the flat coil spring 170 and imparting a force on the end of the tube 140 causing it to move in a linear direction and telescope outwards increasing the length of the telescoping pick mechanism 102.

Figure 5:
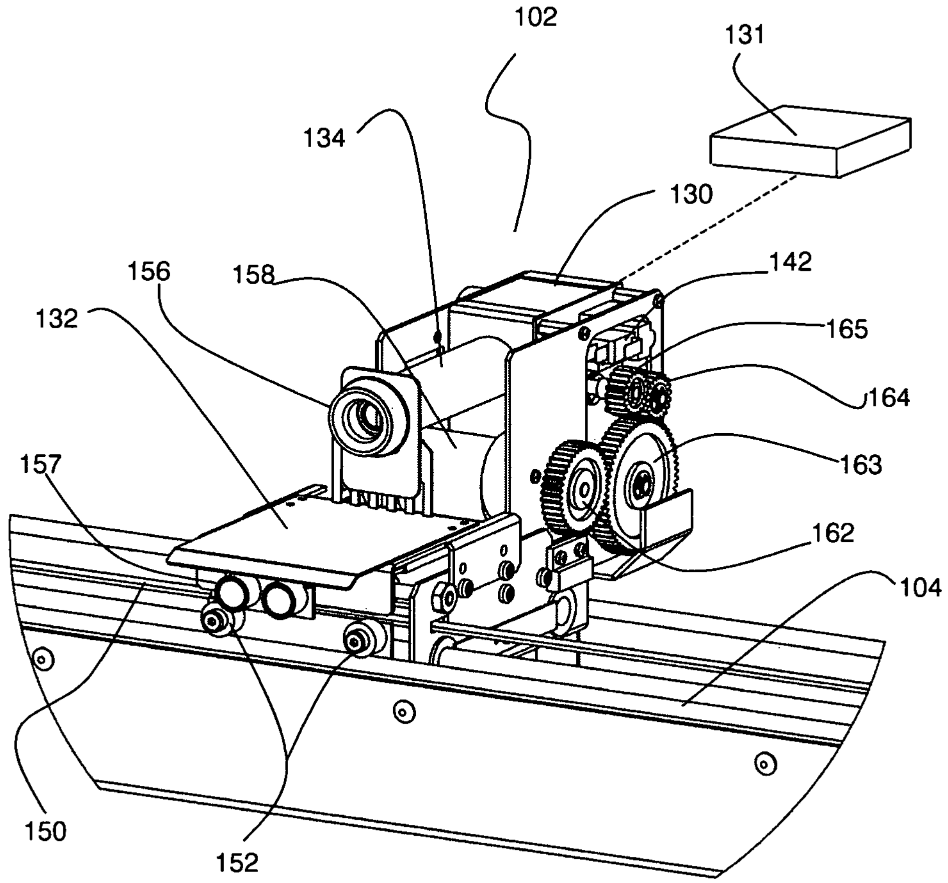
FIG. 5 is a perspective view of a preferred vacuum pick mechanism.
Figure 6:
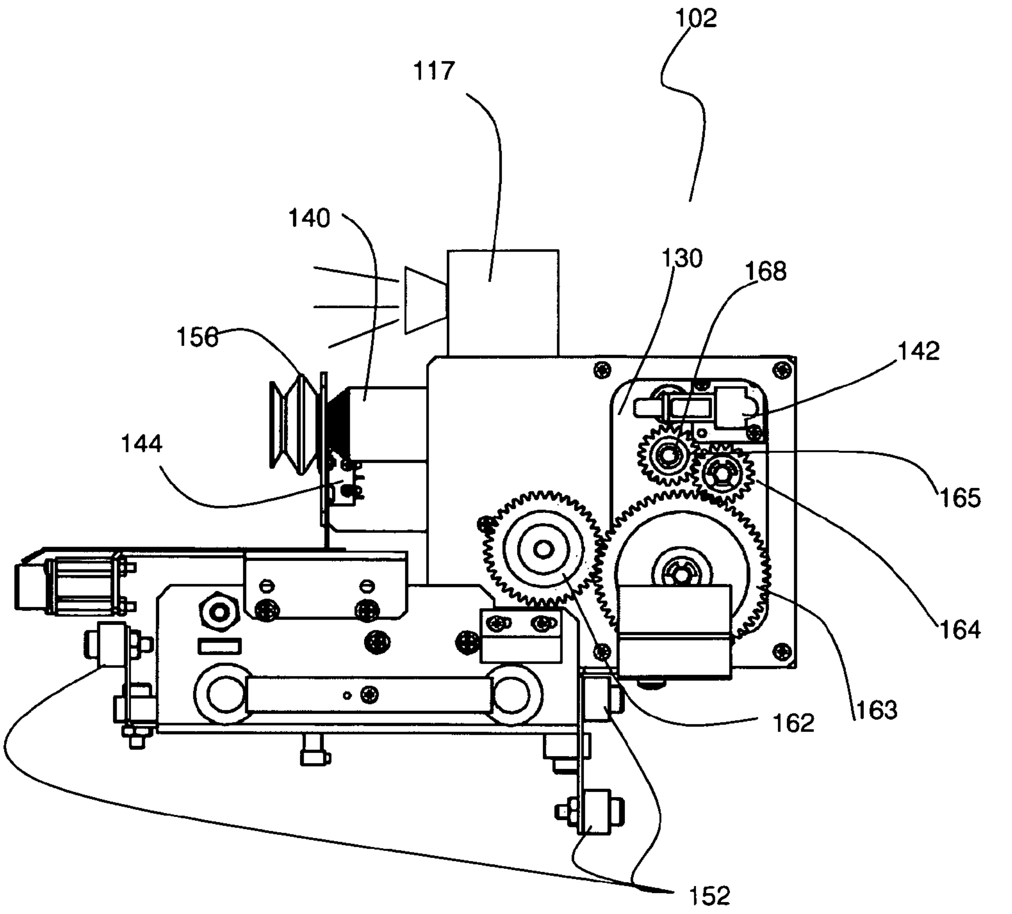
FIG. 6 is side elevational view of the vacuum pick mechanism.

Referring to FIG. 5, and in the preferred embodiment depicted, the suction cup 156 is preferably a bellows suction cup. Such a bellows suction cup is disclosed, e.g., in U.S. Pat. No. 4,582,353 and in claim 1 thereof, which discloses: "1. In cartoning apparatus having a magazine for flat folded cartons, which when erected will have a length L, and a transport conveyor located adjacent said magazine and having leading and trailing transport lugs for conveying erected cartons, a carton feeder located adjacent said magazine and transport conveyor for engaging flat folded cartons in said magazine, erecting said cartons and placing said cartons between said transport lugs, said carton feeder comprising: a channel-shaped element, having parallel legs, said legs being spaced apart approximately a distance L, at least one bellows suction cup mounted on said channel-shaped element and located between said legs, means connected to said suction cup for applying a vacuum to said suction cup, and means connected to said channel-shaped element for moving said channel-shaped element and suction cup between said magazine and said transport conveyor, said suction cup engaging a top wall of said carton and drawing said top wall and a portion of the side walls between the legs of said channel-shaped member to substantially erect the carton and deposit it between leading and trailing lugs of said transport conveyor;" and such suction cup is illustrated in FIGS. 1 and 5A-5C of such patent. The entire disclosure of such United States patent is hereby incorporated by reference into this specification.

Bellows suction cups are also disclosed in U.S. Pat. No. 4,178,839, the entire disclosure of which is hereby incorporated by reference into this specification. Reference may be had, e.g., to FIG. 6.

Bellows suction cups are well known to those skilled in the art and are commercially available, e.g., from the Anver Corp. of 36 Parmenter Road, Hudson, Ma. 01749. One may use, e.g., bellows suction cups that have from about 1.5 to about 2.5 bellows and a diameter of from about of from about 0.7 to about 2.0 inches; suitable bellows suction cups available from Anver Corp. include model B1.5-25-SIT, B1.5-20-SIT, B-1.5-42-SIT.

The bellows suction cup is preferably made from translucent material. It is preferred that the bellow suction cup comprise or consist essentially of silicone rubber. As is known to those skilled in the art, silicone rubber is usually a long-chain dimethyl silicone which will flow under heat and pressure but can be vulcanized by cross-linking the linear chains. Reference may be had.

In one embodiment, the bellows suction cup has a Durometer hardness (Shore A) of less than about 45.

Without wishing to be bound to any particular theory, applicant believes that a bellow cup with the specified properties and made from silicone rubber with the specified hardness operates unexpectedly better than prior art suction cups. Applicant has discovered that suction cups made out of nitrile rubber, or natural rubber, or silicone rubber with a hardness greater than indicated, or non-bellows suction cups, are unexpectedly inferior.

Figure 11:
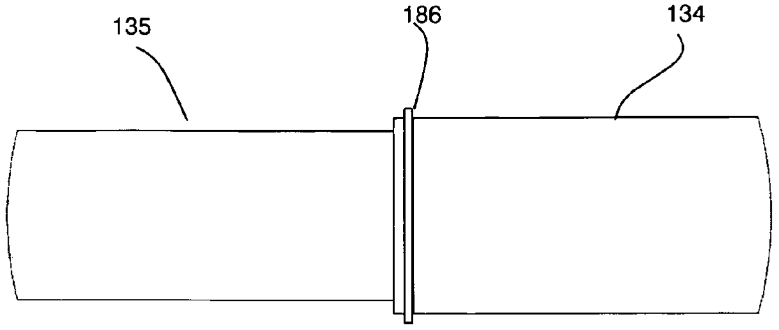
FIG. 11 is a partial side view of the telescoping tube assembly.
Figure 12:
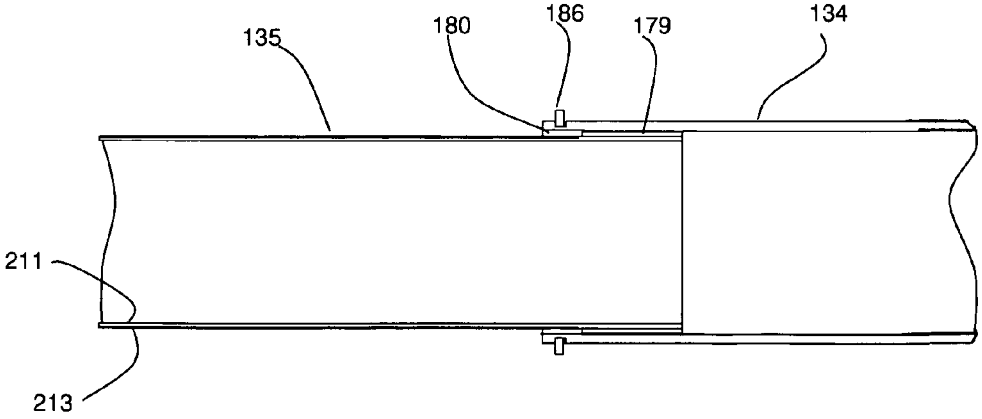
FIG. 12 is a partial side sectional view of the telescoping tube assembly.

Referring to FIG. 11, and in the preferred embodiment depicted therein, it is preferred that the telescoping tubes, such as tube 135, be comprised of a metal alloy material 211 with a coating 213 disposed on top of such material. The metal alloy material is preferably a half hard brass that has a thickness of from about 0.01" to about 0.04." In one aspect of this embodiment, several of the tubes have a thickness of about 0.014", and several of the tubes have a thickness of 0.029".

It is preferred that the coating disposed on top of the half-hard brass have a thickness of from about 0.00005 to about 0.001 inches. In one aspect of this embodiment, the coating is a wear-resistant material such as a chromium plating. As is known to those skilled in the art, chromium plating is widely used where extreme hardness or resistance to corrosion is required, and it utilizes plates up to about 0.05 inches. Reference may be had, e.g., to U.S. Pat. No. 3,730,489 (hard chrome plated vibrating board), U.S. Pat. No. 5,401,379 (chrome plating process), U.S. Pat. No. 6,329,071 (chrome plated parts and chrome plating method), U.S. Pat. No. 6,503,642 (hard chrome plated layer), U.S. Pat. No. 7,011,067 (chrome plated engine valve), and the like. The entire disclosure of each of these United States patents is hereby incorporated by reference into this specification.

As is illustrated, e.g., in FIGS. 8, 10, 11, and 12, the telescoping tubes (such as, e.g., tube 135) are comprised of means for preventing the interior section of the tube from becoming disengaged from the exterior section of the tube. As is illustrated in such Figures, tube 135 is disposed within tube 134; tube 136 is disposed within tube 135; tube 137 is disposed within tube 136; tube 138 is disposed within tube 137; tube 139 is disposed within tube 138; and tube 140 is disposed within tube 139. The overall assembly depicted in FIG. 1 is telescoping tube 205.

Each of the tubes 134 et seq. has a length that preferably is less than about 4.5 inches. The overall length of the telescoping tube assembly 205 (see FIG. 10), when collapsed, is preferably less than about 5 inches; the extended length is at least about 22 inches; and the ratio of the extended length to the collapsed length is at least about 4.0.

A pick mechanism is illustrated, e.g., in FIGS. 4 and 5 of International publication WO 2004/114233. At page 4 of such publication, it is disclosed that "The suction tube 15 is attached to a series of telescoping tubes 16a-16e. Tube 16a is rigidly affixed to the table 11 and connected to the vacuum suction tube 15."

One of the problems with the arrangement depicted in such International publication is that, when tubes 16a to 16e are fully extended, tube 16b will tend to disengage from tube 16a, tube 16c will tend to disengage from tube 16b, etc.; and the assembly will fall apart. This problem is solved by the stop assemblies used in the structure of the instant invention. These stop assemblies are best illustrated in FIGS. 7, 8, 11, and 12.

Referring now to such FIGS. 7, 8, 11 and 12 the tubes 134, 135,136, 137, 138, 139, 140 have external stepped rings 174, 175, 176, 177, 178 and 179 rigidly attached to them. The tubes also have an external stepped ring 180, 181, 182, 183 and 184. As tube 140 extends when the motor 158 is energized, the rings external step rings 174, 175, 176 177, 178 and 179 will eventually contact the internal stop tings 180,181, 182, 183 and 184 causing the tubes to extend outwards. Over travel is thereby limiting by the step ring contact, where one of tubes 134, 135, 135, 136, 137, 138, 139 and 140 may be pushed out of contact with the adjacent tube. When the motor 158 is reversed the forces are then applied in an opposite direction causing the tubes 134, 135, 135, 136, 137, 138, 139 and 140. to collapse. Furthermore stop rings 186, 187, 188, 189 and 190 are rigidly attached to tube 134, 135, 136, 137, 138 139 and 140. The stop rings 186, 187, 188, 189 and 190 impart a force to the adjacent tube causing that tube to be pulled back. The stop rings 186, 187, 188, 189 and 190 also prevent the tubes from over travel in the reverse mode and prevent concentric disengagement of the tubes. Furthermore the tubes 134, 135, 135, 136, 137, 138, 139 and 140 are contracted in such a way as to provide an air path for providing negative pressure (vacuum) at the elastic suction cup 156.

Figure 10:
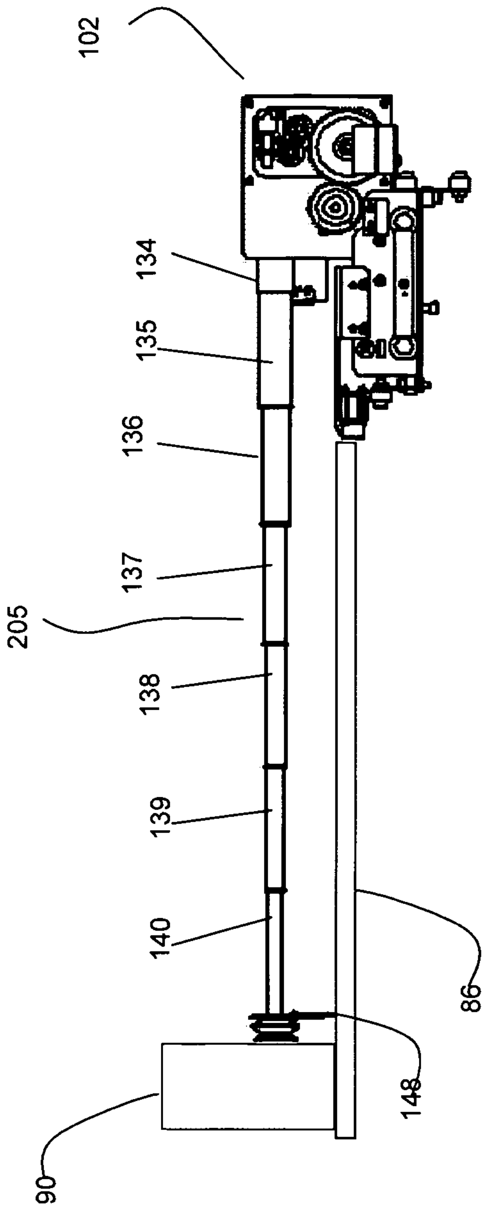
FIG. 10 is side view of the pick mechanism with the vacuum tubes extended.

Referring now to FIG. 10, the telescoping tubes 134, 135, 135, 136, 137, 138, 139 and 140 are shown in a fully extended position. It should be noted that the telescoping tubes 134, 135, 135, 136, 137, 138, 139 and 140 can be extended to any distance between the fully retracted position and the fully extended position, thereby allowing for the retrieval of a product or multiple products in any of the storage locations in the array. The support plate 148 is shown making contact with a product tray 86, 87 and 88 effectively keeping the extended height of the suction cup 156 at the same height as if in the fully retracted position. It will be seen that the articles 90, 92 and 93 (one only shown in the Figure) are positioned directly behind the glass face 79 and 81 at the front of the machine, and the pick mechanism 102 is positioned at the rear of the machine to pull the articles off the trays 86,87 and 88 from the rear of the line of articles on the tray, so that the front article remains visible through the window to assist the customer in selecting the desired article. The articles picked from the tray are then delivered to the product delivery 42, as hereinafter described, for retrieval at the front of the machine.

Figure 13:
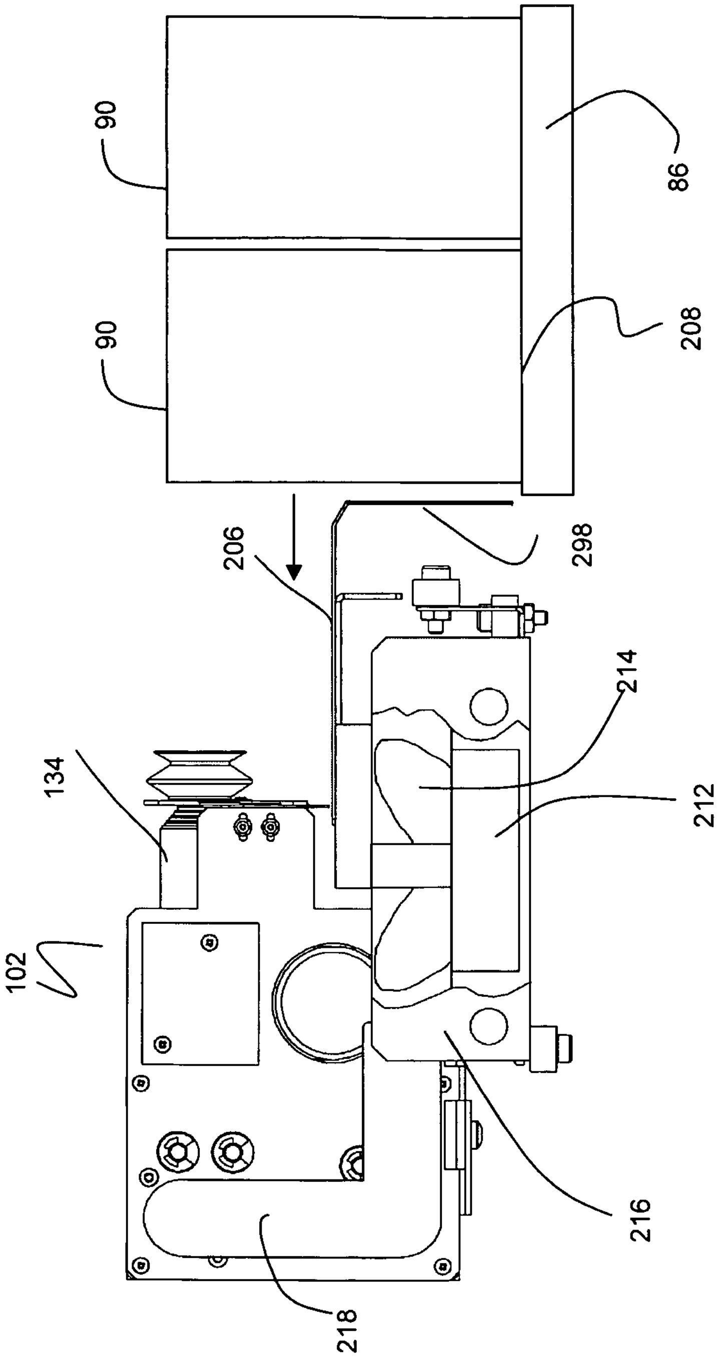
FIG. 13 is a side view of the telescoping assembly.

Referring now to FIG. 13, one possible vacuum source comprises of a vacuum fan motor 212 and a vacuum fan 214 contained in a casing 216, which is rigidly mounted on the pick mechanism 102. A suction tube 218 extends between the casing 216 and the vacuum chamber 130 in turn connected to the telescoping tubes 134-140. It may be also apparent to those skilled in the art, that the vacuum source may reside separately form the pick mechanism 102 and be connected to the pick mechanism by a standard vacuum hose.

Figure 14:
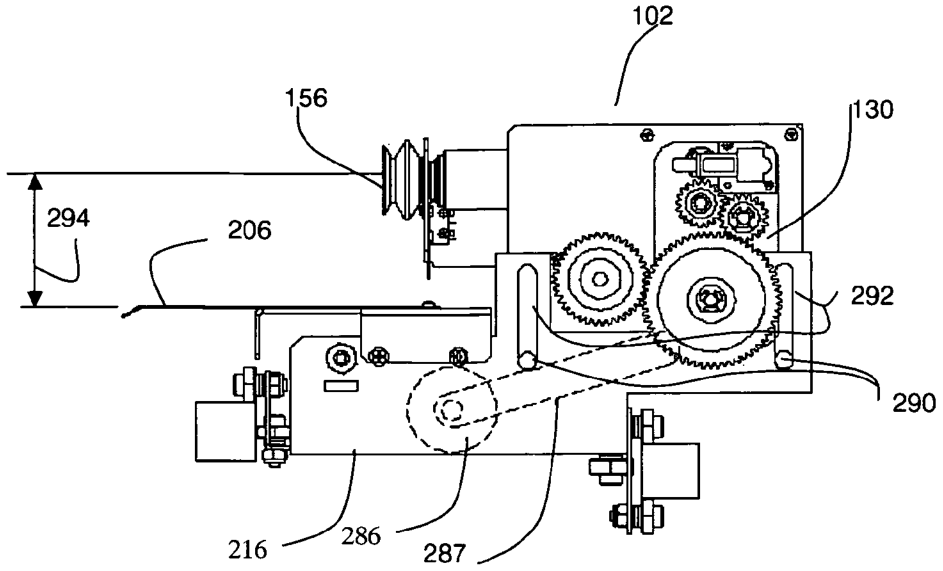
FIG. 14 is another side view of the vacuum pick mechanism.
Figure 15:
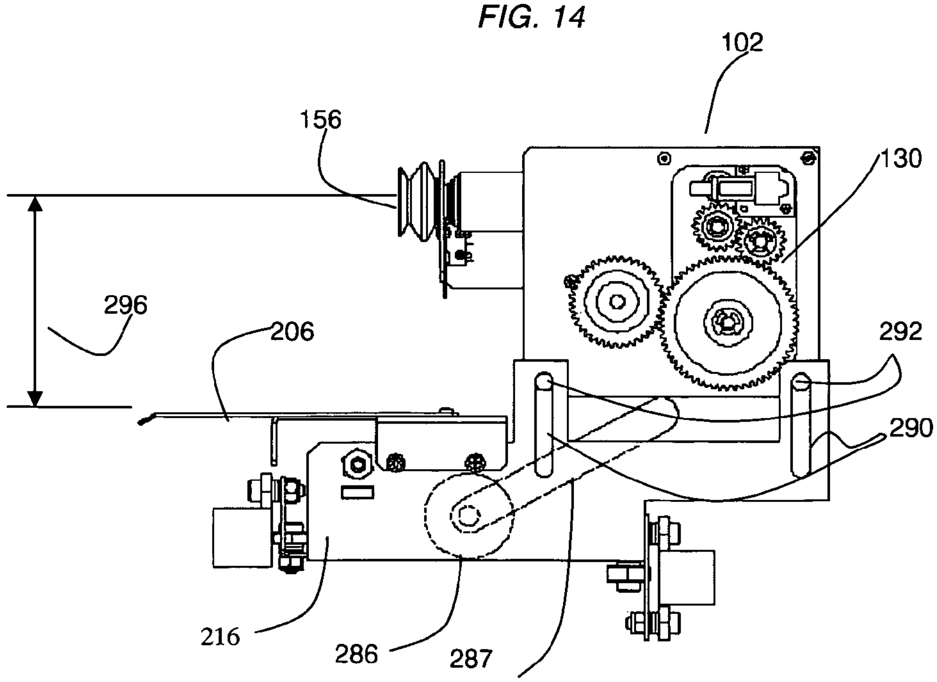
FIG. 15 is yet another side view of the vacuum pick mechanism.

FIGS. 14 and 15 illustrate an apparatus and a process for moving the suction cup 156 relative to the carrier tray 206, to allow for optimum product attachment on the vertical axis. A reversible motor 286 is rigidly connected to casing 216 and attached to arm 287. A series of slots 290 are in the casing 216 and receive pins 292 on the vacuum chamber 130. The controller 22 turns the motor 286 causing the arm 297 to contact the bottom of the vacuum chamber 130 and allowing it to raise or lower depending on the need. The relative distance as indicated by arrows 294 and 296.

Figure 17:
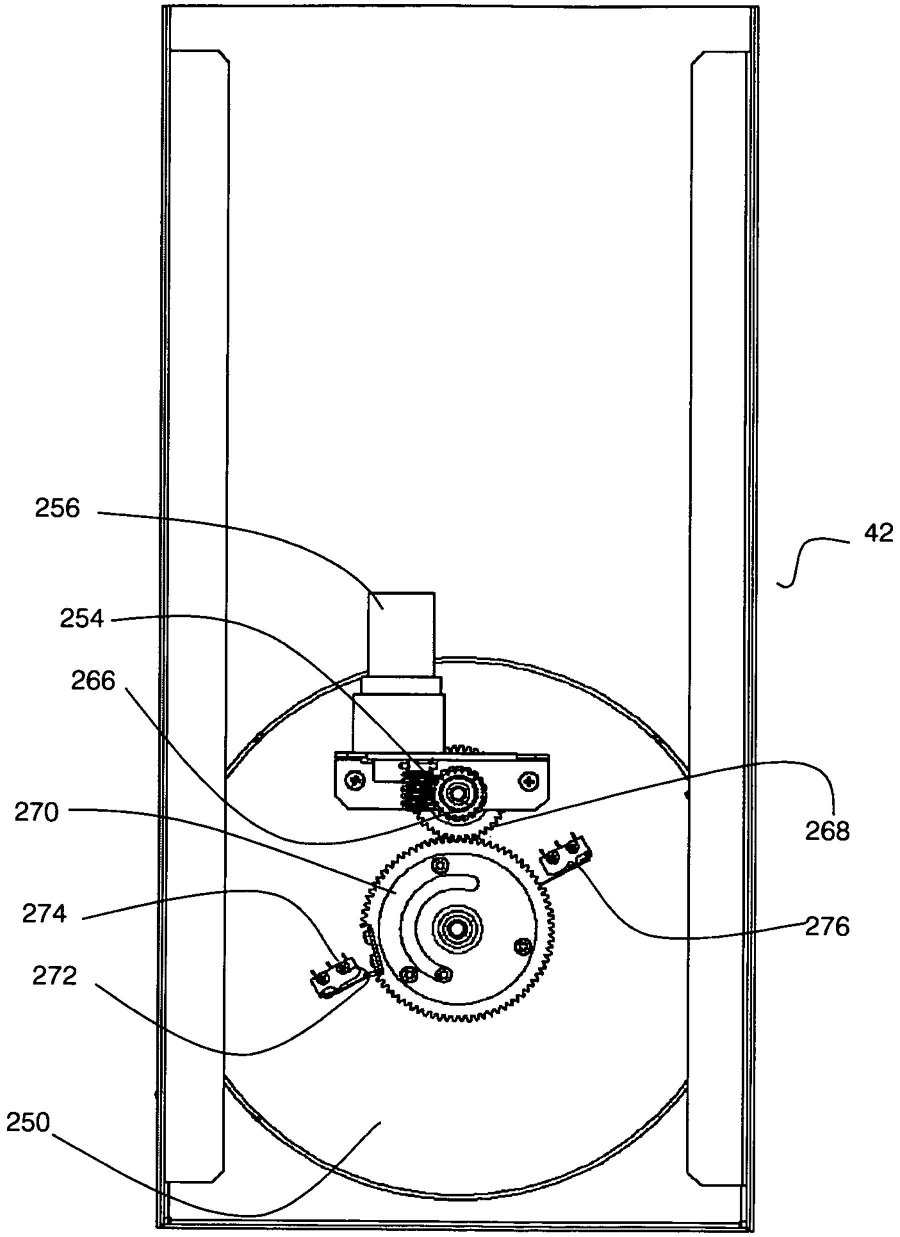
FIG. 17 is a bottom view of the product delivery assembly.
Figure 18:
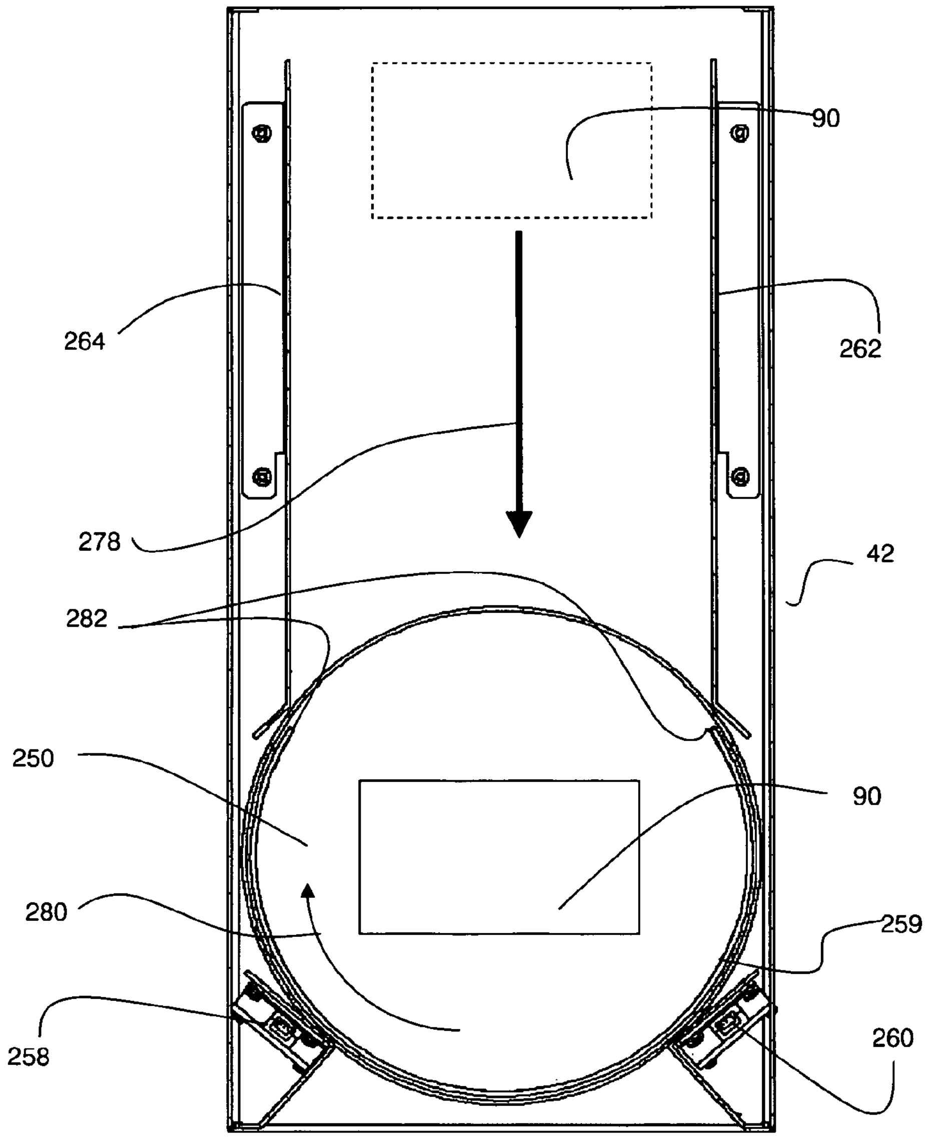
FIG. 18 is a cross-sectional plan view of the product delivery assembly.

Referring now to FIGS. 16, 17, 18, a preferred product delivery unit 42 is illustrated. As is shown, e.g., in FIG. 16. In the embodiment depicted, the lock controllable product delivery door 42, comprises a frame 248, a rotating drum 250, axially mounted bushings 252 pivotally mounted to the frame 248 for means of rotating the drum 250, a worm gear 254 driven by a motor 256, two optical sensors 258 and 260, and guide walls 262 and 264.

The drum 250 is operatively connected to the controller 22. It may be caused to rotate by conventional means. Thus, e.g., and is illustrated in such Figures, a worm gear 254 is engaged with a worm wheel 266, which is rigidly connected to a spur gear 268, the spur gear being engaged with a driven gear 270. The driven gear 270 is rigidly mounted to the drum 250. An actuator is rigidly mounted to the driven gear 270 and makes contact with one of two switches 274 and 276 when the drum is fully opened or fully closed. The worm gear 254 provides the locking force required to keep the drum 250 locked in the closed or open position. When an article 90 is delivered to the product delivery door 42, the vacuum tubes 234-240, extend to push the article 90 into the rotating drum 250 in the direction of arrow. If one of the optical sensors 258 or 260 is blocked by article 90, a signal is sent to the controller causing the motor 254 to rotate in the direction of arrow 280 and open the drum 250. When the drum 250 rotates, the article can be retrieved from the drum through an opening 282. When the article 90 is removed, the sensor 258 or 260 is unblocked and the controller causes the motor 254 to reverse, closing the drum 250 to a full locked position. A sensor array 285 is mounted to the frame 248 so as to allow scanning of the product 90 when positioned in the drum 250. The sensor array may use optical scanning technology such as bar code scanning or may us radio frequency-scanning method know as RFID. When the drum 250 rotates, as described above, the product identification typically is printed directly on the product 90 or embedded into an RFID tag on the product 90, can then be recognized by the machine controller 22. This information can be used for inventory control and insurance that the correct product has been delivered.

As will be apparent, this arrangement provides certain advantages. In the first place, the assembly described can determine whether, in fact, the article has actually been delivered to a customer. If it is determined that a delivery has not occurred, the machine controller 22 will not charge the customer and can enter into a "recovery mode" or an "out of service condition." This feature is described in more detail in the process section of the case.

Another advantage is that, during delivery of product to the assembly 42, a user cannot access the internal portions of the machine to steal product or vandalize the machine. Reference may be had to, e.g., FIG. 18 which illustrates that, when product is being delivered, the machine logic causes aperture 282 to close so that, if one sticks his or her hand in the direction of arrow 278, the hand will be blocked by wall 259.

Yet another advantage, and referring to FIG. 17, is that the worm drive gear 254, when it is not moving, effectively locks the drum 250 so that, if one manually attempts to move the drum, he or she will be foiled.

The device 10 may be used with conventional display and storage systems. Thus, e.g., one may use one or more of the display and storage disclosed in U.S. Pat. No. 4,938,364 (presentation display storage system), U.S. Pat. No. 5,411,146 (shelving display and storage system for bulk container items), U.S. Pat. No. 6,227,388 (display and storage system), U.S. Pat. No. 6,460,279 (custom display and storage system), and the like. The entire disclosure of each of these United States patents is hereby incorporated by reference into this specification.

Figure 19:
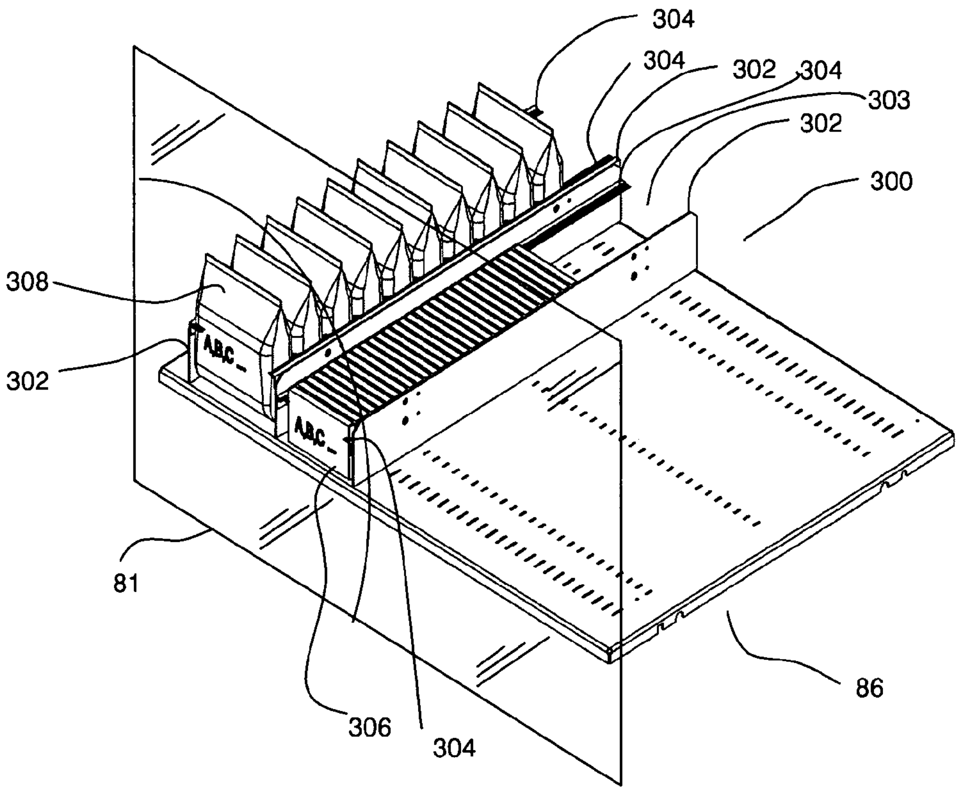
FIG. 19 is a perspective view of a shelf assembly.

FIG. 19 is a schematic view illustrating one preferred display and storage system 300 that that may be used in conjunction with device 10. Such display and storage system 300 is comprised of a display glass 81 and a support shelf 86; the support shelf may be similar to those used in used in cooler, freezer or vending machine as normally used in a point of sale location.

Referring again to FIG. 19, a multiplicity of sidewalls 302 define a channel 303 in which objects can be placed. A bristle brush 304 is preferably rigidly attached to the sidewalls 302. Sample products 306 and 308 are placed between opposing sidewalls 302 and opposing bristle brushes 304.

Figure 20:
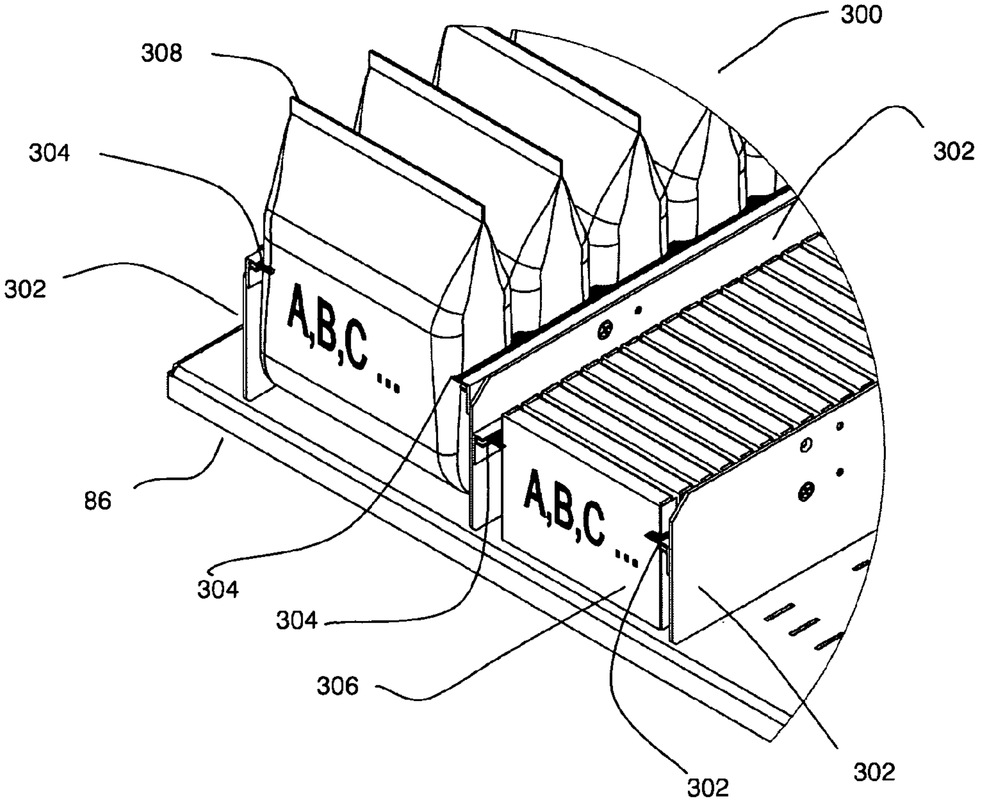
FIG. 20 is a partial perspective view of a shelf assembly.

FIG. 20 is close up view of the apparatus 300. Referring to FIG. 20, and in the preferred embodiment depicted therein, the opposing bristle brushes 304 make contact with products 306 and 308 and allow them to stand upright in the shelf. Without wishing to be bound to any particular theory, applicant believes that such bristle brushes are especially adapted to maintain product 306 and 308 in a standing position but to readily facilitate their removal form the support shelf 86.

These bristle brushes are well known. Reference may be had, e.g., to U.S. Pat. No. 3,384,915 (multiple compliant bristle brush), U.S. Pat. No. 3,500,491 (bristle brush), U.S. Pat. No. 5,327,608 (moving bristle brush), U.S. Pat. No. 6,968,848 (retractable bristle brush), and the like. The entire disclosure of each of these United States patents is hereby incorporated by reference into this specification.

The bristles brushes 302 are preferably made of a flexible material allowing them to conform to the shape of the objects 306 and 308. The bristles brush 304 are of sufficient strength to hold the objects 306 and 3087 in an upright position, allowing the point of sale customer to see them in a normal viewing orientation.

Again referring to FIG. 19, after a selection by the point of sale customer is made, the rear object 307 in the channels can be retrieved by means of any robotic method. The remaining products 306 and 308 in the channels will remain in their position.

Figure 21:
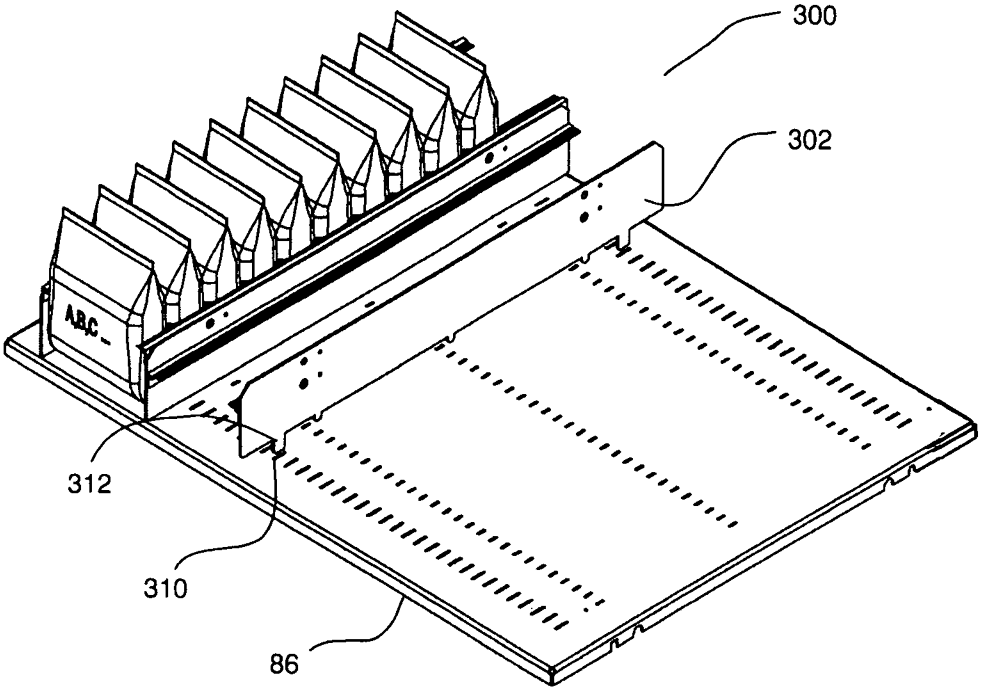
FIG. 21 is a perspective view of a shelf assembly.

FIG. 21 shows the sidewalls 302 disengaged from the shelf 86. A series of slots 310 in the shelves and a series of tabs 312 on the sidewalls, align in such a way as to allow the sidewalls to be moved to various slots 310 on the support shelf 86 allowing the bristle brushes 304 to be adjusted for best resistance on the product 306 and 308 and allowing a variety of product widths to be used. It is also obvious that the sidewalls 302 can be used without the Bristol brushes 304 for any product not requiring side resistance to stand upright.

Figure 22:
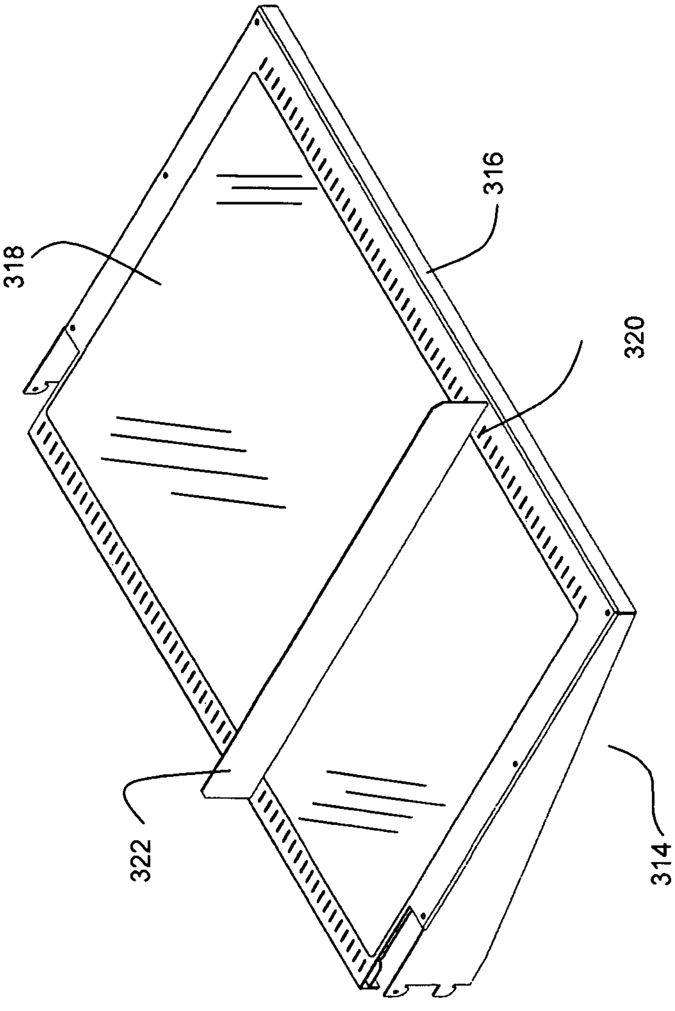
FIG. 22 is a perspective view of a shelf assembly.

Now referring to FIG. 22, a shelf 314 is comprised of a frame 316 and a glass plate 318. The frame 314 has a series of slots 320 orientated to accept the sidewall 322.

The frame 316 can accept any number of sidewalls 322. The glass plate 318 allows light to pass through the shelves 314 or a series of shelf's enabling the products 36 to be highly visible.

Figure 23:
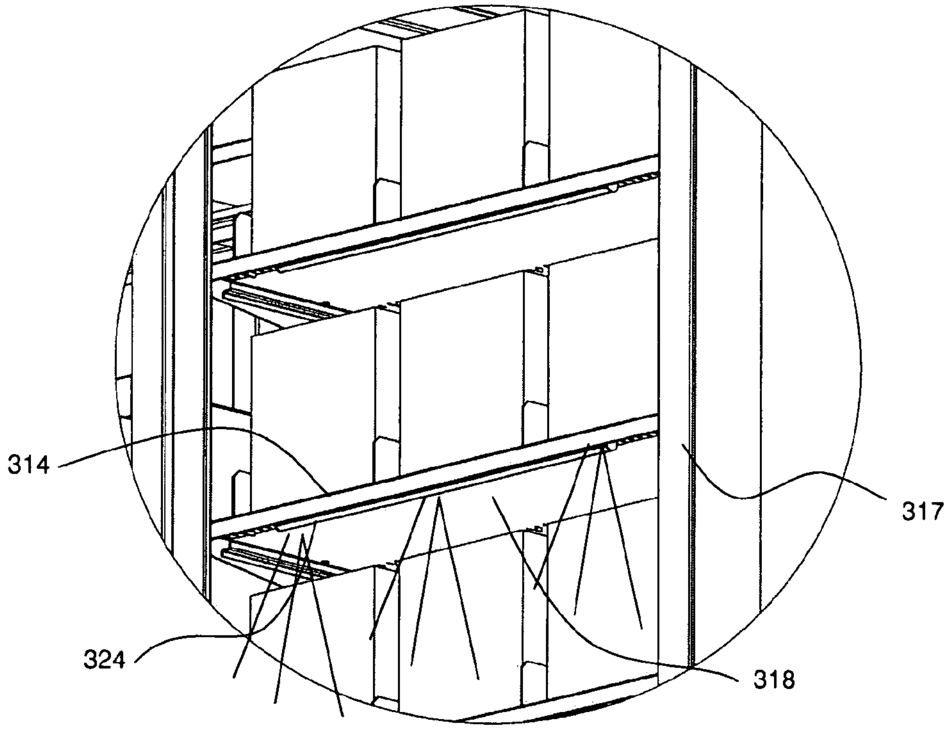
FIG. 23 is a perspective view of a shelf assembly.

FIG. 23 illustrates a shelving assembly 317 that is comprised of a light source 324 that is rigidly attached to the bottom of the shelf 314. The light source 324 can illuminate through the glass plate 318. The light source can provide, e.g., fluorescent, incandescent, or LED lighting; in one embodiment, it provides daylight. The light source 324 can be used with shelf 86 as described elsewhere in this specification to cause products below it to be illuminated.

Figure 24:
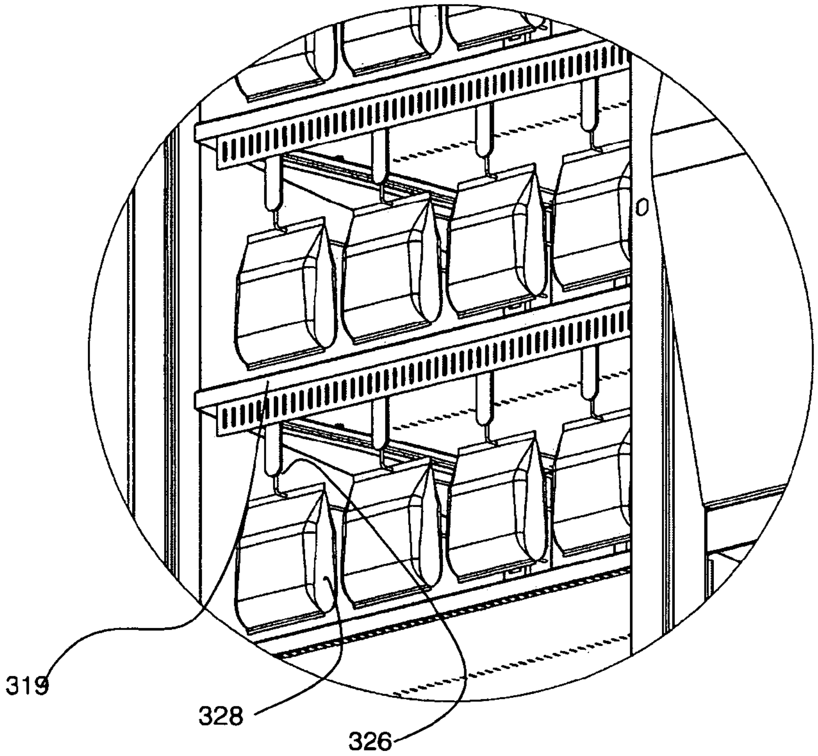
FIG. 24 is a perspective view of a shelf assembly.

FIG. 24 show a shelving assembly 319 that is comprised of a shelf 86 with an array of hooks 326 attached below it. The hooks 326 can be used hang an array of products 328 to it.

Referring to FIGS. 25, 26, 27 and 28 a refrigeration module 350 is disclosed that may be disposed in device 10 behind either door 78 and/or door 80. Thus, and referring to FIG. 3, the refrigeration unit 350 may be disposed on top of lower frame 64, beneath upper frame 60, between supports 54 and 58, and between standards 50 and 53.

The refrigeration module 350 is comprised of a multiplicity of insulated panels that preferably include side panels 352 and 354, a top panel 356, and a bottom panel 357; the module also includes a series of shelves 358.

The refrigeration module preferably includes a refrigeration deck 368. These refrigeration decks are well known. Reference may be had, e.g., to U.S. Pat. No. 4,781,310 (beverage dispenser), U.S. Pat. No. 4,801,048 (beverage dispenser), U.S. Pat. No. 5,335,988 (foil access cover for refrigeration deck), U.S. Pat. No. 6,581,389 (merchandiser using slide-out stirling refrigeration deck), and the like. The entire disclosure of each of these United States patents is hereby incorporated by reference into this specification.

Referring again to FIGS. 25, 26, 27, and 28, the module 350 can fit into the cabinet 44 as described above. The shelves 358 are preferably comprised of a horizontal frame 360 that has a reversible motor 362 rigidly attached to it. The motor 364 is connected through a link 364 to a hinged panel 366. The hinged panel 366 is connected to the frame 360. When a product that is refrigerated is vended, the controller 22 causes the motor 362 to rotate and open the panel 366 exposing the product to the ambient environment and allowing the pick mechanism 102 to actively capture the product and deliver to the end user. Refrigerated air can be delivered through any of the four side panels 352, 353,354, 355, top panel 356 or bottom panel 357.

Figure 29:
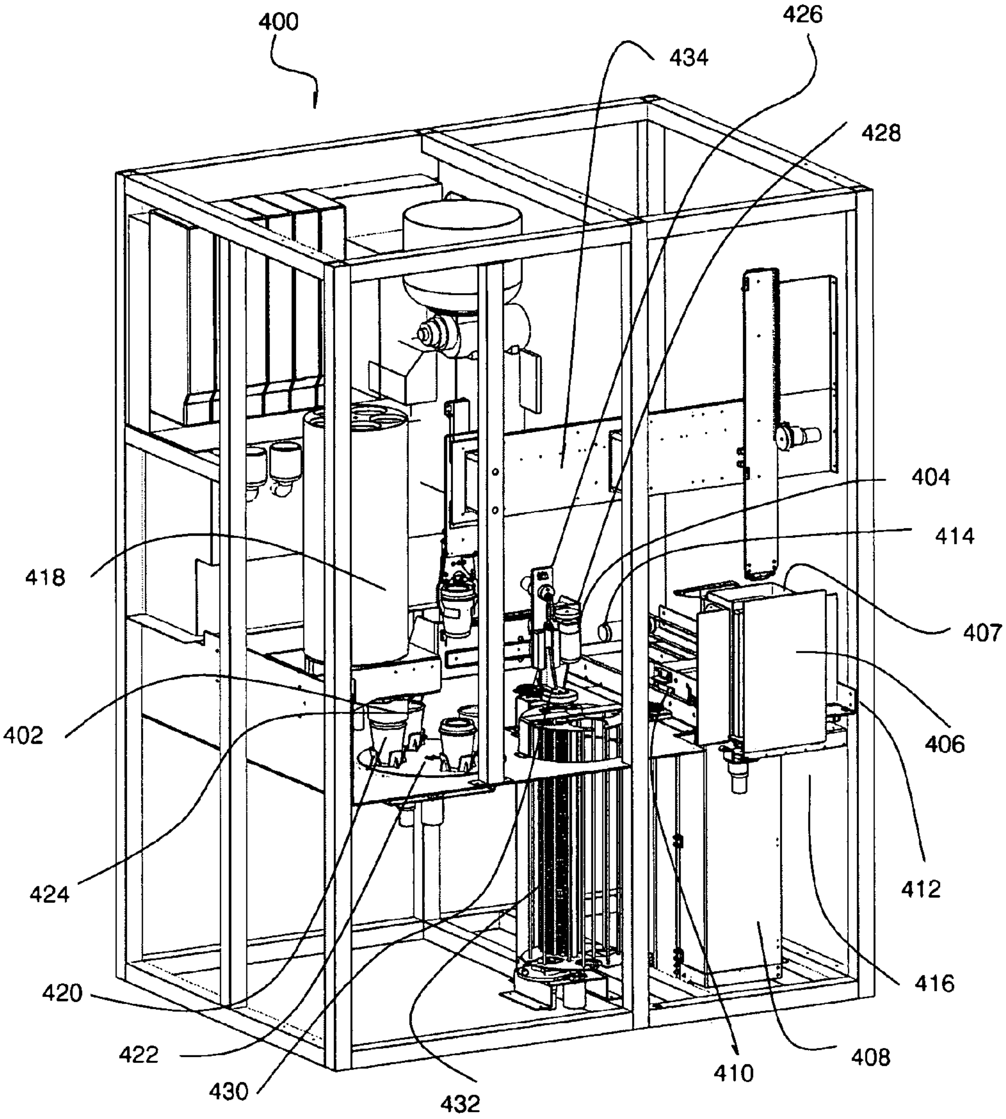
FIG. 29 is front isometric view of a bagging station and a lid placement station.
Figure 30:
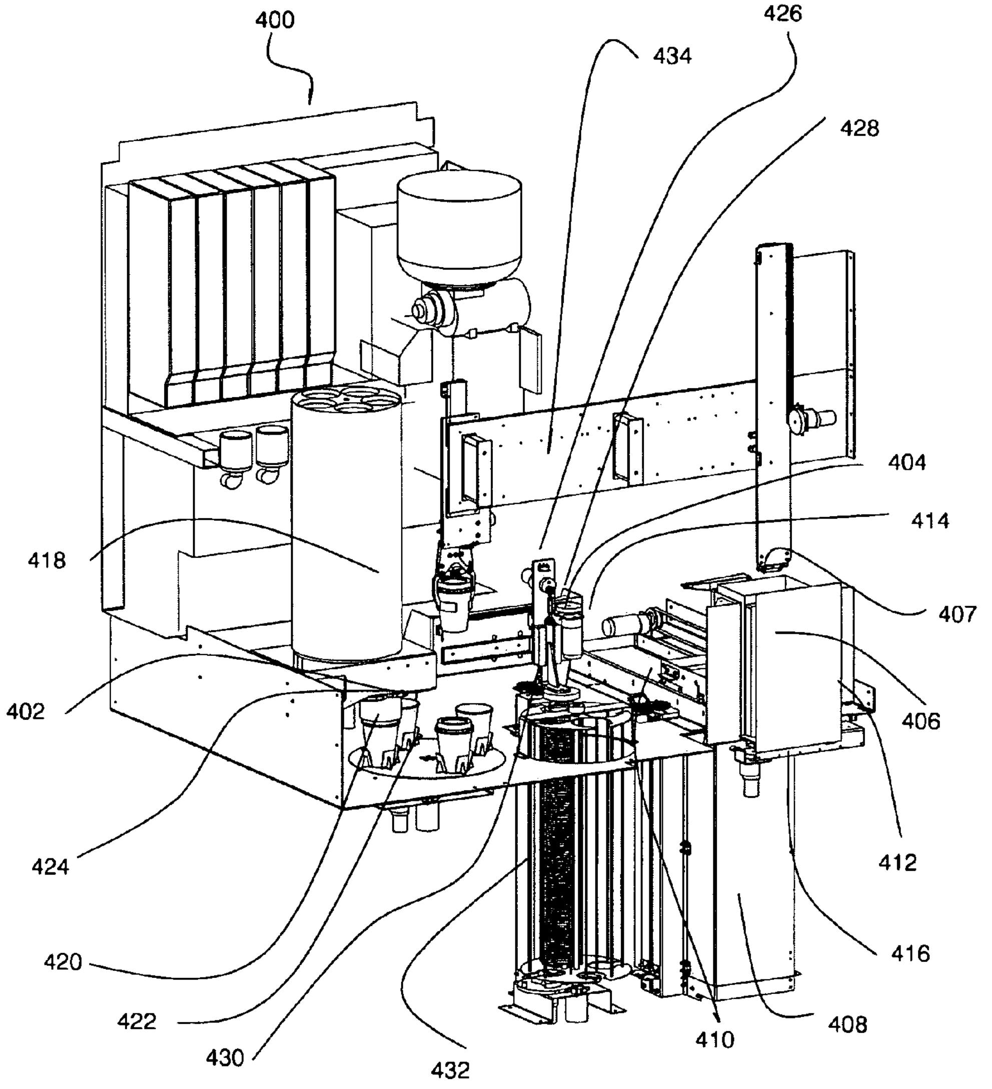
FIG. 30 is another isometric view of a bagging station and a lid placement station; and bagging station.

Referring now to FIGS. 29 and 30, an automatic bagging station and a beverage lid placement station 400 is comprised of hot/cold beverage fill mechanism 402, a cup lid mechanism 404 and a bagging station 406. The automatic bagging station and a beverage lid placement station 400 can be easily adapted to fit into the same style of cabinet 44 as described above.

A bagging station 406 is comprised of a bag storage bin 408, a vacuum bag pick manifold 410, and a vacuum bag-expanding manifold 412. The bag storage bin 408 comprises an elevator 414 that holds empty folded bags in storage. The bag pick manifold 410 is mounted on a linear transport 414 and fixed in such a way as to rotate form vertical to horizontal. The bag picks mechanism 410 and is operatively connected to a vacuum source. The bag pick manifold 410 rotates horizontally and makes contact with the upper most bags 407 in the bag storage bin and effectively seals the bag to the manifold 410 by vacuum pressure. The manifold 410 then rotates vertically and moves linear until the bag 407 makes contact with the bag expanding mechanism 412, which uses the same vacuum sources as the bag pick manifold 410. The bag pick manifold 410 then reveres causing the bag 407 to expand to an open position. When the bag 407 is in the open position it can receive product from a chute or other means as described below. The door 416 then opens to allow the customer to obtain their products. Multiple items can be place in the expanded bag prior to delivery.

A cup carousel 418 common to those skilled in that art drops a cup 420 onto a rotating cup transport 422. The rotating cup transport 422 then rotates the cup 420 to a fill station 424 where either a cold or hot beverage is dispensed into the cup 420. The cup 420 then further rotates on the cup transport 422 and stops at a lid placement station 426. A cup lid mechanism 428 then picks a lid 430 from the lid storage carousel 432 and places the lid 30 onto the cup 420. A cup gantry mechanism 434 then lifts the cup, with the lid 430 in place the cup gantry 434 lifts transports the cup it to the bag station 406. The cup gantry 34 then lowers the cup 420 into the expanded bag 407. A door 416 then opens and allows the customer to take the filled beverage cup 420. After the cup 420 is removed the door 436 closes and waits for the next cycle to begin.

Referring now to FIGS. 29 and 30, an automatic bagging station and a beverage lid placement station 400 is comprised of hot/cold beverage fill mechanism 402, a cup lid mechanism 404 and a bagging station 406. The automatic bagging station and a beverage lid placement station 400 can be easily adapted to fit into the same style of cabinet 44 as described above.

A bagging station 406 is comprised of a bag storage bin 408, a vacuum bag pick manifold 410, and a vacuum bag-expanding manifold 412. The bag storage bin 408 comprises an elevator 414 that holds empty folded bags in storage. The bag pick manifold 410 is mounted on a linear transport 414 and fixed in such a way as to rotate form vertical to horizontal. The bag picks mechanism 410 and is operatively connected to a vacuum source. The bag pick manifold 410 rotates horizontally and makes contact with the upper most bags 407 in the bag storage bin and effectively seals the bag to the manifold 410 by vacuum pressure. The manifold 410 then rotates vertically and moves linear until the bag 407 makes contact with the bag expanding mechanism 412, which uses the same vacuum sources as the bag pick manifold 410. The bag pick manifold 410 then reveres causing the bag 407 to expand to an open position. When the bag 407 is in the open position it can receive product from a chute or other means as described below. The door 416 then opens to allow the customer to obtain their products. Multiple items can be place in the expanded bag prior to delivery. Alternatively, multiple bags may be delivered as a result of only one payment, each of which may contain one or more items.

One may use any of the bagging stations known to those skilled in the art. Alternatively, or additionally, one may use any of the vacuum bag pick manifolds, and/or vacuum bag-expanding manifolds, and/or bag storage bins known to those skilled in the art in place of one or more of the preferred embodiments of these devices illustrated.

Figure 31:
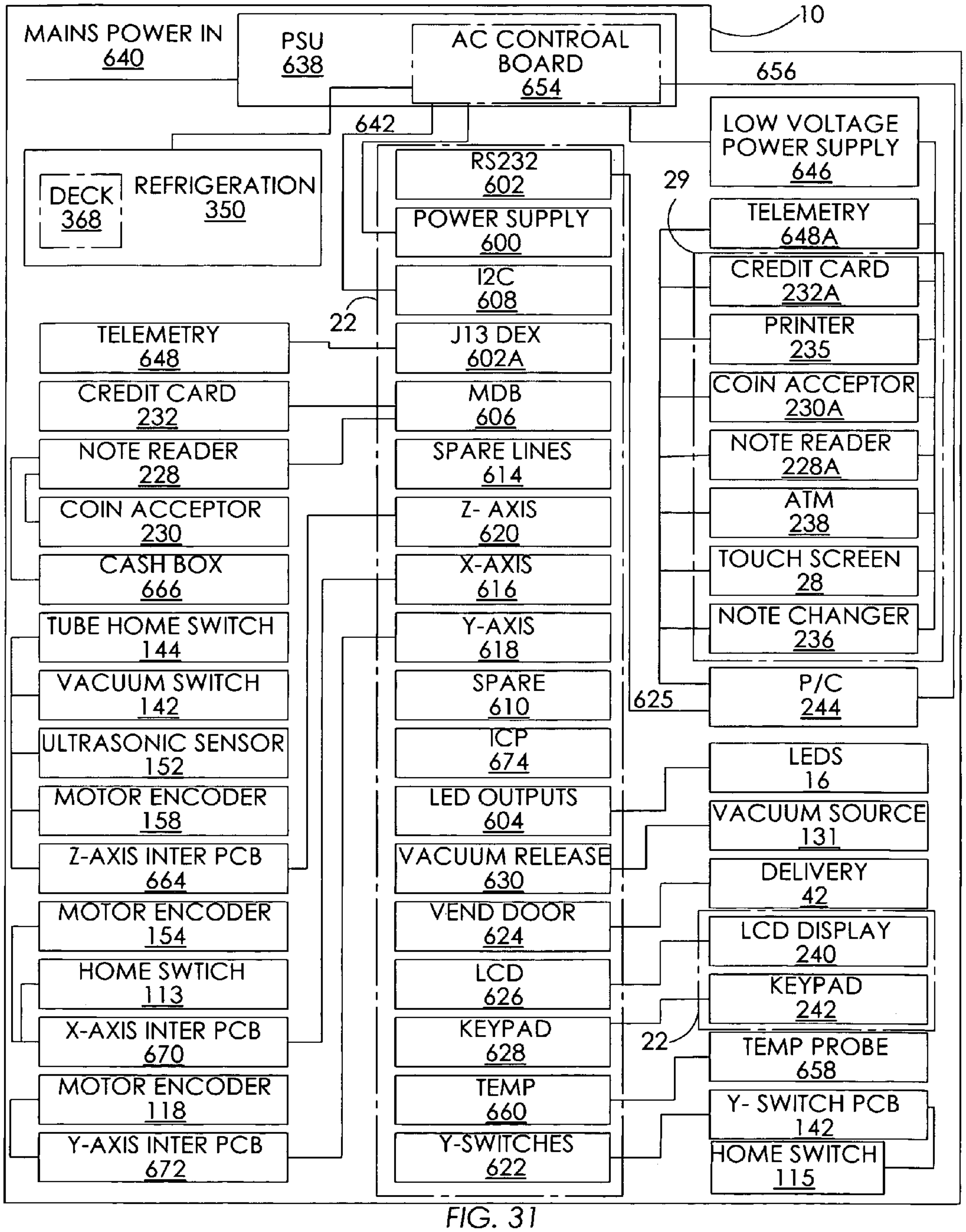
FIG. 31 is a block diagram of on preferred vending machine.

FIG. 31 is a block diagram of one preferred vending machine system 10. As the term "vending machine" is used in this specification, if refers to any apparatus that stores and dispenses one or more articles. Thus, one or more of the devices depicted in FIG. 31 and/or the processes depicted in FIG. 31 and/or the software used in conjunction with FIG. 31 may be used to modify the devices and processes depicted in such prior art vending machines as those described in U.S. Pat. No. 3,653,480 (automatic vending system), U.S. Pat. No. 3,935,933 (automatic article vending machine), U.S. Pat. No. 4,051,978 (merchandising compartmenting arrangement for an automatic vending machine), U.S. Pat. No. 4,319,698 (automatic cup drink vending machine), U.S. Pat. No. 4,428,828 (goods discharge mechanism and goods storage and discharge system of automatic vending machine), U.S. Pat. No. 4,600,094 (automatic vending machine with rotational dispensing function), U.S. Pat. No. 4,636,963 (control system for automatic vending machine), U.S. Pat. No. 5,154,272 (controller for an automatic vending machine), U.S. Pat. No. 5,238,097 (serpentine-type merchandise storing and dispensing column for automatic vending machine), U.S. Pat. No. 5,914,886 (goods selecting apparatus and method for automatic vending machine), U.S. Pat. No. 6,062,277 (driving method of automatic vending machine), U.S. Pat. No. 6,394,309 (automatic vending machine for dispensing products in a hangable paper or plastic bag), U.S. Pat. No. 6,467,648 (product delivering device and product delivering method of automatic vending machine), U.S. Pat. No. 6,571,150 (management method of automatic vending machine and automatic vending machine), and the like. The entire disclosure of each of these United States patents is hereby incorporated by reference into this specification.

Referring to FIG. 31, and to the preferred embodiment depicted therein, it will be seen that vending machine system 10 is comprised of one or more vending machine controllers (such as, e.g., 22 and the graphical interface 29. Furthermore, it is preferred to additional control devices such as, e.g., P/C 244; these additional devices will be described elsewhere in the specification.

The vending machine controller 22 may be any of the vending machine controllers conventionally used for vending machines. Thus, by way of illustration and not limitation, one may use the controllers described in U.S. Pat. No. 5,154,272 (controller for an automatic vending machine), U.S. Pat. No. 5,197,588 (controller for vending machine), U.S. Pat. No. 5,595,869 (vending machine controller and system), U.S. Pat. No. 6,839,775 (method and apparatus for vending machine controller configured to monitor and analyze power profiles for plurality of motor coils to determine condition of vending machine), and the like. The entire disclosure of each of these United States patents is hereby incorporated by reference into this specification.

The vending machine controller described in U.S. Pat. No. 5,595,869 is of illustrative of what may be used in applicant's system, in whole or in part. Claim 1 of this patent describes: 1. A vending-machine controller comprising: a programmable processor controlling operation of the vending machine; a first serial port connected to the programmable processor; an arbitrator operable in a hunt mode to monitor an input from each of at least two serially-communicating devices, respectively, to determine that a communication session is being initiated by one of the serially-communicating devices if activity is present upon an input, and to connect the first serial port of the programmable processor to the serially-communicating device that first initiates a communication session; and a second serial port configured as one of a multi-drop bus interface and a VCCS bus interface for connecting the programmable processor to a multi-drop bus or a VCCS bus, respectively."

In the preferred embodiment depicted in FIG. 31, controller 22 is an embedded controller. These embedded controllers are well known and are described, e.g., in U.S. Pat. No. 6,948,098 (circuits and methods for debugging an embedded processor and systems using the same), U.S. Pat. No. 6,976,136 (flash memory protection scheme for secured shared BIOS implementation in personal computers with an embedded controller), U.S. Pat. No. 6,859,886 (IO based embedded processor clock speed control), U.S. Pat. No. 6,985,441 (intelligent embedded processor enabled mechanism to implement RSVP function), U.S. Pat. No. 7,139,077 (using an embedded processor to implement a finite state machine), U.S. Pat. No. 7,281,228 (configurable memory system for embedded processors), U.S. Pat. No. 7,283,549 (method for increasing the transmit and receive efficiency of an embedded ethernet controller), U.S. Pat. No. 7,340,596 (embedded processor with watchdog timer for programmable logic), U.S. Pat. No. 7,350,178 (embedded processor with watchdog timer for programmable logic), and the like. The entire disclosure of each of these United States patents is hereby incorporated by reference into this specification.

As is known to those skilled in the art, an embedded controller is a device that performs embedded control. In an embedded control system, the I/O system is not connected to an external PC but, instead, the processor running the system is actually incorporated into the I/O chassis itself. Reference may be had, e.g., to U.S. Pat. No. 5,999,863 (microcontroller embedded control circuit for model railroads), U.S. Pat. No. 6,636,528 (method for operating a switching device upon utilization of different signaling protocols and apparatus therefore), U.S. Pat. No. 6,766,391 (embedded control unit), U.S. Pat. No. 6,898,076 (modular information processing system), U.S. Pat. No. 7,350,113 (control method, system, and program product employing an embedded mechanism for testing a system's fault handling capability), U.S. Pat. No. 6,942,571 (gaming device with directional and speed control of mechanical reels using touch screens), and the like. The entire disclosure of each of these United States patents is hereby incorporated by reference into this specification.

Figure 32:
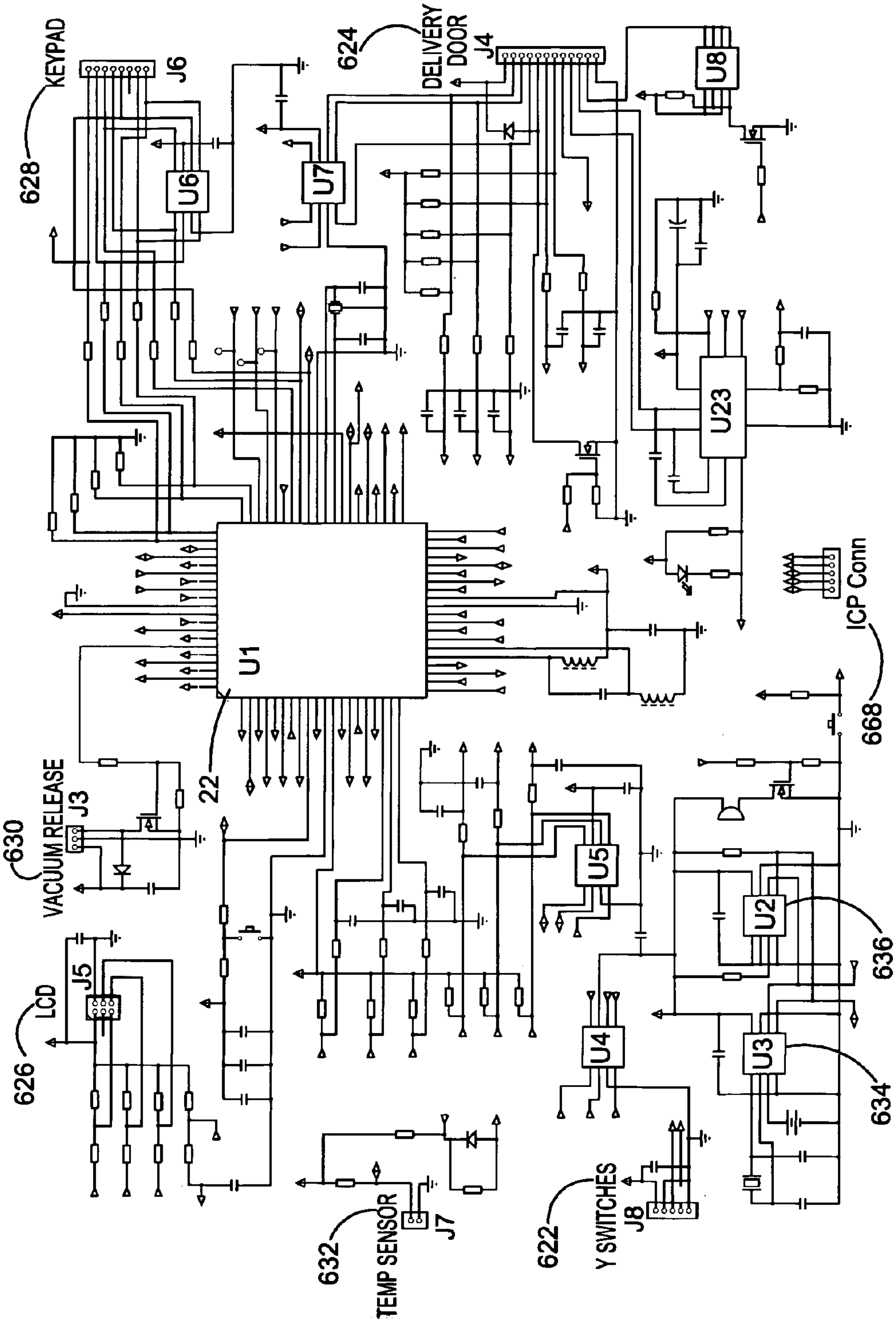
FIG. 32 is an electrical schematic of the control board for one preferred vending machine.
Figure 32A:
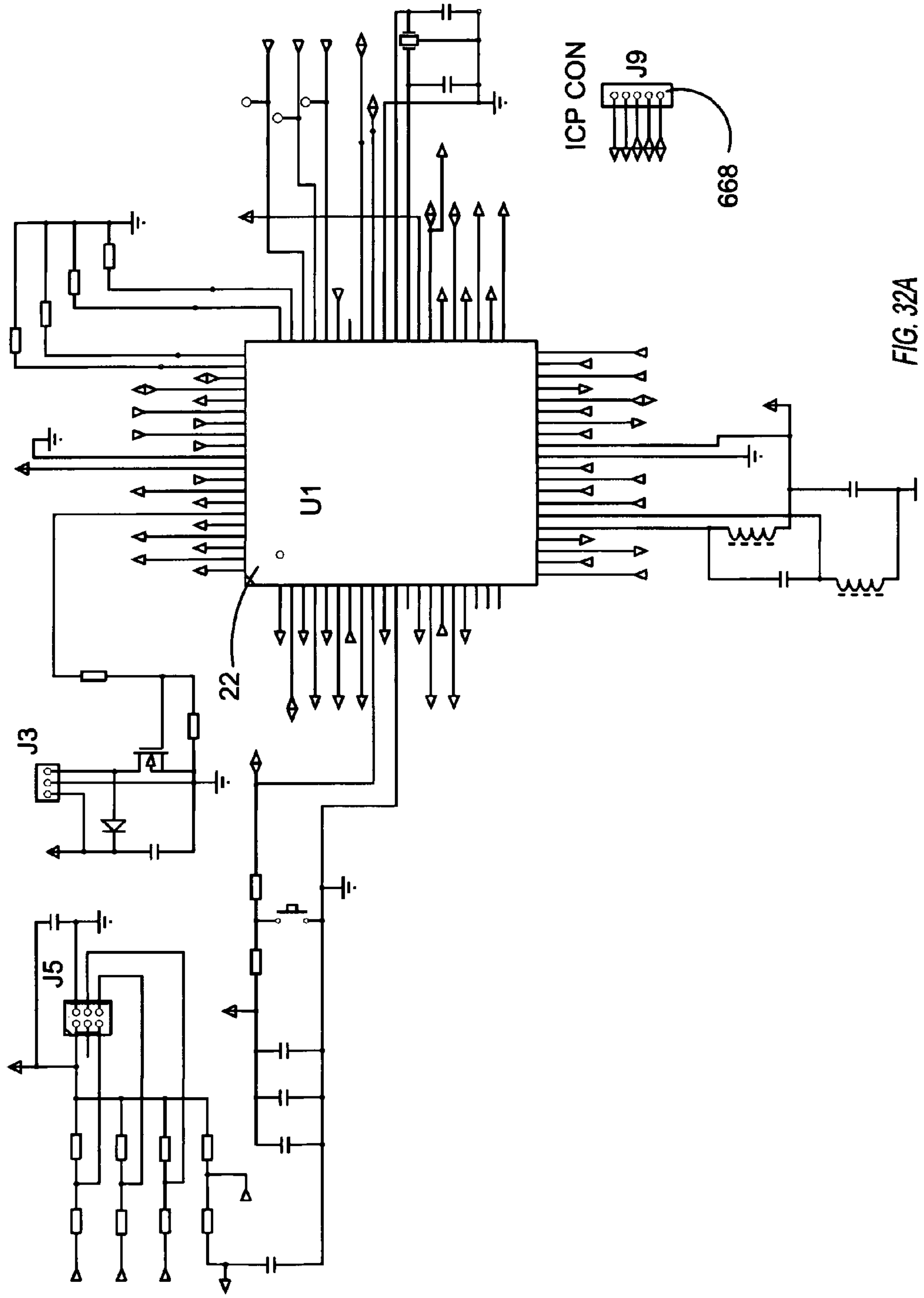
Figure 32B:
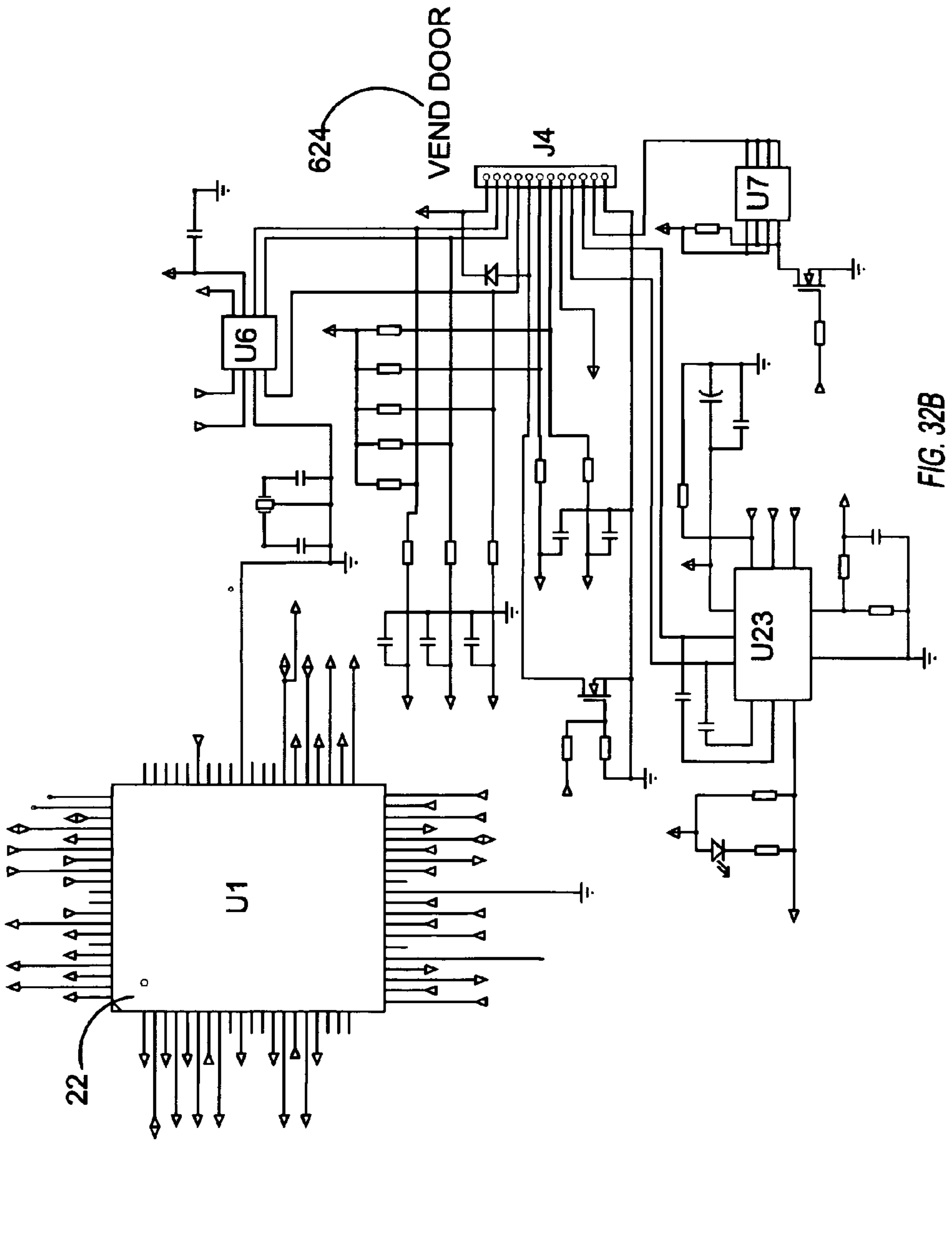
Figure 32C:
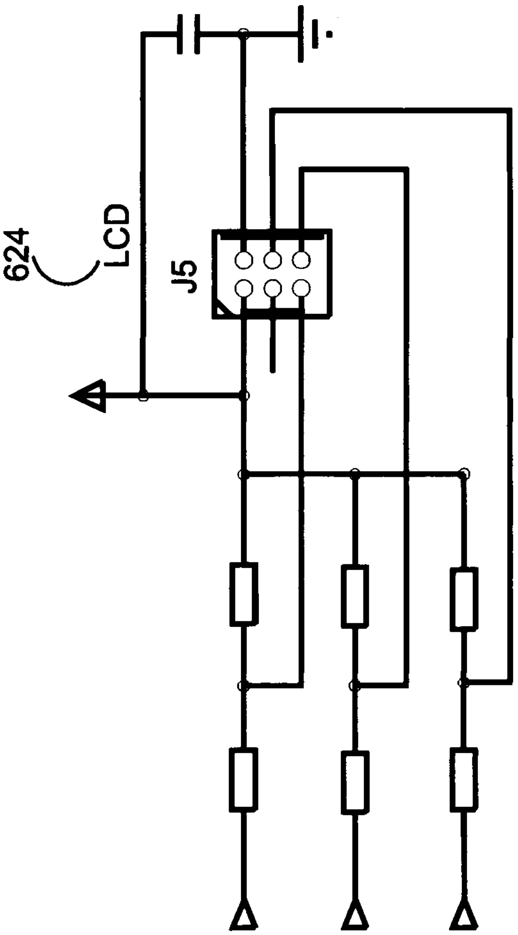
Figure 32D:
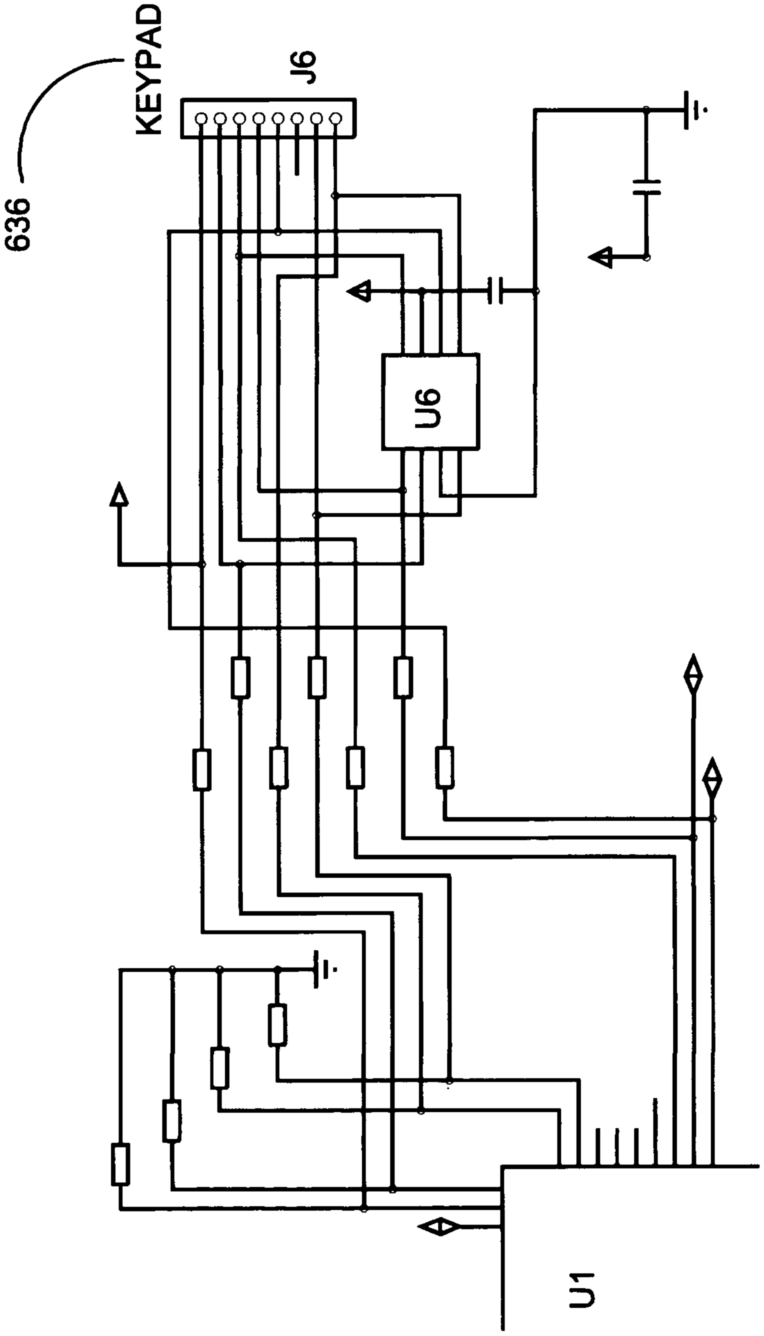
Figure 32E:
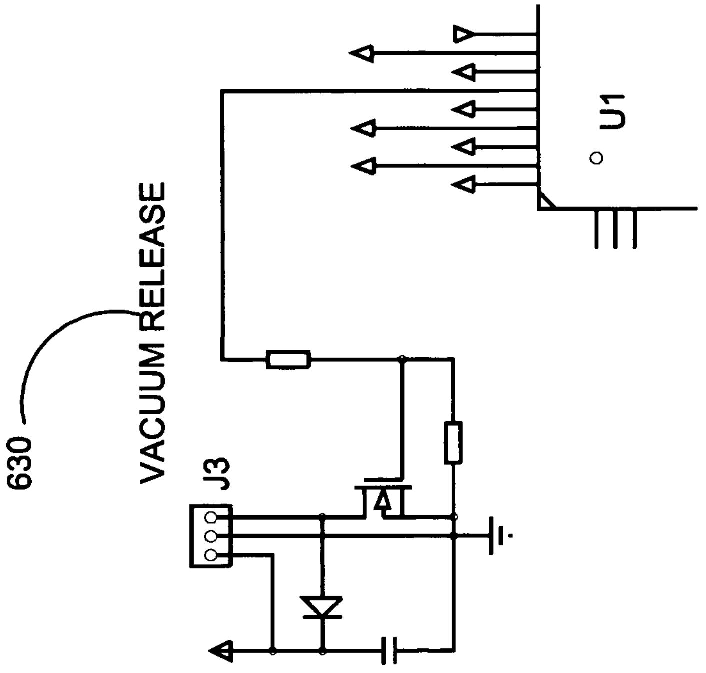
Figure 33:
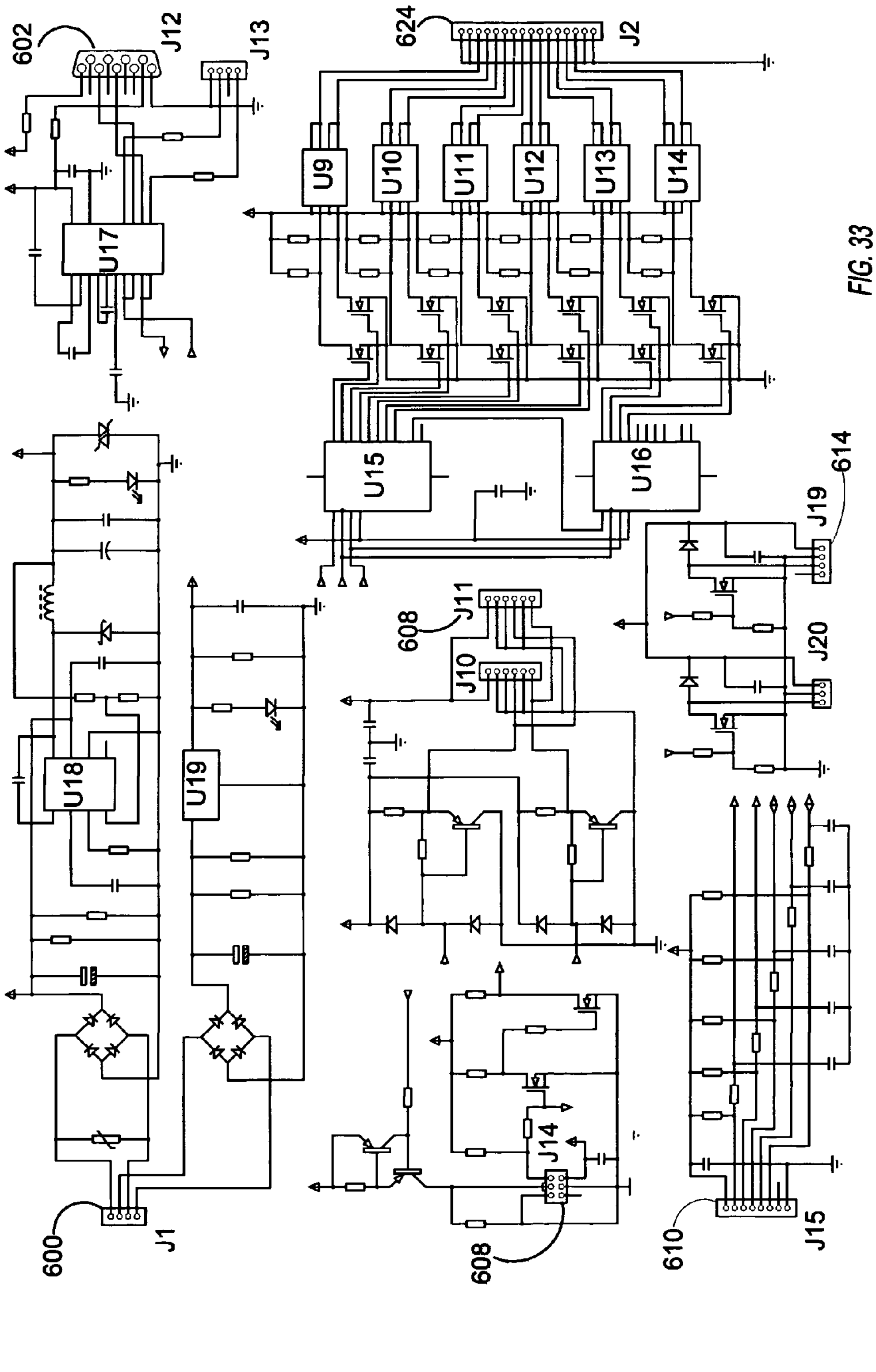
FIG. 33 is a partial electrical schematic of a portion of a control board for one preferred vending machine.
Figure 34:
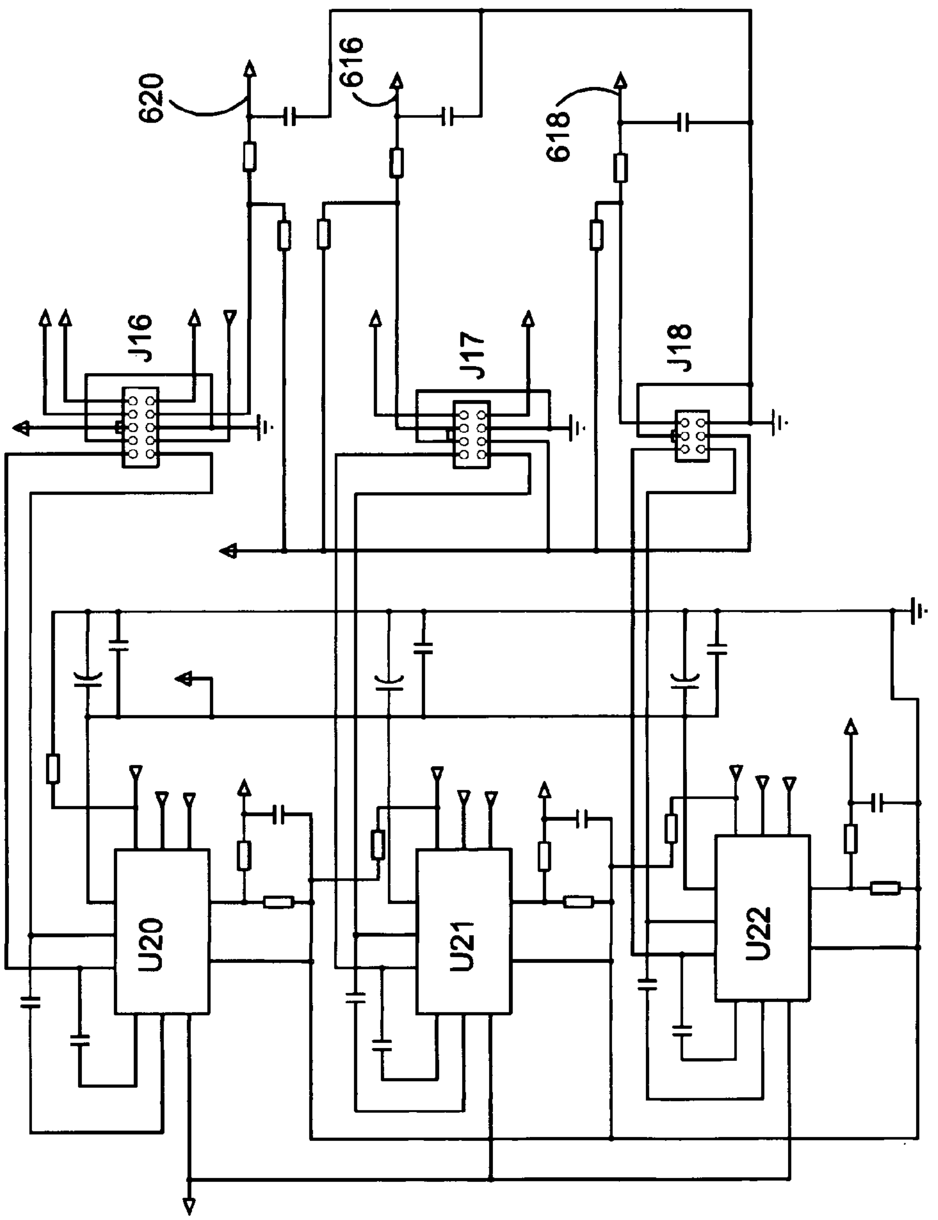
FIG. 34 is yet another partial electrical schematic of a portion of a control board for one preferred vending machine.
Figure 34A:
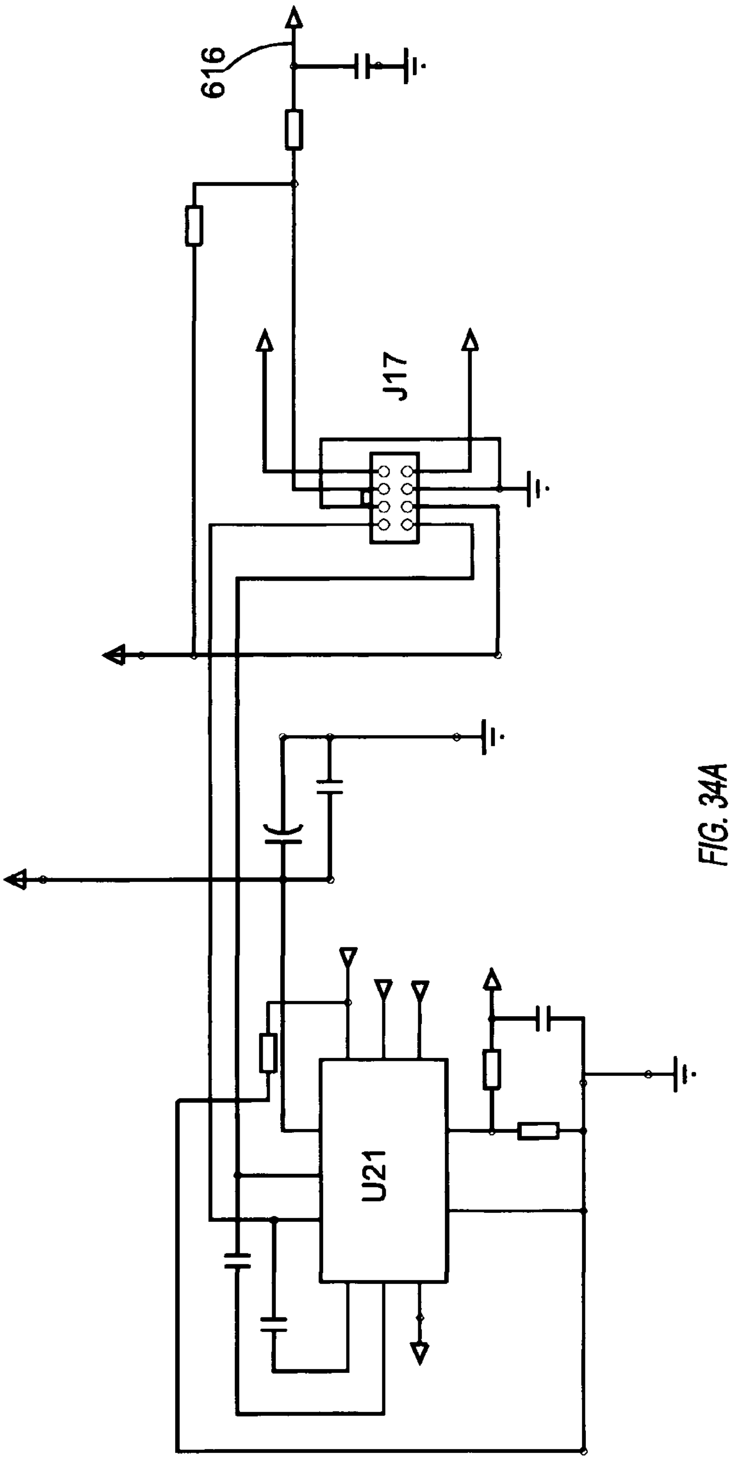
Figure 34B:
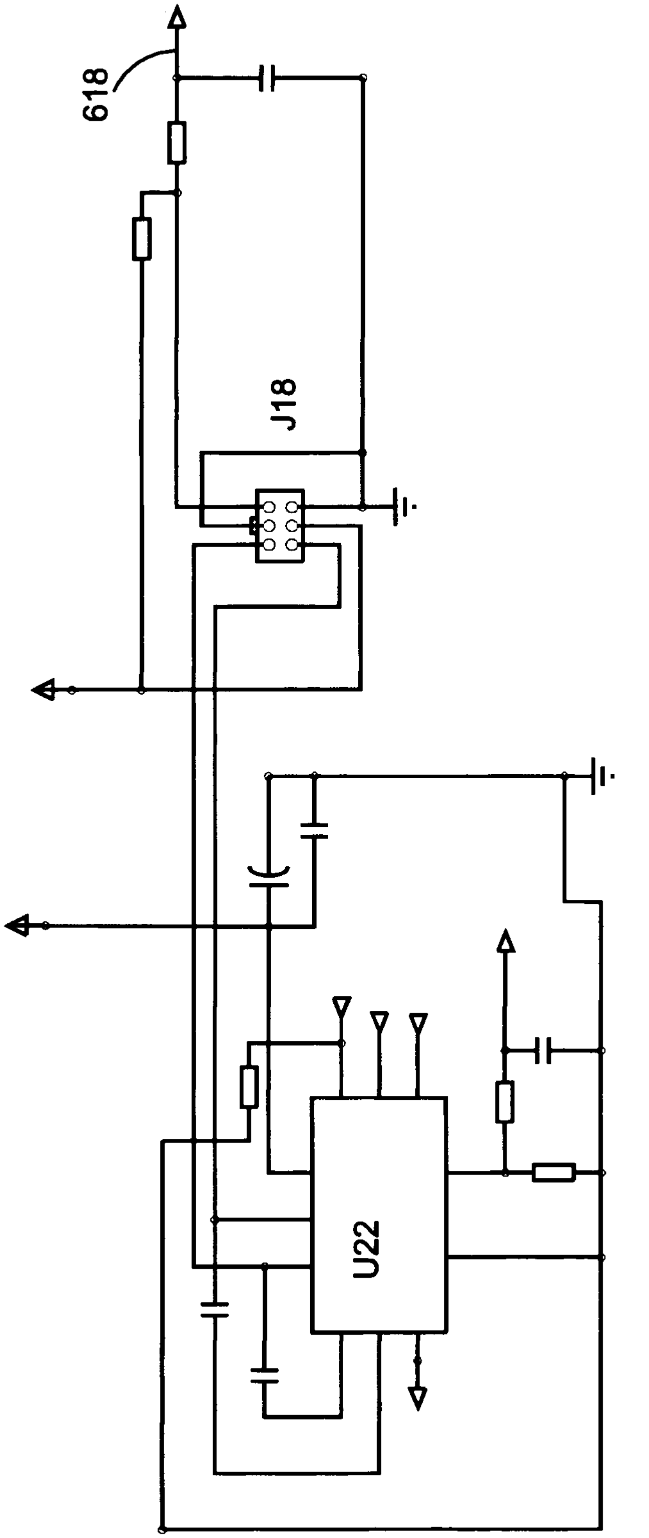
Figure 34C:
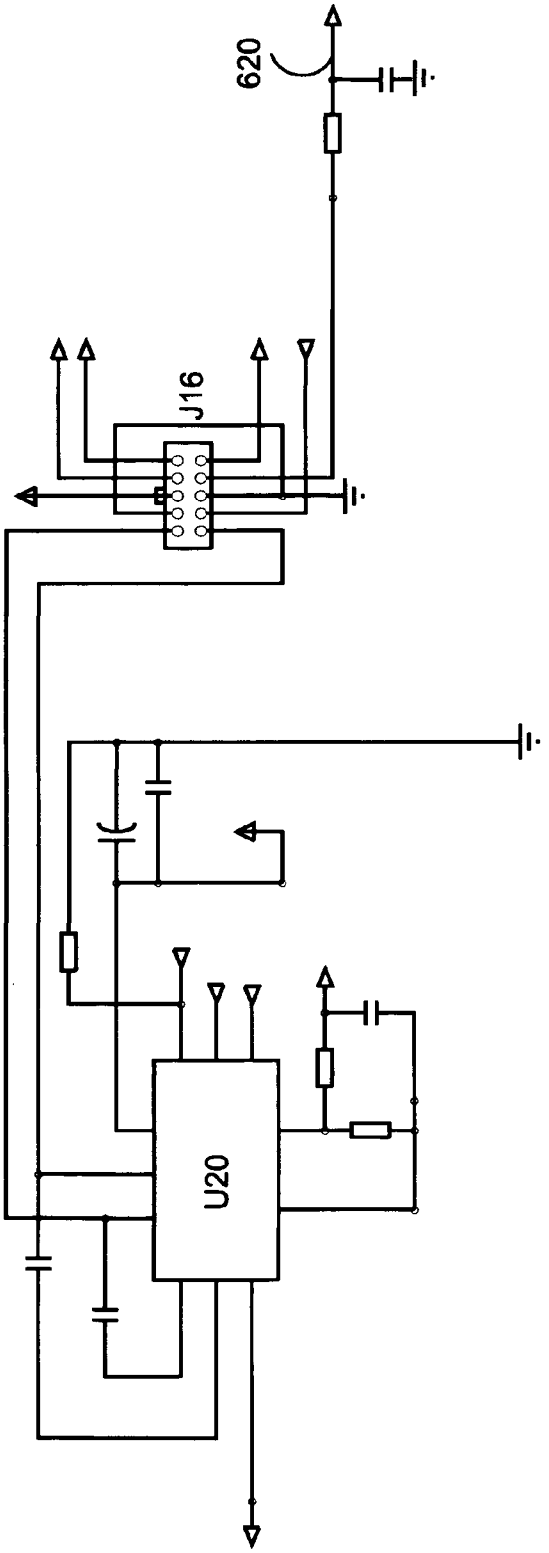
Figures 35A, 35B:
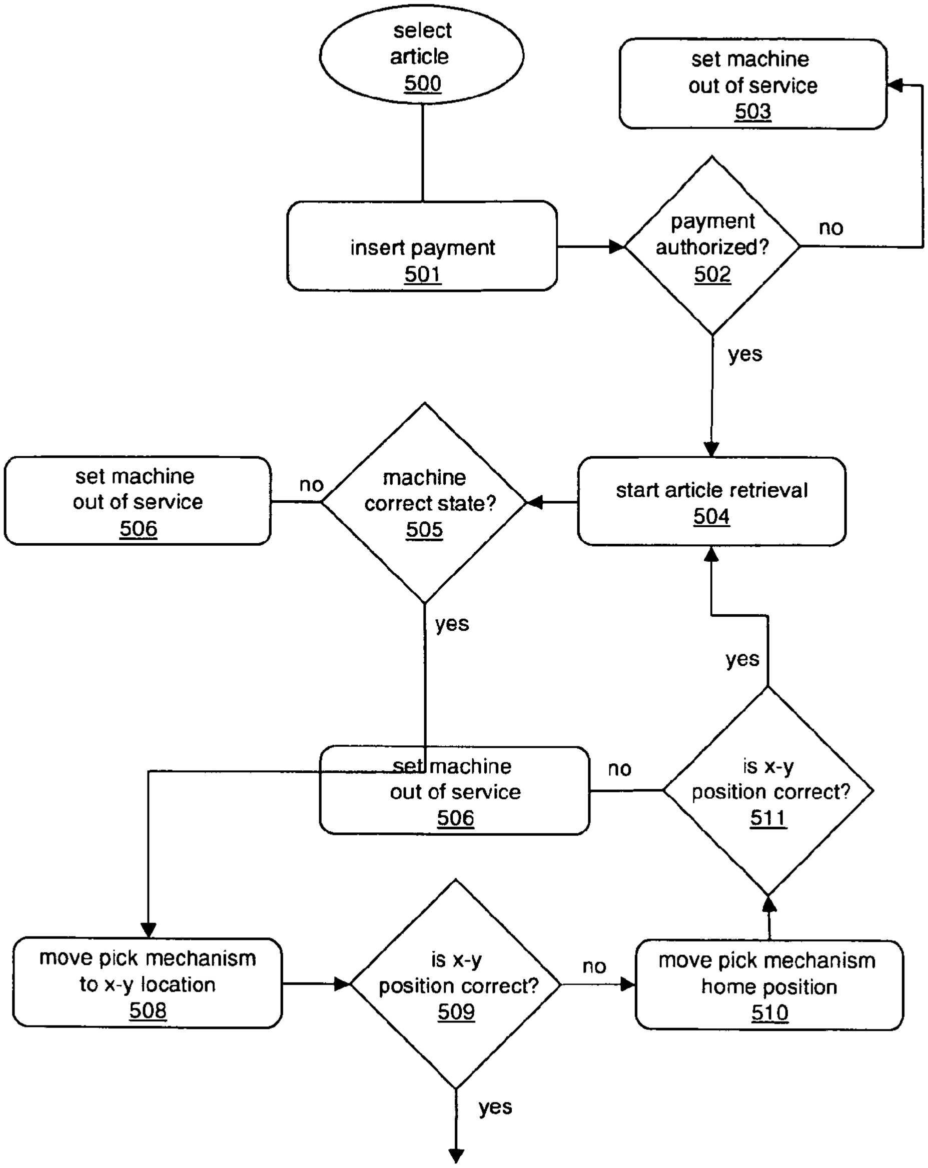
FIG. 35 is a process flow diagram for a preferred vending machine.
Figure 35B:
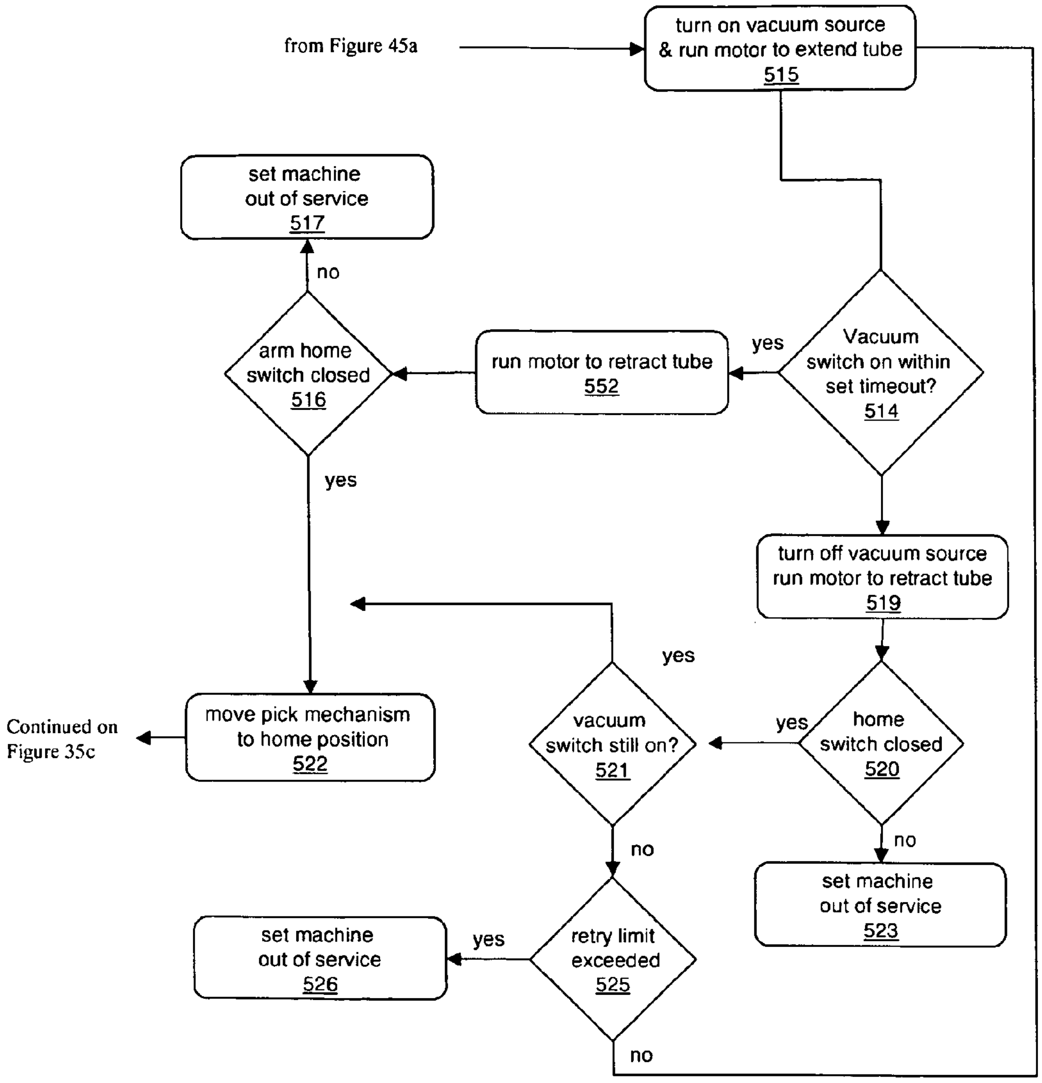
Figure 35C:
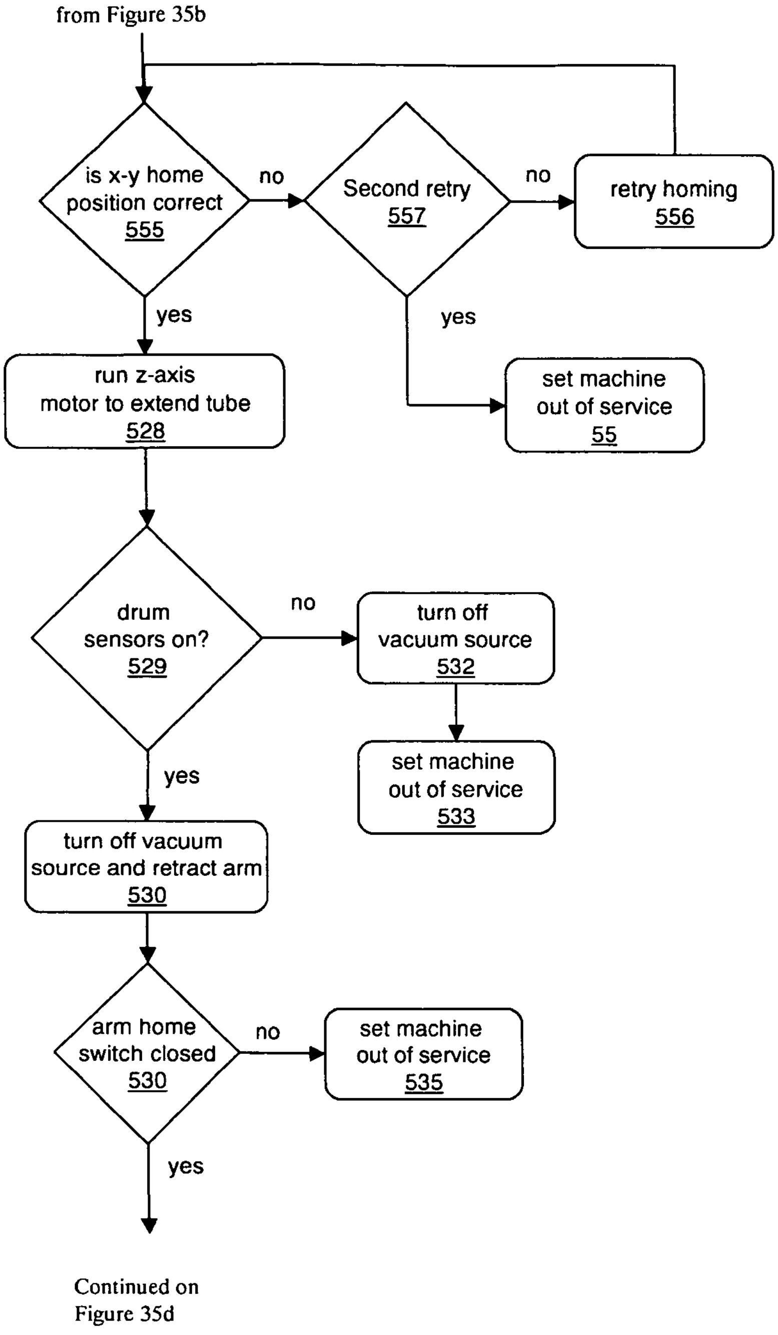
Figure 35D:
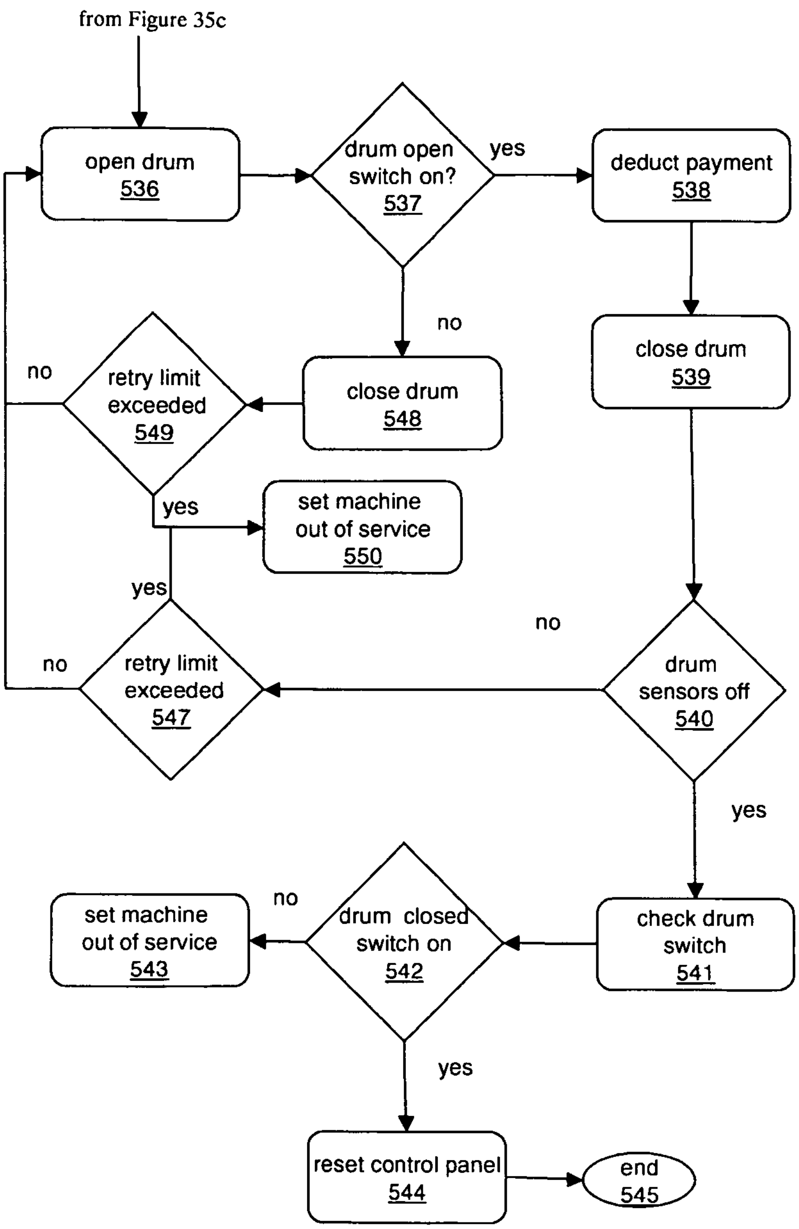

A schematic of a preferred control board is illustrated in FIGS. 32, 33, and 34 which describe, respectively, a preferred microcontroller 22 (FIG. 32) an onboard power supply unit 600, a serial I/O unit 602, LED outputs 604, an MDB (multidrop bus) interface) 606, an I2C bus 608, spare I/O's 610, 612, and 614, (FIG. 33), and three-axis drive mechanism outputs 616, 618, and 620, (FIG. 34).

Referring to FIG. 32, and to the preferred embodiment depicted therein, it will be seen that embedded processor 22 is comprised of a multiplicity of inputs—outputs (I/O's) that allow processor 22 to communicate with other circuits and/or other components of the circuit. It is preferred that the embedded processor contains at least 40 such I/O's and, preferably, at least 50 such I/O's. In one embodiment, the processor 22 contains 60 such I/0's.

Controllers comprised of a multiplicity of I/O's are well known to those skilled in the art. Reference may be had, e.g., to U.S. Pat. No. 3,654,617 (microprogrammable I/O controller), U.S. Pat. No. 4,293,924 (programmable controller with high density intelligent I/O interface), U.S. Pat. No. 4,504,927 (programmable controller with expandable I/O interface circuitry), U.S. Pat. No. 4,510,565 (programmable controller with intelligent positioning I/O modules), U.S. Pat. No. 5,778,236 (multiprocessing interrupt controller on I/O bus), U.S. Pat. No. 5,943,479 (method for reducing the rate of interrupts in a high speed I/O controller), U.S. Pat. No. 6,189,052 (On-chip i/o processor supporting different protocols having on-chip controller for reading and setting pins, starting timers, and generating interrupts at well defined points in time), and the like. The entire disclosure of each of these United States patents is hereby incorporated by reference into this specification.

As is illustrated in FIGS. 34, 34A, 34B, and 34C, the embedded controller 22 is operatively connected to X-drive assembly 616, Y-drive assembly 618, Z-drive assembly 620.

Referring to FIGS. 32, 32A, 32B, 32C, 32D, 32E, 32F, 32G, and 32H, and to the preferred embodiment depicted therein, it will also be seen that embedded controller 22 is preferably connected to a delivery door assembly 624 (see FIG. 32B), a liquid crystal display 626 (LCD) assembly (see FIG. 32C), an alpha-numeric keypad assembly 628 (see FIG. 32D), a vacuum release mechanism 630 (see FIG. 32E), a temperature sensor assembly 632 (see FIG. 32F), a clock 634 (see FIG. 32G), non-volatile RAM 636 (see FIG. 32G), a Y switch assembly 622 (see FIG. 32H) and an in circuit programming port 668.

Referring to FIG. 31 the apparatus is comprised of a controller assembly 22 that is preferably comprised of the circuitry illustrated, e.g., in FIGS. 32,33 and 34. The controller assembly 22 is connected to the a power supply unit 638 that, in the embodiment depicted, is connected via line 640 to the main power supply, The power supply 638 preferably delivers alternating current to onboard power supply 600. The onboard power supply 600 converts the alternating current fed to it (which is often 23 volts A.C.) to a multiplicity of direct current outputs.

The power supply 638 also delivers alternating current via line 642 to vacuum source 131 (see FIG. 5). Vacuum source 131, in turn, is connected to vacuum release circuitry 630 that is illustrated, e.g., in FIG. 32E.

Figure 25:
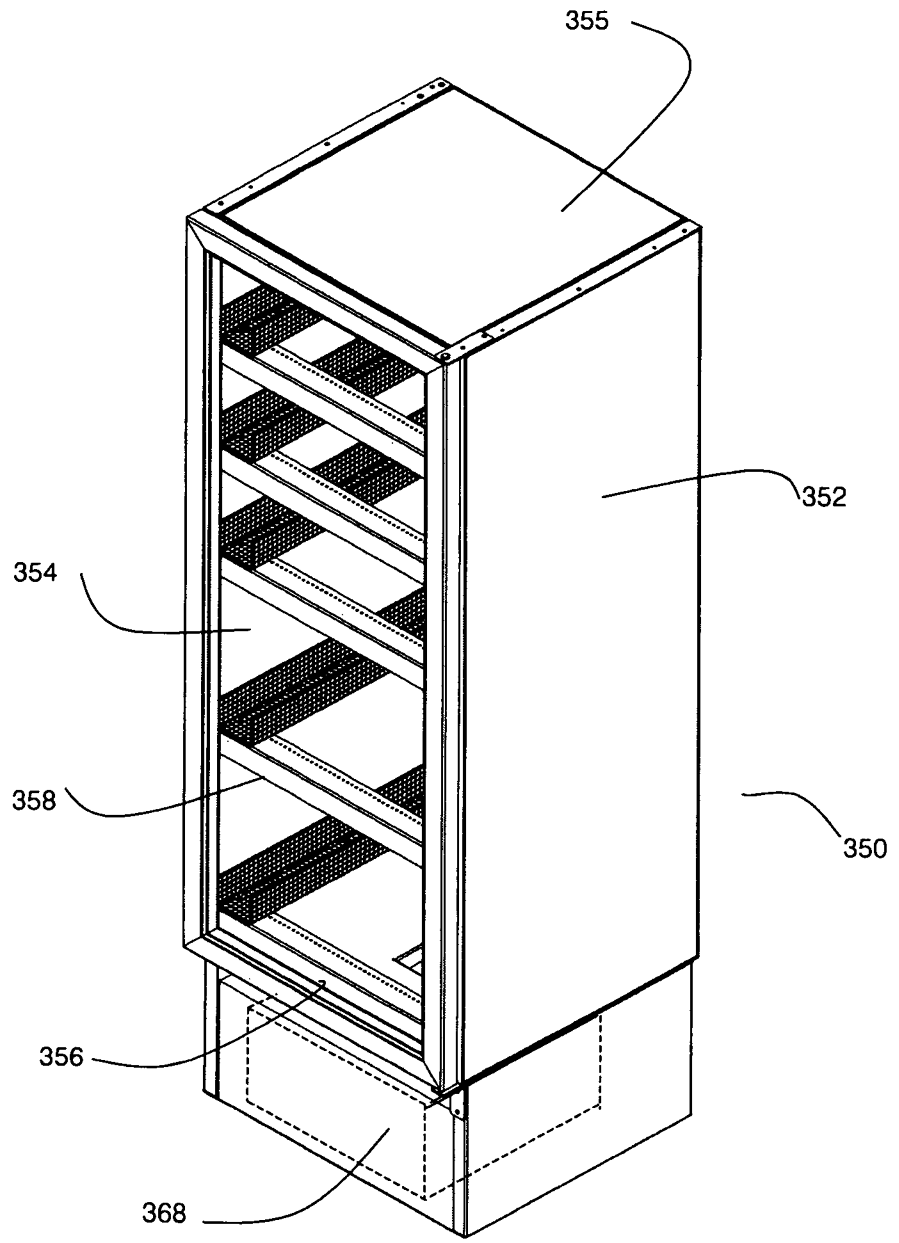
FIG. 25 is a front perspective view of a refrigeration module.
Figure 26:
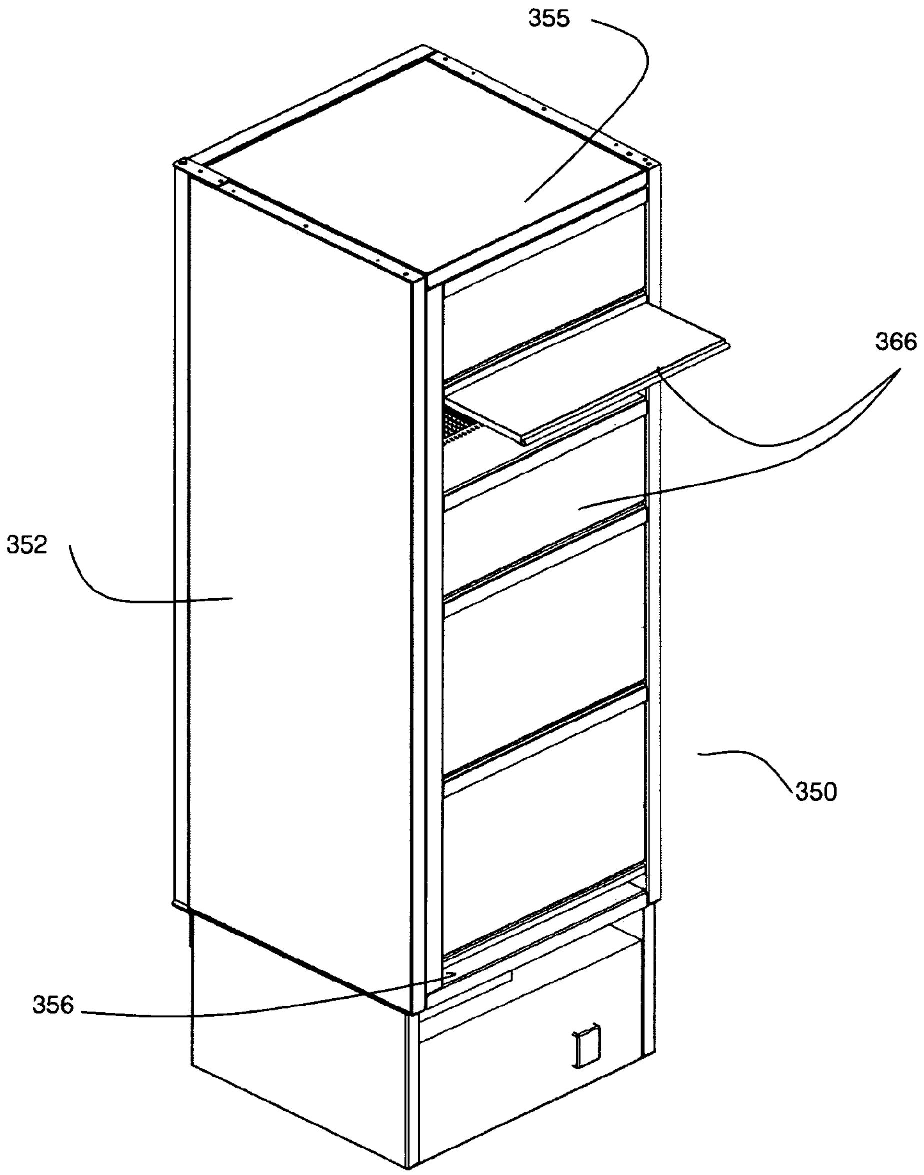
FIG. 26 is a rear perspective view of the refrigeration module.
Figure 27:
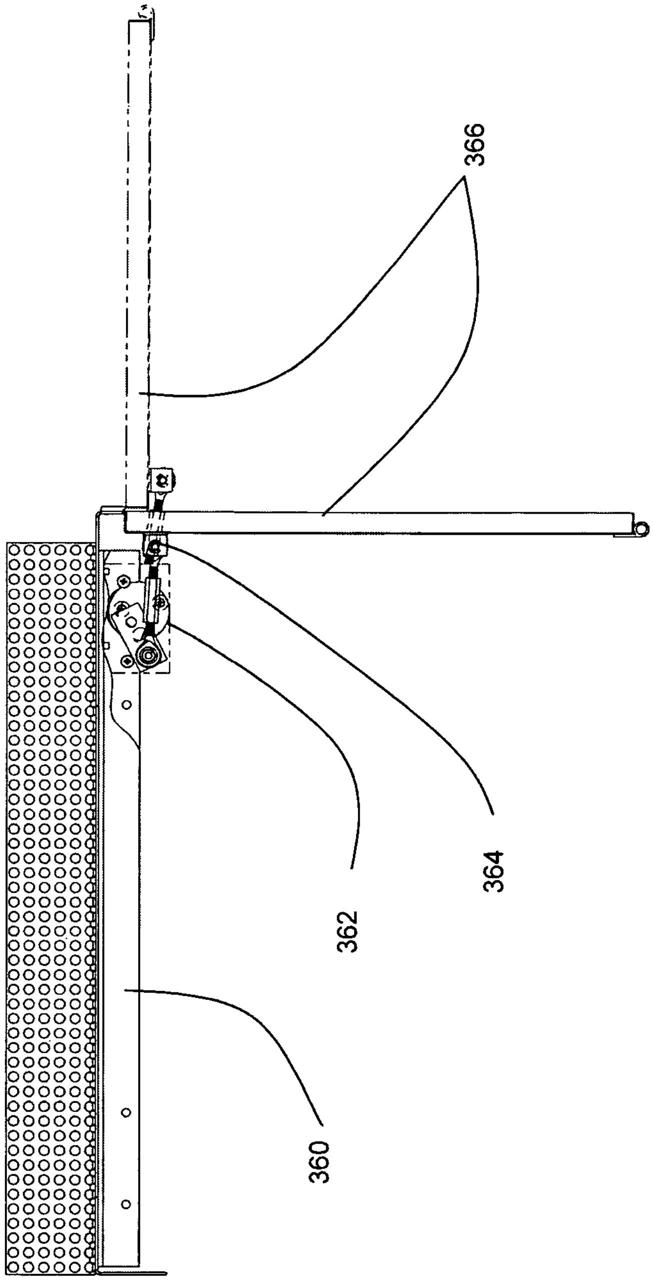
FIG. 27 is a side view of a refrigeration shelf assembly.
Figure 28:
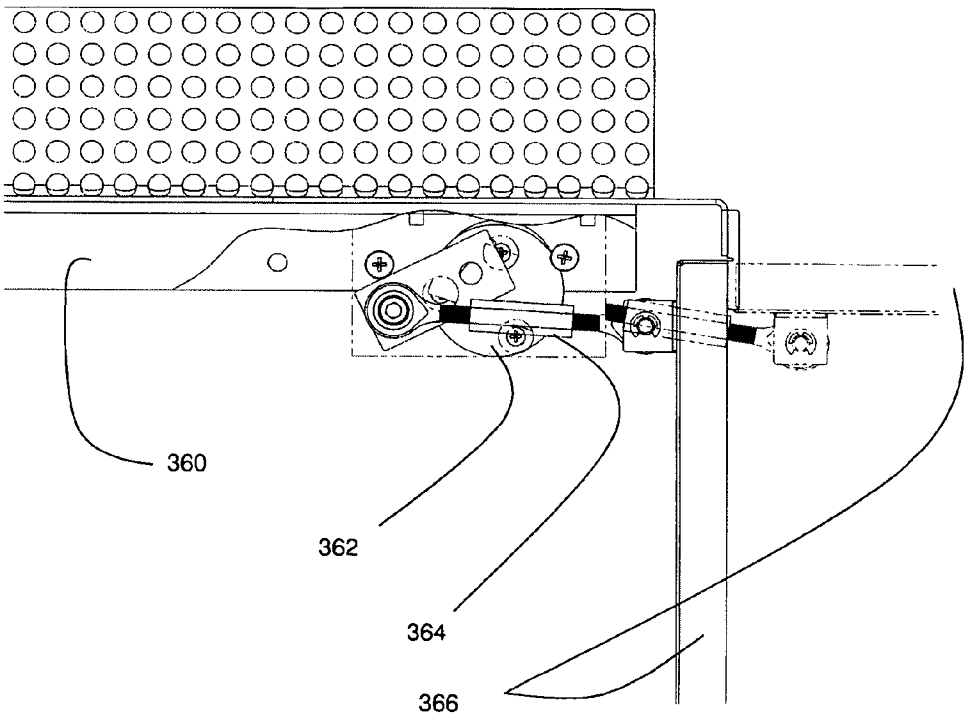
FIG. 28 is a partial side view of a refrigeration shelf assembly.

The power supply 638 is also operatively connected to a refrigeration module 350 comprised of a refrigeration deck 368 (see FIG. 25).

In the embodiment depicted in FIG. 35, the power supply 638 is connected via line 644 to a lower voltage power supply 646 that converts that 23 volt alternating current into direct current such as, e.g., 12 volt d.c. This direct current, in turn, is fed to telemetry unit 648, printer 235, credit card reader 232, touch screen 28, coin acceptor assembly 230, note reader 228, automatic teller machine 238, and note changer 236. In the embodiment depicted in FIG. 35, each of these components is operatively connected to, and controlled by, computer 244 which also is directly connected to power supply 638 by line 650.

The computer 244 is linked to the controller 22. In the embodiment depicted, the computer is so linked by line 652. In another embodiment, not shown, the computer is linked by a wireless link. The computer is preferably linked to a serial port 602 (see FIG. 33)

Referring again to FIG. 35, the AC control board 654 is connected by a communications link 656 to I2C bus 608. As will be apparent to those skilled in the art, I2C, also known as Inter-Integrated Circuit, is a multi-master serial computer bus that is used to attach lower-speed peripherals to a motherboard, embedded system, or cellphone. Reference may be had, e.g., to U.S. Pat. No. 6,233,635 (diagnostic/control system using a multi-level I2C bus), U.S. Pat. No. 6,728,908 (I2C bus protocol controller with fault tolerance), U.S. Pat. No. 7,085,863 (I2C device including bus switches and programmable address), U.S. Pat. No. 7,260,662 (I2C bus controlling method), U.S. Pat. No. 7,092,041 (I2C bus control for isolating selected IC's for fast I2C bus communication), and the like. The entire disclosure of each of these United States patents is hereby incorporated by reference into this specification.

The I2C bus 608 is adapted to turn the alternating current power on and off to the refrigeration assembly 350 and the vacuum source 131. The controller 22 monitors certain conditions that dictate when such power is turned on and off. This monitoring may be effected by conventional means such as, e.g., by temperature sensor 658 (see FIG. 32F).

Figure 32F:
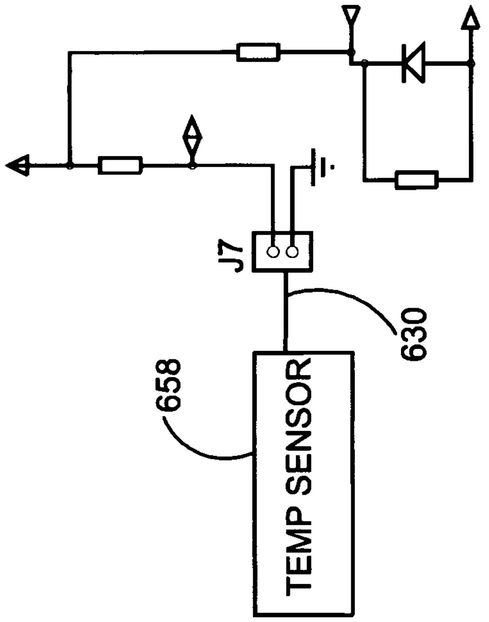
Figure 32G:
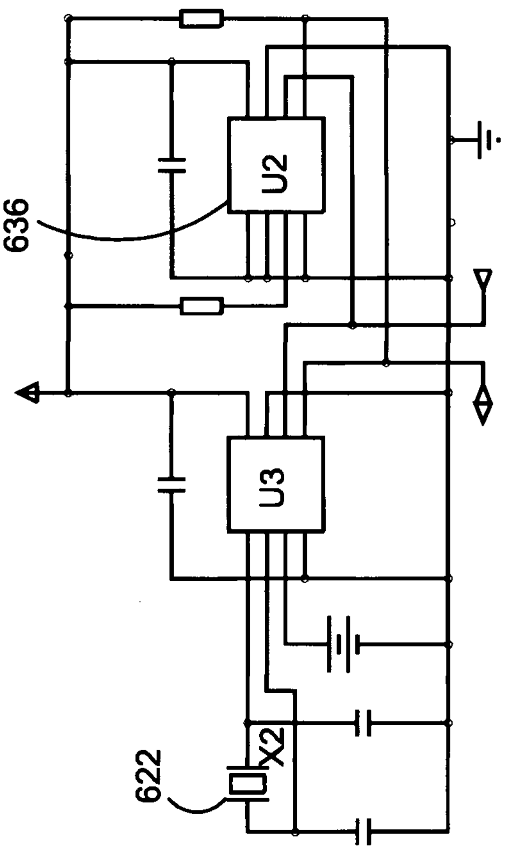
Figure 32H:
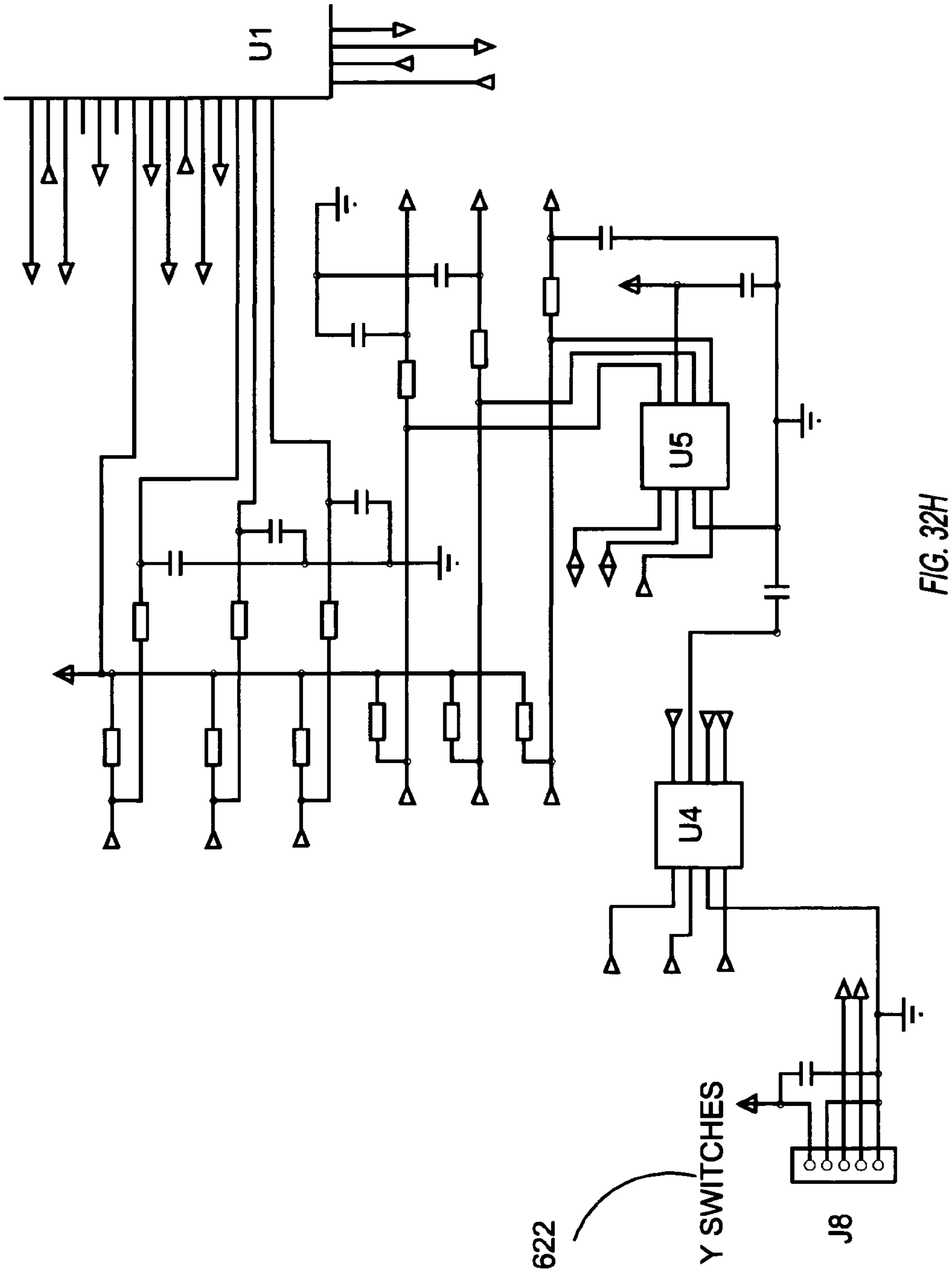

Referring to FIG. 32F, temperature sensor 658 is operatively connected to control board 660 by means not shown in FIG. 32F, but see FIG. 35. Referring to FIG. 35, temperature sensor circuit 660 is connected to temperature sensor 658 by means of line 662.

Another sensor that is preferably operatively connected to the control board 660 is vacuum sensor 144 (see FIG. 9). Vacuum sensor 144 is connected to vacuum switch 621 (see FIG. 34C) that, in turn, is connected to Z axis interconnect board 664; interconnect board 664 is connected to control panel 22*a*.

Referring again to FIG. 35, an ultrasonic sensor 157 (see FIG. 5) is also connected to Z-axis interconnect board 664.

In the preferred embodiment depicted in FIG. 31, the graphical interface is comprised of any number of the following components: note reader 228, coin acceptor 230, credit card reader 232, closed user group card reader 234, a note changer 236, a automatic teller machine (ATM) 238 or any other form of payment and also can be set to a no-payment option. The communication system 220 can communicate with a selection keypad 240 and a selection information display screen 242 or can be linked directly by serial bus to a p/c 244. The personnel computer 244 can be used to manage all the transaction functions including incorporating a touch screen 28 for user the interface and can also receive and send information via wired telecom, wireless telecom, wifi, internet, or intranet communications. The information can include, machine conditions, number of vends, amount of stock, all accounting information. The personnel computer 244 can also receive and implement software via the same. The motion control system controls the movement of the 3-axis drive mechanism 100, the vacuum pick mechanism 102, the product delivery 42 and the refrigeration control 246 when required. The note reader 228, credit card reader 232, closed user group card reader 234 and coin acceptor/changer 230 may be controlled either by the controller 22 or the personnel computer 244. The controller 22 is capable of storing the product data pertaining to the amount of product in the machine, the cost of each product and the amount of product sold. This information can be stored locally in memory or transmitted by any on the above-described means to a remote location for inventory control purpose. It is also a preferred embodiment that the machine conditions be stored in memory and the data can also be transmitted by any of the above means to a remote location for the purpose of dispatching a technician or alternately solving any issues with a supervisor at the machine.

FIG. 35 is a flow diagram of one preferred process 500 for vending articles. In the first step of the is process, step 500, an article to be vended is selecting. Devices and processes for selecting articles are well known and are described, e.g., in U.S. Pat. No. 3,731,788 (article selecting device), U.S. Pat. No. 3,826,348 (article selection and separation apparatus), U.S. Pat. No. 4,436,474 (selecting articles from an array thereof), U.S. Pat. No. 5,564,894 (article selection and delivery method and apparatus), U.S. Pat. No. 6,415,952 (apparatus for carrying selected article to take-out window in automatic vending machine), and the like. The entire disclosure of each of these United States patents is hereby incorporated by reference into this specification.

In the preferred embodiment illustrated in the Figures, the selection process might be facilitated by the graphical interface 29 (see FIG. 1), and by the screen (which preferably is a touch screen) 28. These touch screens are well known and are described, e.g., in U.S. Pat. No. 5,564,974 (coin sorting system with touch screen device), U.S. Pat. No. 5,768,386 (method and system for encrypting input from a touch screen), U.S. Pat. No. 6,688,518 (wall mounted touch screen information system), U.S. Pat. No. 6,741,237 (touch screen), U.S. Pat. No. 7,079,118 (touch screen using echo location), and the like. The entire disclosure of each of these United States patents is hereby incorporated by reference into this specification.

Referring again to FIG. 35, and after an article has been selected in step 501, the consumer makes payment by inserted payment into the machine in step 501. Such payment making processes are well known to those skilled in the art are described, e.g., in U.S. Pat. No. 4,797,540 (payment making terminal device), U.S. Pat. No. 5,154,260 (method and system for automated processing of articles), U.S. Pat. No. 5,239,480 (automatic ticket dispensing system), U.S. Pat. No. 5,860,362 (newspaper vending machine with online connection), U.S. Pat. No. 6,796,491 (electronic payment system, payment apparatus, and terminal thereof), U.S. Pat. No. 6,882,983 (method and system for processing transactions), U.S. Pat. No. 7,014,106 (electronic payment system, payment apparatus, and terminal thereof), U.S. Pat. No. 7,021,531 (payment device), and the like. The entire disclosure of each of these United States patents is hereby incorporated by reference into this specification.

In applicant's preferred embodiment, one can control payment either through the computer 244 (see FIG. 35) and/or through the multi-drop bus (MDB) 606. The MDB is often used with vending machines. Reference may be had, e.g., to the disclosure and claims of U.S. Pat. No. 5,959,869 (vending machine controller and system), U.S. Pat. No. 6,119,053 (vending machine dual bus architecture), U.S. Pat. No. 6,505,095 (system for providing remote audit, cashless payment, and interactive transaction capabilities in a vending machine), U.S. Pat. No. 6,628,764 (system for requesting service of a vending machine), U.S. Pat. No. 7,076,329 (cashing vending transaction management by a vend assist mode of operation), U.S. Pat. No. 7,131,575 (MDB transaction string effectuated cashless vending), and the like. The entire disclosure of each of these United States patents is hereby incorporated by reference into this specification.

Instead of using the MDB, one may utilize the computer 244 for point of sale purchases. Devices for effectuating point of sale purchases are well known and are described, e.g., in U.S. Pat. No. 5,866,890 (device and method for sequencing participation in a point-of-sale activity), U.S. Pat. No. 6,003,008 (point of sale device), U.S. Pat. No. 6,827,260 (system and methods for utilizing a point-of-sale system), U.S. Pat. No. 6,883,706 (point-of-sale bill authorization), U.S. Pat. No. 6,886,472 (systems and methods for deploying a point-of-sale device, U.S. Pat. No. 7,295,992 (method and system for delivering products and services to a point of sale location), and the like. The entire disclosure of each of these United States patents is hereby incorporated by reference into this specification.

Referring again to FIG. 35, after payment has been made in step 501, it is authorized in step 502. Means for authorizing and/or confirming and/or verifying payment are well known to those skilled in the art. Reference may be had, e.g., to U.S. Pat. No. 5,819,239 (method of verifying proper payment of postage), U.S. Pat. No. 5,826,241 (computerized system for making payments), U.S. Pat. No. 6,012,399 (space efficient method of verifying electronic payments), U.S. Pat. No. 6,529,886 (authenticating method for an access and/or payment control system), U.S. Pat. No. 6,895,391 (method and system for secure authenticated payment on a computer network), U.S. Pat. No. 7,051,002 (universal merchant platform for payment authentication), and the like. The entire disclosure of each of these United States patents is hereby incorporated by reference into this specification.

If the payment is not authorized in step 502 the process ends at step 503 and the software resets the graphical interface 29.

In one aspect of applicant's process, the MDB 606 reads the value of the payment tendered and authorizes the purchase and delivery event(s). In this aspect, the MBD 606 will preferably hold the payment tendered in escrow until it has determined that the goods purchased have been delivered. The payment may be held in escrow by physical and/or electronics means. Thus, e.g., the note reader 228 (see FIG. 35) and/or the coin acceptor 230 (see FIG. 35) may physically hold the monies tendered in escrow until directed to delivery such monies to a cash box 666 (see FIG. 35).

As will be described in more detail later in this specification, an inspection of the drum 42 will reveal whether the product has been delivered. After such inspection, and after verification that such product has been delivered, payment is deducted in step 538.

In such step 538, the MDB 606 (or the computer 244) will deduct payment from the escrowed account.

Again Referring to FIGS. 35*a*, 35*b* 35*c* and 35*d*, after the payment has been authorized in step 503, the controller 22 begins to retrieve the article in step 504. The software then checks at step 505 that the home switch 115, home switch 113, and tube home switch 144 are in the correct state. The controller 22 then causes the 3-axis drive mechanism 100 to position the support rails 104 and the pick mechanism 102 in such a way as to align the pick mechanism 102 with the appropriate product 90. If the tube home switch 144 is not engaged the software then sets the machine out of service step 506. If the home switch 115 and home switch 113 are not in the correct state the controller 22 will attempt to move the 3-axis mechanism to set the switches 113 and 115 to the correct state. If the switches 113 and 115 cannot be set, the software will then set the machine out of service in step 506. Moving the carriage 132 without the telescoping tubes 134-140 completely retracted major machine failure and potentially damage to the partially extended tubes 135-140.

The telescoping pick mechanism 102 then is positioned as to retrieve a product 90 in any one of the arrayed product trays 86, 87 and 88. The telescoping pick mechanism 102 is then energized and caused to extend. If the pick mechanism 102 is not the correct location at step 509, the software then attempts top move the pick mechanism 102 t0 home position in step 510. Again the software checks to ensure the pick mechanism is ion the correct position at step 511. If the pick mechanism is in the correct position then the article retrieval will be retried in step 504, conversely if the pick mechanism is not in the correct portion the process ends at step 554.

As shown in FIG. 10 and step 515, the motor 158 has been energized causing the tubes 134-140 to extend. The vacuum pressure switch 142 detects a pressure change when contact between the elastic cup 156 and the product 90 has been made. If the pressure vacuum switch 142 does not make contact within a defined period of time, the software causes the motor 158 to be reversed and retract the tubes, then returning the machine to its initial start position provided that the snap action switch 144 is engaged. If the snap action switch 144 is not engaged at this point the software will set the machine out of service as described above. If the pressure vacuum switch 142 does make contact within the defined period of time, then the pick head 102 is moved to its delivery position. If the pressure switch 142 is not detected at step 514, the software than proceeds to step 197 and checks to see if a predetermined retry limit has not been exceeded, if the limit has been exceed the machine is set out of service step 526. If the retry limit in step 525 has not been exceeded the machine will retry the pick cycle starting at step 515 and repeat this process until achieving the predetermined limit at step 525 or until successful engagement of the product occurs at step 514.

After the software at step 514 determines that the vacuum switch 142 is on, the software causes the motor 158 to reverse and move the tubes 134-140 to their collapsed position as shown in FIG. 5 and at step 552. The software then determines at step 516 if the tube home switch 144 is closed. If the tube home switch 144 is not close, the software then sets the machine out of service at step 517. If the tube home switch 144 is closed the software then causes the controller 22 to move the 3-axis drive mechanism to its home position at step 522. The home position as described earlier, is the position that the product 90 is offered to the delivery 42. If the switches 113 and 115 are not engaged when the machine moves to the home position at step 555, if and only if the software determines that it not the third retry at step 557, the controller 22 will again attempt to seek and find the home position AT STEP 556 by looking for switches 113 and 115 to be engaged, If the switches are not engaged after a second attempt the controller 22 will set the machine out of service at step 558.

When switches 113 and 115 are confirmed engaged, the controller cause the z-axis motor 158 to run and extend the tubes 134-140 as shown in FIG. 10 and step 528, pushing the product 90 through the delivery 42 (as shown in FIG. 90). When the product 90 enters the delivery drum 250, the software then checks to see if the drum sensors 258 and 260 are engaged at step 529, if they are engaged the vacuum source 131, is then turned off and the motor encoder 158 runs in reverse to collapse the tubes 134-140. If the tube home switch 144 is not engaged the software then sets the machine out of service at step 535. If the tube home switch is engage at step 530, the controller runs drum motor 256 at step 536 causing the drum 250 to rotate and exposing the product 90 to the customer who can then retrieve the product 90. The software then checks that the drum switch 276 is engaged at step 537. If the switch 276 is engaged at step 537, the software then confirms the drum 250 is open and the payment is deducted at step 538. The software then causes the drum 250 to close at step 539. If the switch at step 537 is not engaged, the software closes the drum at step 548 and then checks to see if the retry limit at step 549 has been exceeded. If the retry limit at step 549 has not been exceeded, the software will try to open the drum at step 536 in an attempt to satisfy the conditions at step 537. A number of retries can be set by software to allow for the drum 250 not to close at step 539. After checking that the drum sensors 258 and 260 are off at step 540, the software then checks the retry limit is checked at step 547, and if the retry limit at step 547 has been exceeded the machine is set out of service at step 550. If the retry limit at step 549 has not been exceeded the drum will attempt to open at step 536 and loop around until the conditions are satisfied. When the drum sensors are confirmed off at step 540, the software then checks to see if the drum closed switch 274 is engaged and then resets the control panel at step 544 and end the process at step 545. If the drum switch is not closed at step 424, the software then sets the machine out of service at step 543.

Referring to FIG. 4, the pick head 102 normally rests directly behind the product delivery 42 when the machine is in an idle state. An x positions sensor 113 and a y position sensor 115 ensure that the pick head is located at the correct position. As the pick head 102 moves from this "idle" position, the distance is absolute to the controller 22 and recorded to the controller by encoder motor 118 and encoder motor 154. When the pick head returns to the delivery 42, the controller 22 records the encoder counts again from the encoder motors 118 and 154, using that distance as reference. The pick head 102 can adjust its return position in the by referencing the signal given off by the two sensors 113 and 115, thereby ensuring accurate position for the completion of the vend cycle and the beginning of the next cycle. When the pick head 102 delivers a product it moves this allow the machine 10 to expedite product 90 retrieval and delivery by averaging the distance traveled to and from the any product 90.

In yet another embodiment, using the stored information in controller 22 as disclosed above, the pick head 102 can be idled or positioned directly behind a product 90 that is the most popular to help expedite product retrieval and delivery.

The controller 22 can also move the pick head 102 to s product 90 that has been selected and idle at that position while a credit card authorization is being made. After said authorization is completed the pick head 102 can then retrieve that product 90 and deliver it.

Figure 36:
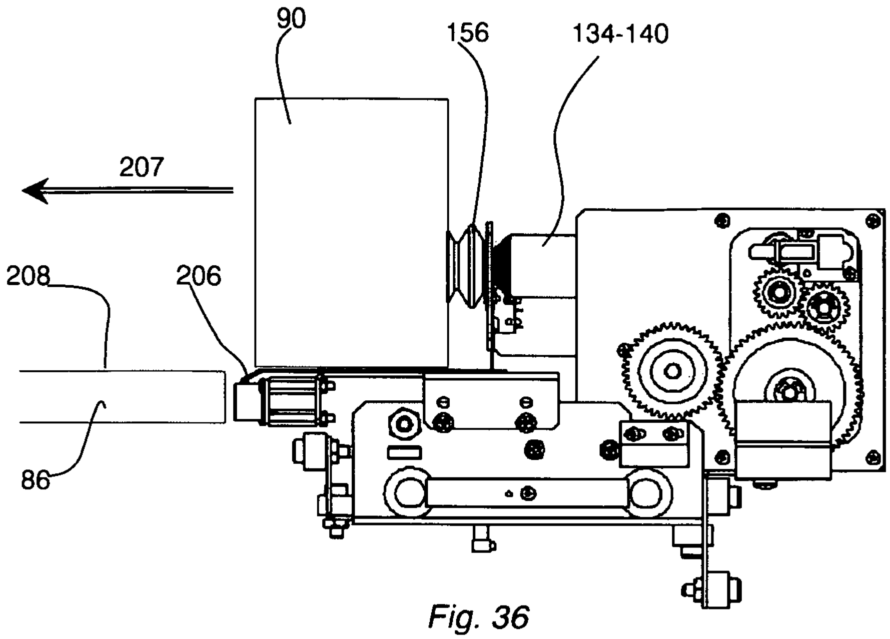
FIG. 36 is a side view of a preferred embodiment of a pick mechanism.
Figure 37:
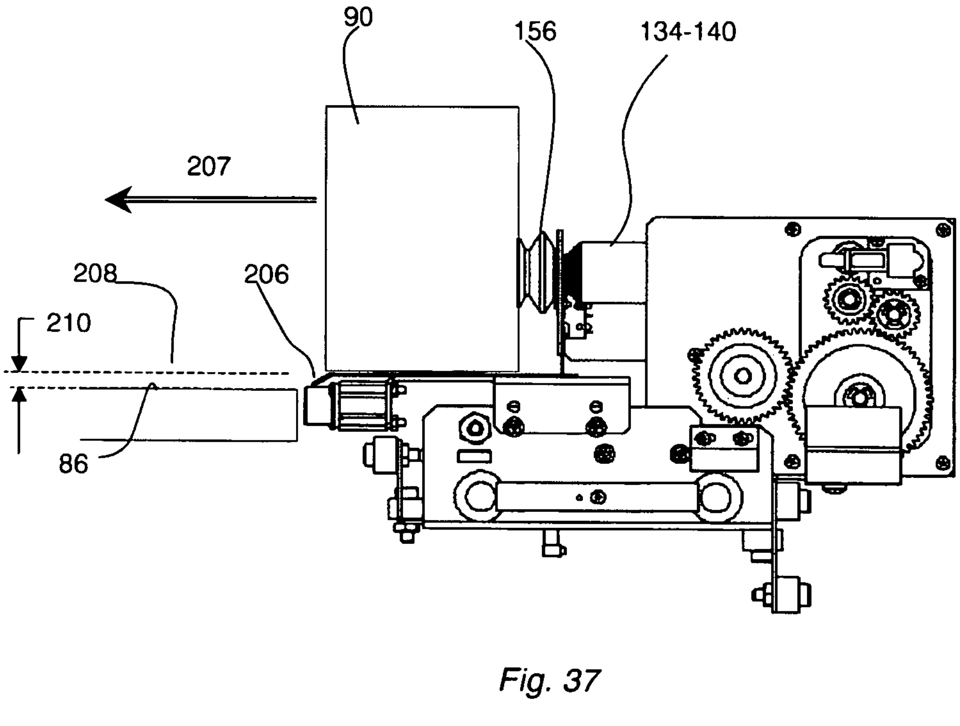
FIG. 37 is another side view of the pick mechanism depicted in FIG. 36.

Referring now to FIGS. 36 and 37, the carriage is shown at a delivery position. A carrier tray 206 is rigidly mounted to the pick mechanism 102. A product 90 is shown on the carrier tray 206. A surface 208 on the product tray 86 provides a means of transferring the product 90 to the tray 86. The carrier tray 206 is horizontally in line with the tray surface 208 as shown in FIG. 34 and has a slight offset gap 210 as shown in FIG. 35. There are many variations in the bottom of the product 90 causing slight variations in the alignment of surface 208 and carrier tray 206 so as to allow the product 90 to be pushed by tubes 134-140 very smoothly onto the surface 208 and not be dropped or tipped. The gap 210 can be set for individual products by software control, allowing for different gaps on product delivery to be used and therefore ensuring smooth (no-drop) product delivery. The delivery position can be at any location on the x-y array and is preferable to be located at a position for product retrieval by a person. The position can be optimized for disabled persons.

Now referring to FIG. 13, a shelf 86 has products 90 placed on it. During the loading operation of the vending machine, a carrier tray has a substantially extended member 298. The pick mechanism 102 is positioned effectively to have member 298 forms a barrier. When loading product 90 from the front of the machine after the product 90 is depleted the member 90 blocks product from falling off the tray 86.

Again referring to FIG. 6, a video camera 117 is rigidly mounted to the pick head 102 and operatively connects to the controller 22. The controller is capable of broadcast the video signal from the camera 117 and displaying it on the touch screen 28 allowing the end user to see their product being pick, delivered and transported. Another feature of the camera 117 is that it can be used as a diagnostic tool when video images are viewed on the touch screen 28. The video image can also be accessed by remote means through the personnel computer 244.

The controller 22 can count down product to memory and know when a channel 303, such as the one shown in FIG. 19, is empty and reload it with product 90 from another channel 303. The memory of the controller 22 is capable of adjusting the price of the product 90. This feature of the process allows the machine 10 to look full of product.

It should be also noted that the product 10, does not need to be behind glass 79, 81, 83 or 85 and can reside behind an opaque surface anywhere in the operation plan of the 3-axis pick mechanism 100.

The controller 22 is also capable of scanning the x-y plan of the machine 10 and mapping the shelf 86 positions and the position of the sidewalls 30. This allows the product positions top be stored into memory on the controller 22.

Another feature is that an end user can enter multiple items through the graphical interface the machine 10 will treat them as a single transaction and deliver multiple products to the delivery 42 either one at a time or more than one before payment is deducted.

Referring now to FIGS. 3 and 19, a distance detection sensor 157 is mounted to the front of the pick head 102. The sensor can be either ultrasonic or optical in nature. The controller 22 raises the pick head 102 above the shelf 86 and is energized by means of the controller 22, the sensor 157 signals reflects off the last product 90 in the channel 303.

DESCRIPTION OF ANOTHER PREFERRED EMBODIMENT

In European patent application EP 07270039.6 that was filed in the name of Teknovation, Ltd. On Jul. 30, 2007, certain other embodiments of applicant's invention were disclosed in whole or in part. These embodiments are described below, often by reference to the drawings of the European case, and the components of the assembly described in such case may also be used, in whole or in part, with the devices described in this case.

The apparatus described in the European case generally relates to a device for storing and selectively retrieving articles and to automatic vending machines that utilize a vacuum type product pulling/pushing mechanism similar to the pushing/pulling mechanism described and illustrated in this case.

As is described in the European patent application, and in this case, the preferred vending machine of this invention is preferably comprised of robust over travel stops on the telescoping tube, a friction drive system, a flat coil spring extension/retraction member driven by the friction system, a simple pressure switch for monitoring the supply vacuum, a positional switch ensuring that the tube is fully retracted and at a known starting position, a tube support feature that eliminates variations in the suction cup horizontal height when extended and control software that allows for pick retries in the event of a loss of vacuum during the pick cycle.

In accordance with one aspect of the invention disclosed in the European case, and in the instant case, there is provided an apparatus for storing and selectively retrieving articles comprising a vertical array of storage locations each having a horizontal surface on which articles may rest and along which articles may be slid, a carriage mounted for movement horizontally and vertically across the face of the array so as to be selectively positionable at any one of the locations, the carriage having mounted thereon a telescopic suction tube, suction tube drive means associated with the tube for selectively extending and retracting the tube, and suction means connected to the tube whereby the tube can be extended to engage a selected article in a first one of said locations, the suction means being selectively operable to hold the article to the end of the tube as the tube is retracted, thereby withdrawing the article from said location and on to the carriage, the carriage then being movable to another of said locations at which the tube may be extended to discharge the article from the carriage into said other location, characterised in that the suction tube drive means comprises an elongate flat strip capable of being coiled on itself but adopting a linear configuration when uncoiled, friction drive rollers engaging the opposed faces of the strip, rotation of the rollers causing linear movement of the strip, and a roller motor to drive the rollers, a first end of the strip being attached to the end of the suction tube so that extension and retraction of the strip causes telescopic extension and retraction of the suction tube.

As is disclosed in such European case, and in the drawings and the specification of the current case, the strip is suitably a thin spring steel which can be rolled up on itself, but which when unrolled assumes a straight, semi-rigid form. An example of such a material is the tape in a steel tape measure. An alternative material would be a plastics tape having a shape memory such that it can be rolled or coiled, but unrolls straight with sufficient rigidity to drive and retract the suction tube and attached product, sliding the product over the surface within its location and on to the carriage, and sliding off the carriage and on to the surface of the delivery location. In this way, the suction tube will not have to carry the full weight of the product, but will simply have to overcome friction to slide the product. In one aspect of this embodiment, low friction surfaces are provided in these locations to assist in this process.

As is disclosed in such European case, and in the drawings and the specification of the current case, and in one preferred embodiment, the vacuum operated pick mechanism incorporates positive stops on the telescoping vacuum tubes and a friction drive mechanism for extending and retracting a coiled steel spring member. Still further improvements relating to the pick mechanism include the use of adjustable or self adjusting vacuum switch for product detection and a position switch to determine the proper start/stop location of the vacuum tubes. Further improvements include vertical support means to maintain the proper height of the vacuum tubes when they are extended, particularly in the full extension mode. Yet again further improvements include control software that recognizes a vacuum loss and can retry the attempted product move. Still further improvements include a soft (no drop) delivery system that is capable of handling varying weight objects and control software to allow for smooth transition from the transfer surface to the delivery surface. The delivery of the product can be can be optimized for ergonomics, particularly for a physically disabled person.

As is disclosed in such European case, and in the drawings and the specification of the current case, and in one preferred embodiment, there is disclosed a vending machine with a cabinet which could, for example, form an addition to an existing shop front, with the rear of the cabinet being accessible from within the shop and the front of the cabinet facing into the street or shopping mall.

The cabinet preferably includes a product display panel or window, which is transparent so that goods for sale by the machine may be viewed by customers in the street, a product selection and payment panel and a product delivery door. The front of the cabinet may be a door giving access to the interior of the cabinet for loading and maintenance purposes.

It will be understood that the cabinet could alternatively be a freestanding cabinet in conventional manner, and that the front panel may in some circumstances be opaque, for example being formed of steel for additional security for the contents of the machine.

The product selection and payment panel may include a display screen, for example a liquid crystal display (LCD) screen which may be touch sensitive screen to permit selection of displayed options by the customer. The payment means included in the machine may be, for example, a conventional coin mechanism, a note acceptor, a credit card terminal, or any combination of these.

In one embodiment of the vending machine of this invention, and directly behind the transparent product display panel resides a series of product trays that generally have a plurality of products stored on them. The trays are arranged in such a way as to allow the products to be viewed from the customer in a clear and easily recognizable manner.

In one embodiment, the product labelling can be viewed in a normal reading orientation by the customer. The products can be loaded into the trays directly from the front of the vending machine when the front door is opened.

As is disclosed in such European case, and in the drawings and the specification of the current case, the vending machine of this invention preferably comprises a product pick mechanism that, in one aspect thereof, comprises an x-y drive mechanism. Such x-y drive mechanism preferably is comprised of a fixed vertical rail and a horizontal rail mounted to slide relative to the vertical rail. A motorized elevator preferably creates motion in the y or vertical direction, and a motorized carriage is mounted on the horizontal rail for creating motion in the x or transverse direction.

Preferably attached to the carriage is a telescoping vacuum pick mechanism. This mechanism preferably is comprised of a vacuum chamber which is rigidly mounted to the carriage. The vacuum chamber is attached to a series of telescoping tubes. One of such tubes is rigidly affixed to the vacuum chamber, and the vacuum chamber is connected to a vacuum source. A vacuum pressure switch is preferably connected to the vacuum chamber. A snap action or contact switch is connected to the carriage and has a lever that remains in contact with the suction tube when the tube is in the fully retracted position. Furthermore a support plate is rigidly attached to the end of suction tube and provides support when the tube is fully extended.

As is disclosed in such European case, and in the drawings and the specification of the current case, a motor is affixed to the carriage and connected to a friction drive roller by means of gears and a drive shaft. A flat spring coil is preferably compressed between the friction drive roller and an idler roller. The end of the flat spring coil is rigidly connected to the end of the tube. Also connected to the tube is an elastic suction cup. As the motor is energized, the gears cause the friction drive roller to rotate, thereby imparting a friction drive force to the flat coil spring and imparting a force on the end of the tube, causing such tube to move in a linear direction and telescope outwards increasing the length of the telescoping pick mechanism.

As is disclosed in such European case, and in the drawings and the specification of the current case, and in one preferred embodiment, the telescoping tubes preferably have external stepped rings rigidly attached to them. As the tubes extend, these externally stepped rings cause the tubes to move in a linear manner to a limited extent, as is described elsewhere in this specification. However, when the motor is reversed, forces are then applied in the opposite direction, thereby causing the tubes to collapse.

As is disclosed in such European case, and in the drawings and the specification of the current case, and in one embodiment, stop rings are rigidly attached to the telescoping tubes. The stop rings impart a force to the adjacent tube causing that tube to be pulled back. The stop rings also prevent the tubes from over travel in the reverse mode and prevent concentric disengagement of the tubes.

As is disclosed in such European case, and in the drawings and the specification of the current case, and in one embodiment, the telescoping tubes are contracted in such a way as to provide an air path for providing negative pressure (vacuum) at the elastic suction cup.

As will be apparent to those skilled in the art, the telescoping tubes can be extended to any distance between the fully retracted position and the fully extended position, thereby allowing for the retrieval of a product or multiple products in any of the storage locations in the array. In one embodiment, a support plate makes contact with a product tray, effectively keeping the extended height of the suction cup at the same height as if in the fully retracted position.

As is disclosed in such European case, and in the drawings and the specification of the current case, and in one embodiment, the articles to be vended are preferably positioned directly behind the window at the front of the machine, and the pick mechanism is positioned at the rear of the machine to pull the articles off the tray from the rear of the line of articles on the tray, so that the front article remains visible through the window to assist the customer in selecting the desired article. The articles picked from the tray are then delivered to the delivery location for retrieval at the front of the machine.

As is disclosed in such European case, and in the drawings and the specification of the current case, and in one embodiment, a customer would normally select a product by using the panel. When a product is selected the controller and its associated software checks that the snap action switch is engaged. If it is engaged, the drive mechanism positions the table in such a way as to align the telescoping vacuum pick mechanism with the appropriate product.

If the snap action switch is not engaged, the controller then sets the machine out of service. Moving the carriage without the telescoping tube in the completely retracted position would cause major machine failure and potentially damage the partially extended tubes.

The telescoping vacuum pick mechanism then is positioned as to retrieve a product in any one of the arrayed product trays The telescoping vacuum pick mechanism is then energized and caused to extend.

As will be apparent, when this happens the motor has been energized causing the telescoping tubes to extend. The vacuum pressure switch detects a pressure change when contact between the elastic cup and the product has been made. If the pressure vacuum switch does not make contact within a defined period of time, the software causes the motor to be reversed and retract the tubes, then returning the machine to its initial start position provided that the snap action switch is engaged. If the snap action switch is not engaged at this point the software will set the machine out of service as described above.

If the pressure vacuum switch does make contact within the defined period of time, then the carriage is moved to its delivery position. If the pressure switch is not detected, the controller/software then checks to see if a predetermined retry limit has not been exceeded. If the limit has been exceeded, the machine is set out of service. If the retry limit has not been exceeded, the machine will retry the pick cycle repeat this process until achieving the predetermined limit.

As is disclosed in such European case, and in the drawings and the specification of the current case, and in one embodiment, a carrier tray is rigidly mounted to the carrier. A surface on the product tray provides a means of transferring the product to the tray. The carrier tray preferably is horizontally in line with the tray surface and has a slight offset.

As will be apparent to those skilled in the art, many modifications may be made to the bottom of the product tray so as to allow a product to be pushed by the telescoping tubes very smoothly. A gap can be set for individual products by software control, allowing for different gaps on product delivery to be used and therefore ensuring smooth (no-drop) product delivery. The delivery position can be at any location on the x-y array and is preferably located at a position for product retrieval by a person.

As is disclosed in such European case, and in the drawings and the specification of the current case, and in one embodiment, the vacuum source preferably consists of a vacuum fan motor and a vacuum fan contained in a casing that is rigidly mounted on the carriage. A suction tube extends between the casing and the vacuum chamber that, in turn, is connected to the telescoping tubes.

As is disclosed in such European case, and in the drawings and the specification of the current case, and in one embodiment, the main machine control components of the vending machine comprise a control board comprised of a communication system, a payment system, and a motion control system.

The payment system is comprised of at least one of the following: a note reader, a coin acceptor, a credit card reader. a closed user group card reader, 58 or any other form of payment; and it also can be set to a no-payment option.

The communication system preferably can communicate with a selection keypad and a selection information display screen, or it can be linked directly by serial bus computer. The computer can be used to manage all the transaction functions including incorporating a touch screen for using the interface, and it can also receive and send information via wired telecom, wireless telecom, wifi, internet, or intranet communications.

Such information can include, e.g., machine conditions, number of vends, amount of stock, accounting information, etc. The computer can also receive and implement software. As is disclosed in such European case, and in the drawings and the specification of the current case, and in one embodiment, the motion control system controls the movement of the carriage, the pick arm movements and vacuum, the door movement and refrigeration control if required.

As is disclosed in such European case, and in the drawings and the specification of the current case, and in one embodiment, the vending machine comprises a lock controllable door that, in turn, comprises a frame, a rotating drum, axially bushings pivotally mounted to the frame for rotating the drum, a worm gear driven by a motor, two optical sensors, and guide walls. In one aspect, the worm gear is engaged with a worm wheel that is rigidly connected to a spur gear; the spur gear is engaged with a driven gear; and the driven gear is rigidly mounted to the drum.

In one aspect, an actuator is rigidly mounted to the driven gear and makes contact with one of two switches and when the drum is fully opened or fully closed. The worm gear provides the locking force required to keep the drum locked in the closed or open position. When an article is delivered to the door, the vacuum tubes, extend to push the article into the rotating drum.

If one of the optical sensors is blocked by the article, a signal is sent to the controller causing the motor to rotate and open the drum. When the drum rotates, the article can be retrieved from the drum. When the article is removed, the sensor is unblocked and the controller causes the motor to reverse, closing the drum to a full locked position.

I claim:

1. An apparatus for moving an article, comprising:

a pick mechanism having a flat surface and mounted for movement among a plurality of storage locations;

an arm mounted on the pick mechanism, the arm selectively extendable and retractable to engage and withdraw the article from one of the storage locations for positioning the article on the flat surface, the arm having a first telescoping tube, a second telescoping tube, and an elastic cup, the first telescoping tube movably connected to the second telescoping tube, the elastic cup connected to the first telescoping tube, the first and second telescoping tubes having an air path;

a drive assembly connected to the first telescoping tube;

a vacuum source operable to apply a vacuum through the air path;

a controller operable to move the pick mechanism while the article is positioned on the flat surface, the controller further operable to extend the arm such that the arm pushes the article from the flat surface of the pick mechanism to a product delivery unit, the product delivery unit having a receiving location at a rear of the apparatus to receive the article from the pick mechanism and a delivery location at a front of the apparatus for retrieval of the article by a user; and wherein the controller is operable to extend the arm such that the arm pushes the article in the product delivery unit from the receiving location to the delivery location.

2. The apparatus as recited in claim 1, wherein the controller is operable to control the vacuum source such that the article is disengaged from the elastic cup after being pushed from the flat surface of the pick mechanism to the delivery location.

3. The apparatus as recited in claim 2, further comprising a sensor for sensing whether the article is in the delivery location for retrieval of the article by the user, wherein the controller is operable to adjust the vacuum source based on the sensor such that the article is disengaged from the elastic cup in response to a determination based on the sensor that the article is in the delivery location for retrieval of the article by the user.

4. The apparatus as recited in claim 1, further comprising a contact switch for sensing contact between the contact switch and the arm when the arm is retracted, wherein the controller is operable to determine whether the arm is retracted based on the contact switch and to prevent movement of the pick mechanism based on the contact switch if the contact switch indicates that the arm is not retracted.

5. The apparatus as recited in claim 1, further comprising a distance detection sensor mounted on the pick mechanism for sensing a distance between the article and the distance detection sensor.

6. The apparatus as recited in claim 1, wherein the first telescoping tube has an external ring for contacting an internal ring of the second telescoping tube.

7. The apparatus as recited in claim 1, wherein the delivery location is closed to the user when the article is pushed to the delivery location by the arm, wherein the apparatus further comprises a sensor for sensing the article at the delivery location, and wherein the controller is operable to open the delivery location to the user based on the sensor.

8. The apparatus as recited in claim 7, wherein the delivery location is in a rotatable drum, and wherein the controller is operable to rotate the drum based on the sensor.

9. The apparatus as recited in claim 3, wherein the sensor is not mounted on the pick mechanism.

10. The apparatus as recited in claim 1, wherein the article is positioned on a surface of the one storage location, wherein the apparatus further comprises a support plate attached to the arm for contacting the surface of the one storage location thereby supporting the arm when the arm is extended to engage and withdraw the article from the one storage location.

11. The apparatus as recited in claim 1, further comprising:
- a video camera mounted on the pick mechanism; and
- a display screen connected to the storage locations,
- wherein the controller is operable to display via the display screen a video signal from the video camera thereby enabling the user to view delivery of the article.

12. The apparatus as recited in claim 1, wherein the first telescoping tube is movably connected to the second telescoping tube such that the first telescoping tube slides within the second telescoping tube for extending and retracting the arm.

13. A method for moving an article in an apparatus using a controller, comprising:
- moving a pick mechanism to a storage location at which the article is stored, the pick mechanism having a flat surface;
- extending an arm mounted on the pick mechanism until an elastic cup of the arm engages the article, the pick mechanism having a first telescoping tube movably connected to a second telescoping tube, wherein the elastic cup is connected to the first telescoping tube;
- applying a vacuum through an air path within the first and second telescoping tubes;
- retracting the arm such that the article is pulled onto the flat surface of the pick mechanism;
- moving, while the article is engaged with the elastic cup, the pick mechanism from the storage location to a product delivery unit, the product delivery unit having a receiving location at a rear of the apparatus to receive the article from the pick mechanism and a delivery location at a front of the apparatus for retrieval of the article by a user; and
- extending the arm such that the article is pushed by the arm from the flat surface of the pick mechanism to the receiving location in the product delivery unit and from the receiving location to the delivery location.

14. The method as recited in claim 13, further comprising controlling the vacuum such that the article is disengaged from the elastic cup after the article is pushed by the arm from the flat surface of the pick mechanism to the delivery location.

15. The method as recited in claim 14, further comprising;
- sensing whether the article is in the delivery location; and
- adjusting the vacuum based on the sensing such that the article is disengaged from the elastic cup in response to a determination based on the sensing that the article is in the delivery location.

16. The method as recited in claim 13, further comprising:
- sensing contact between a contact switch and the arm when the arm is retracted;
- determining whether the arm is retracted based on the sensing; and
- preventing movement of the pick mechanism in response to a determination based on the sensing that the arm is not retracted.

17. The method as recited in claim 13, further comprising sensing a distance between the article and a distance detection sensor mounted on the pick mechanism.

18. The method as recited in claim 13, further comprising contacting an external ring of the first telescoping tube and an internal ring of the second telescoping tube during the extending the arm mounted on the pick mechanism.

19. The method as recited in claim 13, wherein the delivery location is closed to the user during the extending the arm such that the article is pushed by the arm from the flat surface, and wherein the method further comprises:
- sensing the article at the delivery location; and
- opening the delivery location to the user in response to the sensing.

20. The method as recited in claim 19, wherein the delivery location is in a rotatable drum, and wherein the opening comprises rotating the rotatable drum.

21. The method as recited in claim 15, wherein the sensing is based on a sensor not mounted on the pick mechanism.

22. The method as recited in claim 13, wherein the article is positioned on a surface of the storage location prior to the moving the pick mechanism to the storage location, wherein the method further comprises contacting the surface of the storage location with a support plate attached to the arm.

23. The method as recited in claim 13, further comprising:
- capturing images of the article via a video camera mounted on the pick mechanism; and
- displaying the images to the user via a display screen connected to the storage location.

* * * * *